United States Patent [19]
Kamimura et al.

[11] Patent Number: 5,621,438
[45] Date of Patent: Apr. 15, 1997

[54] POINTING INFORMATION PROCESSING APPARATUS WITH POINTING FUNCTION

[75] Inventors: Toshio Kamimura, Fujisawa; Michihiro Mese, Chigasaki; Shigeto Oeda, Kamakura; Kazuhide Nishiyama, Yokohama; Yasumasa Matsuda, Tokyo, all of Japan

[73] Assignee: Hitachi, Ltd., Tokyo, Japan

[21] Appl. No.: 134,004

[22] Filed: Oct. 12, 1993

[30] Foreign Application Priority Data

| Oct. 12, 1992 | [JP] | Japan | 4-272659 |
| Nov. 9, 1992 | [JP] | Japan | 4-298832 |
| Nov. 20, 1992 | [JP] | Japan | 4-311655 |
| Apr. 16, 1993 | [JP] | Japan | 5-089748 |
| Apr. 16, 1993 | [JP] | Japan | 5-089749 |
| Jun. 1, 1993 | [JP] | Japan | 5-130715 |

[51] Int. Cl.$^6$ ................................. G09G 5/00
[52] U.S. Cl. .......................... 345/178; 345/156
[58] Field of Search ................... 345/173, 174, 345/178, 179, 180, 156; 178/18, 19

[56] References Cited

U.S. PATENT DOCUMENTS

| 4,710,758 | 12/1987 | Mussler et al. | 345/178 |
| 4,737,773 | 4/1988 | Kobayashi | 345/178 |
| 4,772,763 | 9/1988 | Garwin et al. | 345/180 |

FOREIGN PATENT DOCUMENTS

| 62-150423 | 7/1987 | Japan . |
| 62-150476 | 7/1987 | Japan . |
| 62-150477 | 7/1987 | Japan . |

OTHER PUBLICATIONS

"Description of Offset", On–Line Manual of Touch Driver Soft for MacIntosh, Microtouch Systems, Inc.
"Controller Commands", Touch Pen 2, User's Guide, Microtouch Systems, Inc.
"Pentable Tap of Pen in Pen Control", Windows for Pen, Microsoft.

*Primary Examiner*—Curtis Kuntz
*Assistant Examiner*—Vivian W. Chang
*Attorney, Agent, or Firm*—Antonelli, Terry, Stout & Kraus, LLP

[57] ABSTRACT

An integrated information processing apparatus is provided with a display device and a generally transparent input tablet having an input surface placed on a display surface of the display device for outputting a pointing coordinate which is a coordinate on the input surface pointed by a user's finger or an indicator. The apparatus includes a circuit for determining an indication direction extended point coordinate from the pointing coordinate output by the input tablet and a predetermined value, and a display processing section for displaying a point on the display surface of the display device corresponding to the determined indication direction extended point coordinate so that it is distinguishably displayed on the display device.

26 Claims, 56 Drawing Sheets

POINTING TIME

HIT RATIO

FIG. 28
| # | NAME | TEL.NO. | ADDRESS |
|---|------|---------|---------|
| 12 | YAMADA ×× | 232-23×× | ××× MINATO-KU TOKYO |
| 13 | SUZUKI ×× | 321-54×× | ××× TOTSUKA-KU YOKOHAMA-SHI |
| 14 | KIMURA ×× | 454-78×× | ××× SHINAGAWA-KU TOKYO |
| 15 | TANAKA ×× | 678-89×× | ××× KASHIWA-SHI CHIBA |
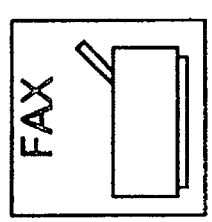
FAX
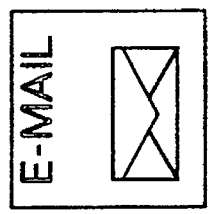
E-MAIL
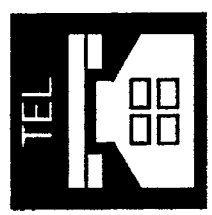
TEL
INPUT DIAL NUMBER 〜2801

FIG. 29

| # | NAME | TEL.NO. | ADDRESS |
|---|---|---|---|
| 12 | YAMADA ×× | 232-23×× | ××× MINATO-KU TOKYO |
| 13 | SUZUKI ×× | 321-54×× | ××× TOTSUKA-KU YOKOHAMA-SHI |
| 14 | KIM | | -KU TOKYO |
| 15 | TAN | 123-45×× | SHI CHIBA |

THIS DIAL NUMBER REGISTER? 2902 REGISTER 2903 CANCEL

2901

FAX
E-MAIL
TEL

FIG. 30

| # | NAME | TEL.NO. | ADDRESS |
|---|---|---|---|
| 12 | YAMADA ×× | 232-23×× | ××× MINATO-KU TOKYO |
| 13 | SUZUKI ×× | 321-54×× | ××× TOTSUKA-KU YOKOHAMA-SHI |
| 14 | KIMURA ×× | 454-78×× | ××× SHINAGAWA-KU TOKYO |
| 15 | | | ××× KASHIWA-SHI CHIBA |

SUZUKI ×× CALL UP?  3002 EXECUTE   3003 CANCEL

3001

FAX
E-MAIL
TEL

FIG. 31

| # | NAME | TEL.NO. | ADDRESS |
|---|------|---------|---------|
| 12 | YAMADA ×× | 232-23×× | ××× MINATO-KU TOKYO |
| 13 | SUZUKI ×× | 321-54×× | ××× TOTSUKA-KU YOKOHAMA-SHI |
| 14 | | | ×× SHINAGAWA-KU TOKYO |
| 15 | | | ××× KASHIWA-SHI CHIBA |

5 MINUTES LAPSED.
SUZUKI ××
CALL UP AGAIN ?

EXECUTE — 3102
CANCEL — 3103

3101

FAX
E-MAIL
TEL

FIG. 32

| # | NAME | TEL.NO. | ADDRESS | |
|---|---|---|---|---|
| 12 | YAMADA ×× | 232-23×× | ××× MINATO-KU TOKYO | |
| 13 | SUZUKI ×× | 321-54×× | ××× TOTSUKA-KU YOKOHAMA-SHI | |
| 14 | KIMURA ×× | 454-78×× | ××× SHINAGAWA-KU TOKYO | |
| 15 | TANAKA ×× | 678-89×× | ××× KASHIWA-SHI CHIBA | |

LIST :

JAPANESE ALPHABETICAL ORDER — 3201

ORDER OF ATTRIBUTES — 3202

FAX

E-MAIL

TEL

FIG. 33

| # | NAME | TEL.NO. | ADDRESS |
|---|---|---|---|
| 12 | YAMADA ×× | 232-23×× | ××× MINATO-KU TOKYO |
| 13 | SUZUKI ×× | 321-54×× | ××× TOTSUKA-KU YOKOHAMA-SHI |
| 14 | KIMUR― | | ―KU TOKYO |
| 15 | TANAK― | | ―SHI CHIBA |

WHICH DOCUMENT IS TO BE TRANSMITTED IN FACSIMILE ?

- REPORT 1
- SUPPLEMENTARY MATERIAL
- CIRCULATION 2

EXECUTE 3302
CANCEL 3303

3301

FAX

MAIL

FIG. 34

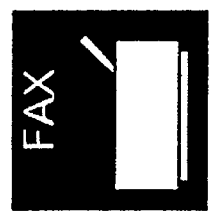
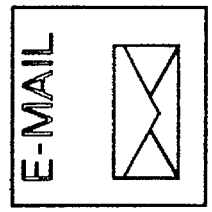
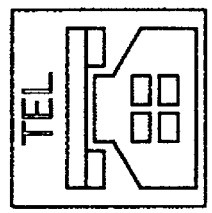

TO PRINT PRODUCED DOCUMENT ON COPY PAPER OR REPORT PAPER WAS LABORIOUS BECAUSE OF VERY COMPLICATED SETTING OF PRINTING FORM. HOWEVER, THIS INSTANTANEOUS PRINT SOFT IS GOOD TO PROVIDE EASY PRINTING. FRAME LINES OF COPY PAPER OR REPORT PAPER ARE DISPLAYED ON DISPLAY SCREEN AND POSITIONS TO BE MEASURED ARE SUCCESSIVELY INDICATED. THE ERED FORM, NUMERALS TO

IS THIS DOCUMENT TO BE TRANSMITTED IN FACSIMILE?

EXECUTE — 3402

CANCEL

3401

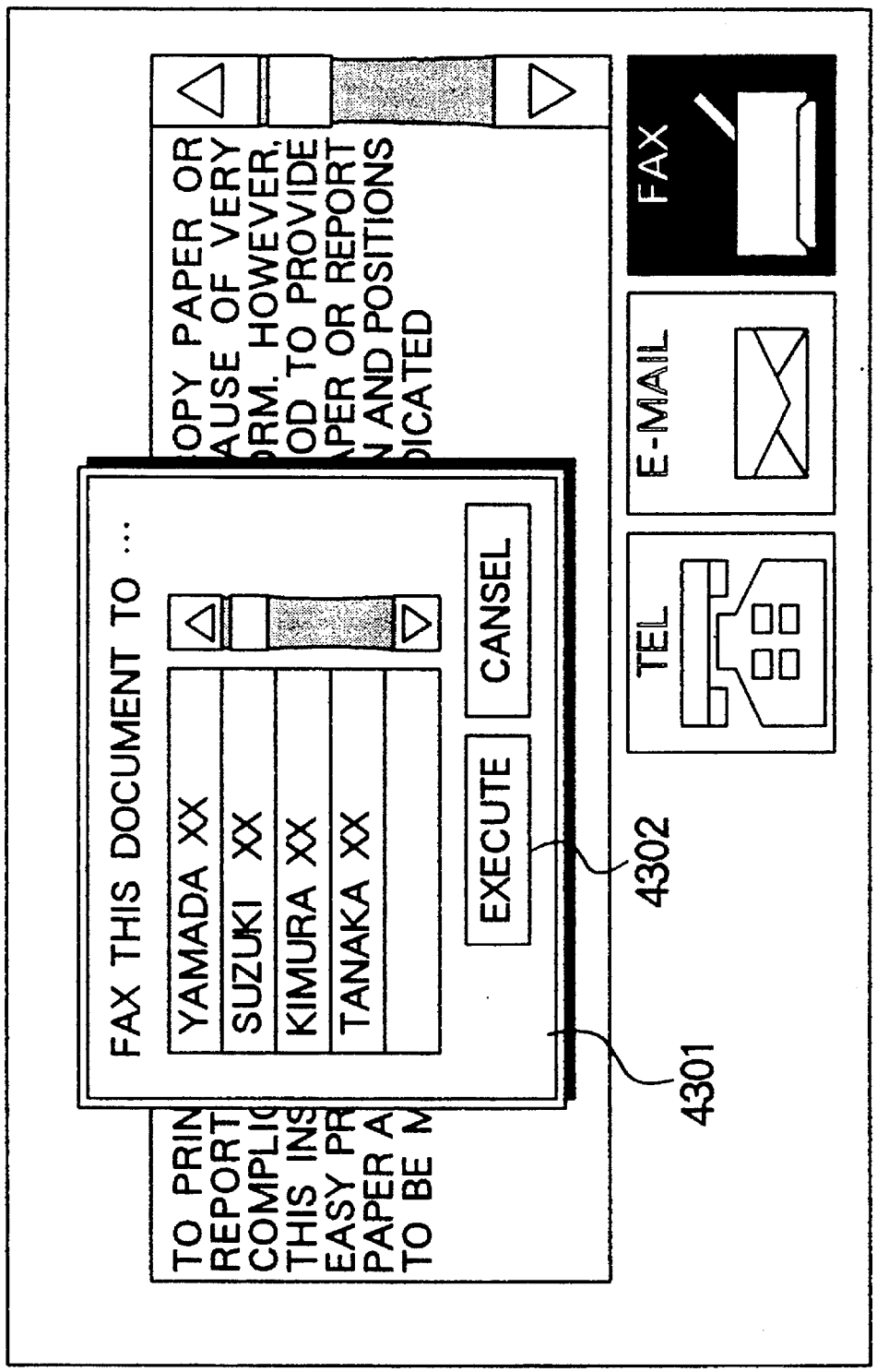

FIG. 44A
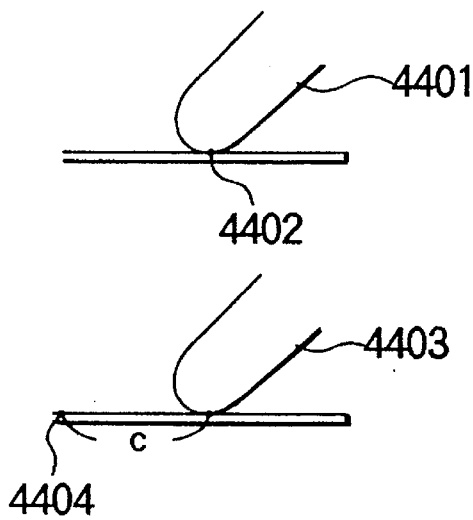
FIG. 44B
FIG. 45A
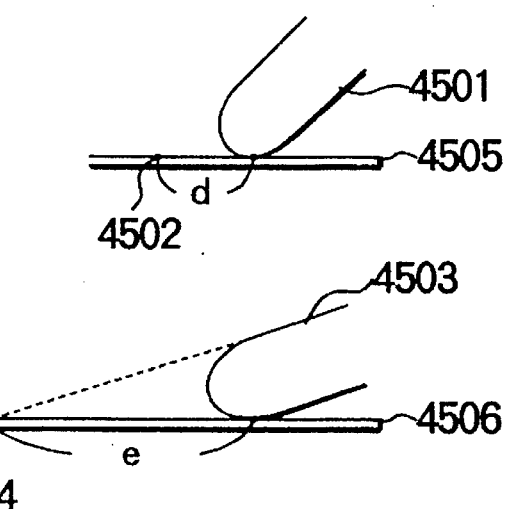
FIG. 45B

FIG. 46
TRANSFORMATION TABLE
| PB (Y COMPONENT) [dot] | TILT ANGLE a (DEGREE) OF FINGER |
|---|---|
| 0 — 100 | 30 |
| 101 — 300 | 10 |
| 301 — 399 | 0 |
FIG. 47
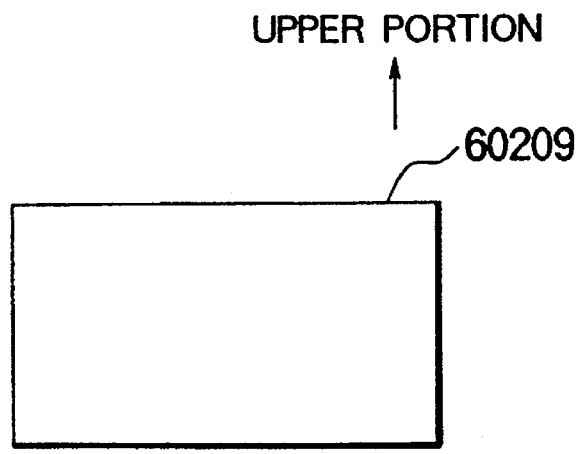
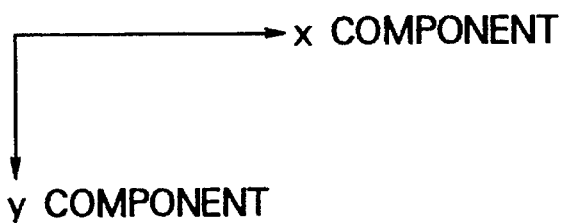

|  | DISTANCE BETWEEN COORDINATE VALUES OF START AND END POINTS OF CONDITION OF NON-ACQUISITION OF COORDINATE INFORMATION | |
|---|---|---|
|  | SHORT | LONG |
| TIME OF CONDITION OF NON-ACQUISITION OF COORDINATE INFORMATION — SHORT | ABSENT | ABSENT |
| TIME OF CONDITION OF NON-ACQUISITION OF COORDINATE INFORMATION — LONG | PRESENT | ABSENT |

ΔD = DISTANCE BETWEEN Ppe AND Pss
ΔT = TIME DIFFERENCE BETWEEN tpe AND tss

POINTING INFORMATION PROCESSING APPARATUS WITH POINTING FUNCTION

BACKGROUND OF THE INVENTION

The present invention relates to a pointing device which is used in an information processing apparatus such as a personal computer for inputting position information and an input/output integrated information processing apparatus which is integrated with a pointing device and a processor provided with a display device. The present invention also relates to a tapping judgement method in an information processing apparatus having a tablet.

In recent years, an information processing apparatus, with the progress of application to a variety of fields, has been advanced in the implementation of small size and light weight with lap-top type or note type information processing apparatuses having extensively been put to practice as products. Also, for implementation of a small, light weight note type information processing apparatus, development has been advanced for an input/output integrated information processing apparatus which is integrated with a pointing device such as an input tablet and a display device such as a liquid crystal display device.

Generally, in such an input/output integrated information processing apparatus, a cursor is displayed at a position overlapping a position on an input tablet indicated by a pen, finger or the like and the designation of a target position by the displayed cursor is accepted.

However, in such an input/output integrated information processing apparatus, it is required that an offset is provided between the indicating position of the pen, finger or the like and the displayed position of the cursor in order to prevent of the display of the cursor from disappearing behind the pen, finger or the like.

Therefore, in a technique disclosed by JP-A-62-150422, three areas including a display area for displaying a cursor, a movement indication area for indicating the movement of the cursor and a decision indication area for deciding the position of the cursor are displayed and the operation of movement of the cursor is performed in accordance with the operation of movement of a pen, finger or the like which indicates a position overlapping the movement indication area displayed for indicating the movement of the cursor.

In some tablets such as finger tablets, only coordinate information can be input. In one of such tablets in which the selection of an object is made, it is necessary to distinguish a position indication and a selection indication. In a distinguishing method disclosed by the JP-A-62-150422, a distinction between the position indication and the selection indication is realized by providing different areas.

The reason why the distinction between the position indication and the selection indication is realized by providing different areas is as follows. Namely, in a method in which a selection indication is made by tapping a finger or some other indicator on the input surface at a position subjected to position indication, a deviation is caused between the position subjected to position indication and a position subjected to the tapping since the finger or the like is detached from the input surface at some point in time. Therefore it is impossible to accurately make a tapping judgement for the selection indication or the like.

According to the technique disclosed by the JP-A-62-150422, there is no fear that the display of the cursor may disappear behind the finger or the like which operates the cursor. However, in order to move the cursor to an arbitrary position, it is necessary to move the cursor by use of the movement indication area in the vicinity of the display area. This results in deteriorated operability. Namely, it is difficult to obtain a natural feeling of indicating and operating the cursor directly by a finger or pen tip and in its turn a natural feeling of indicating a target position directly by the finger or pen tip.

In the object selection method disclosed by JP-A-62-150422, the position indication and the selection indication are made in the different areas. Therefore, there is a problem that a planar movement of the finger or the like is required between an operation for position indication and an operation for selection indication, thereby resulting in deteriorated operability.

SUMMARY OF THE INVENTION

Thus, a first object of the present invention is to provide an input/output integrated information processing apparatus which is capable of improving the operability of position information input using a finger or an indicator such as a pen.

A second object of the present invention is to eliminate the planar movement of a finger or the like between an operation for position indication and an operation for selection indication from the selection of an object by a finger or the like as by a button click operation in a mouse, thereby improving the operability of an object selection operation or the like in an operation by a finger or some other indicator.

To attain the first object of the present invention, the present invention provides an input/output integrated information processing apparatus provided with a display device and a generally transparent input tablet having an input surface placed on a display surface of the display device for outputting a pointing coordinate which is a coordinate on the input surface pointed by a finger or an indicator. The apparatus comprises means for determining an indication direction extended point coordinate from the pointing coordinate output by the input tablet and a predetermined value, and display processing means for displaying a point on the display surface of the display device corresponding to the determined indication direction extended point coordinate so that it is distinguishably displayed on the display device.

In such an apparatus, display processing means displays a cursor at a position on the display surface of the display device corresponding to the determined indication direction extended point coordinate. Also, the apparatus may comprise means for displaying a figure or pattern accepting the designation of a requested processing on the display device and processing means for performing a processing corresponding to a figure indicated on the display surface by the cursor displayed on the display device.

To attain the second object of the present invention, the present invention provides a tapping judgement method in which the determination of tapping is made from coordinate information of a tablet and time information of a system so that the tapping is judged as being present at the coordinate of a start point of the condition of non-acquisition of the coordinate information when a time of the condition of nonacquisition of the coordinate information is short to a certain degree and a distance between the coordinate values of start and end points of the condition of nonacquisition of the coordinate information is short to a certain degree. On the other hand, when a time of the condition of non-acquisition of the coordinate information exceeds, to a certain degree, or when the distance between the coordinate values of start and end points of the condition of nonacquisition of the coordinate information over extends, to a certain degree, the tapping is judged as being absent.

With the above construction for attaining the first object of the present invention, the indication direction extended point coordinate is determined from the pointing coordinate which is output by the input tablet and the predetermined value. A point on the display surface of the display device corresponding to the determined pointing coordinate position is displayed distinguishably. Accordingly, if the perdetermined value is properly determined beforehand, it is possible to display the cursor or the like at a position free of disappearance behind the finger, the indicator or the like, preferably, at a position on the display surface on the extension in a direction indicated by the finger or indicator to accept various indications by the cursor or the like as displayed.

Accordingly, a user can perform an operation for position indication with a natural feeling as if the tip of the indicator was extended. According, operability is improved.

With the above construction for attaining the second object of the present invention, since it is possible to absorb a deviation which may be caused in an operation by a finger or the like between a position subjected to position indication and a position subjected to tapping, the determination of tapping for selection indication can be made accurately. Therefore, it is possible to eliminate the planar movement of a finger or the like between an operation for position indication and an operation for selection indication from the selection of an object by a finger or the like, thereby improving operability of an object selection operation or the like.

BRIEF DESCRIPTION OF THE DRAWINGS

FIG. 28 is a view for explaining an example of a display screen in an application (the input of a telephone number);

FIG. 29 is a view for explaining an example of a display screen in an application (the registration of a telephone number);

FIG. 30 is a view for explaining an example of a display screen in an application (the confirmation of a telephone call);

FIG. 31 is a view for explaining an example of a display screen in an application (redialing);

FIG. 32 is a view for explaining an example of a display screen in an application (the change/setting of the sequence of display of an address book);

FIG. 33 is a view for explaining an example of a display screen in an application (facsimile transmission);

FIG. 34 is a view for explaining an example of a display screen in an application (transmission in facsimile);

FIG. 43 is a view for explaining an example of a display screen at the time of transmission in facsimile;

FIGS. 44A and 44B are views showing an indicating point (or indicating direction) in the conventional system;

FIGS. 45A and 45B are views showing an indicating point (or indicating direction) in the present invention;

FIG. 46 shows a transformation table for acquiring the tilt angle a of a finger from the Y component of PB;

FIG. 47 is a diagram showing the coordinate axes of an input section;

DESCRIPTION OF THE PREFERRED EMBODIMENTS

Embodiments of an input/output integrated information processing apparatus of the present invention will now be explained.

First, a first embodiment will be explained.

Figure 1:
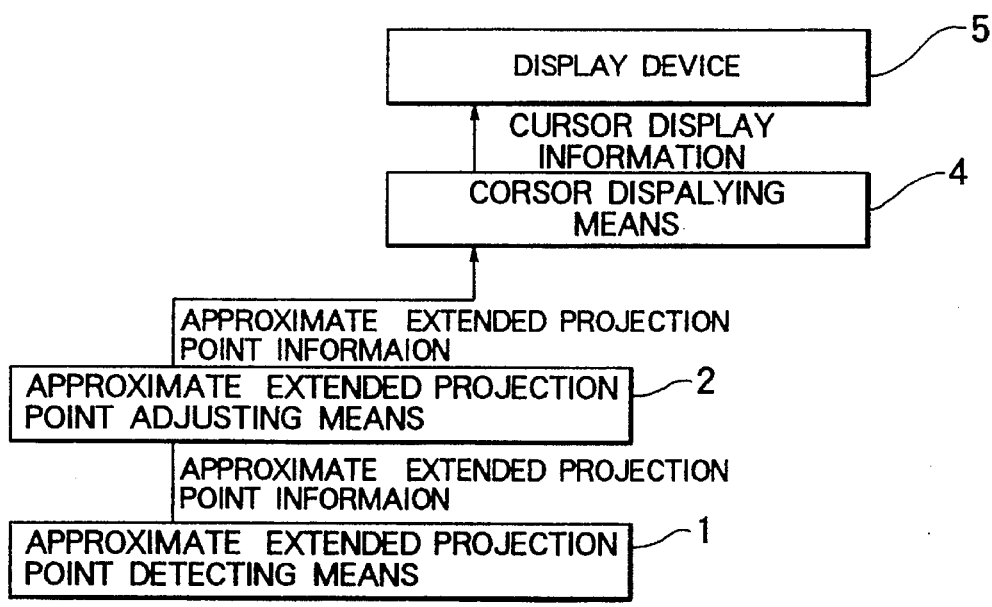
FIG. 1 is a block diagram showing the construction of an input/output integrated information processing apparatus according to a first embodiment of the present invention.

FIG. 1 shows the construction of an input/output integrated information processing apparatus according to the first embodiment.

In FIG. 1, reference numeral 1 denotes approximate extended projection point detecting means for detecting an approximate extended projection point, numeral 2 indicates approximate extended projection point position adjusting means for adjusting the position of the approximate extended projection point, numeral 4 represents cursor displaying means for controlling the display of a cursor corresponding to the adjusted position of the approximate extended projection point, and numeral 5 denotes a display device such as a liquid crystal display for displaying the cursor.

Figure 2:
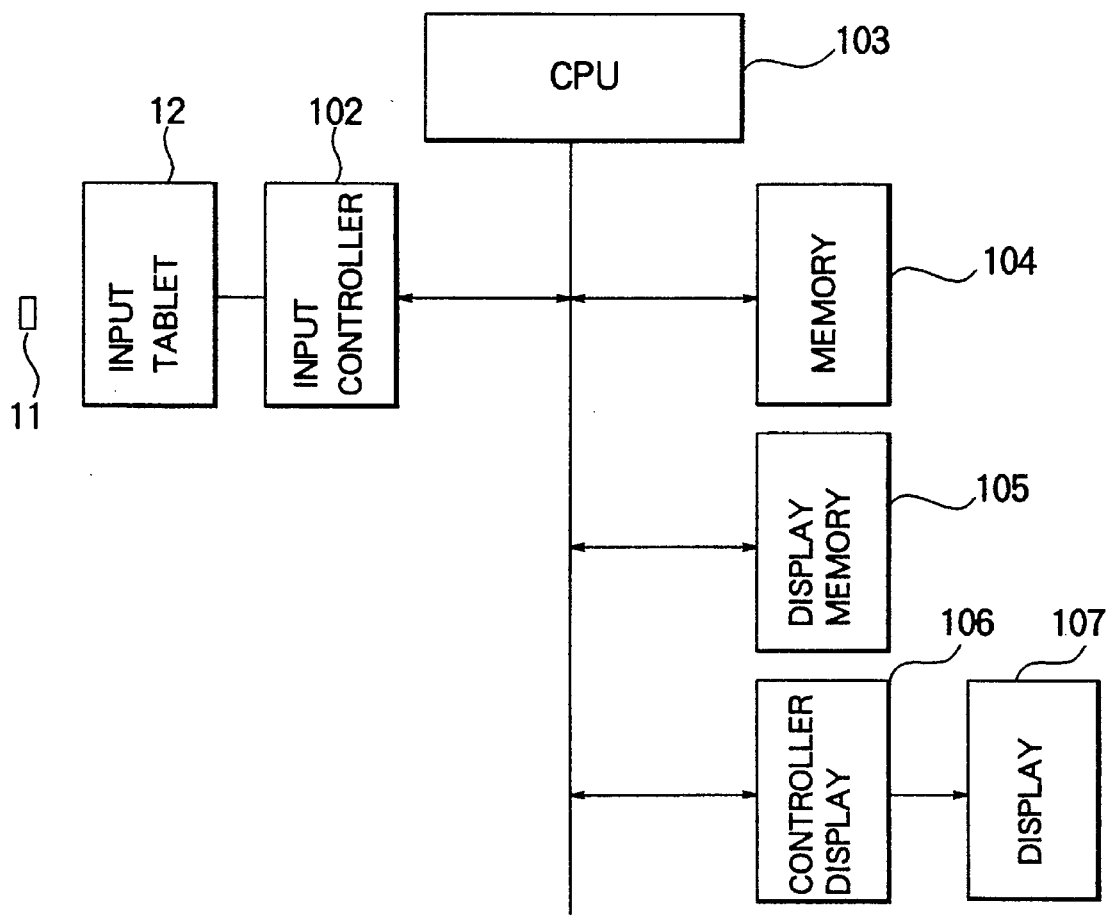
FIG. 2 is a block diagram showing the specific construction of the input/output integrated information processing apparatus according to the first embodiment of the present invention.

Specifically, the input/output integrated information processing apparatus according to the first embodiment is realized by, for example, a construction shown in FIG. 2.

In FIG. 2, reference numeral 12 denotes a transparent input tablet, numeral 11 denotes an indicator, numeral 102 indicates an input controller, numeral 103 represents a CPU, numeral 104 denotes a memory, numeral 105 indicates a display memory, numeral 106 represents a display controller, and numeral 107 denotes a display device. An input surface of the input tablet 12 is placed on a display surface of the display device 107.

In the present embodiment, the approximate extended projection point detecting means 1 includes the input tablet 12, the indicator 11 and the input controller 102.

Fig. shows the construction of the approximate extended projection point detecting means 1.

Figure 3:
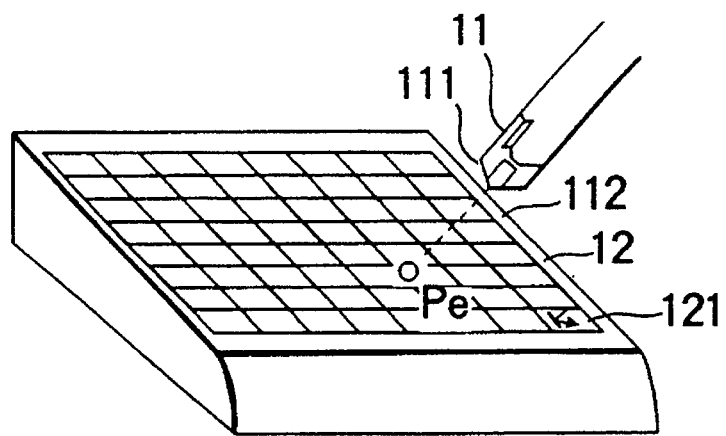
FIG. 3 is a view for explaining the operation of approximate extended projection point detecting means according to the first embodiment of the present invention.

In FIG. 3, reference number 11 denoted an indicator attached to the tip of a finger for emitting a laser beam or the like, and numeral 12 denotes an input tablet having an array of photo transistors arranged in a matrix form for detecting a position at which the laser beam or the like is received.

In FIG. 3, reference number 111 denotes a light emitting diode for converting an electrical signal into a laser beam or the like, numeral 121 denotes a photo transistor for converting a laser beam or the like into an electrical signal, and numeral 112 indicates a laser beam emitted by the light emitting diode.

With such a construction, the light emitting diode 111 in the indicator 11 outputs the laser beam 112 on an extension line of the indicator 11. The input controller 102 scans the presence/absence of an electrical signal in each column and each row of the matrix of photo transistors 121 to detect an extended projection point Pe of the indicator for an indicating plane.

The approximate extended projection point position adjusting means 2 is constructed by the input controller 102.

Namely, the input controller 102 subtracts the X-axis and Y-axis components (Kx, Ky) of adjustment information K from the X-axis and Y-axis components (Pex, Pey) of the detected approximate extended projection point information Pe for adjustment into the X-axis and Y-axis components (Pex', Pey') of extended projection point information Pe', as shown by equation (1):

$$Pex' = Pex - Kx$$
$$Pey' = Pey - Ky. \tag{1}$$

The adjustment information K is a proper value which changes depending upon the coordinate of the detected approximate extended projection point information Pe. The adjustment information K is provided for correcting an error caused by the characteristic of a user's indication, the condition of use, an indicated position and so on.

The approximate extended projection point position adjusting means 2 may be realized by a program performed by the CPU 103.

Namely, there may be employed a construction in which the C2U reads the coordinate of the extended projection point Pe determined by the input controller 102 and adjusts the coordinate in accordance with equation (1).

The cursor displaying means 4 includes the CPU 103.

The CPU 103 receives the extended projection point Pe' adjusted by the approximate extended projection point position adjusting means 2 to change display data of the display memory 105 so that a cursor with Pe' as an indicating point thereof is displayed.

The display device 5 includes the display memory 105, the display controller 106 and the display device 107. Display data stored in the display memory 105 by the cursor displaying means 4 is displayed on the display device 107 by the display controller 106.

Figure 4:
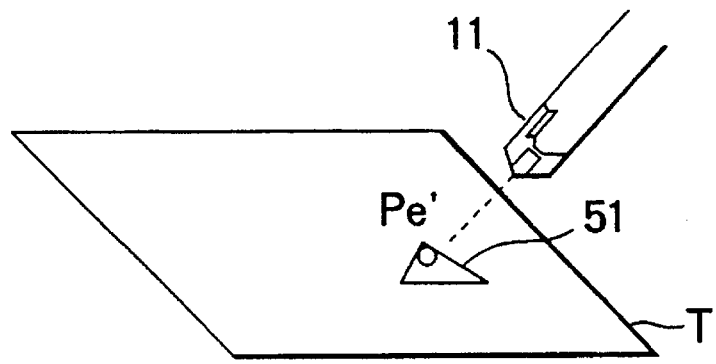
FIG. 4 is a view for explaining the state of display of a cursor in the first embodiment of the present invention.

FIG. 4 shows the cursor thus displayed. In the figure, reference symbol T denotes an input surface of the approximate extended projection point detecting means 1 and a display surface of the display device 5 which overlap each other. Numeral 11 denotes an indicator attached to the tip of a finger. Numeral 51 denotes a cursor displayed on the display device 6. Symbol Pe' denotes an extended projection point as adjusted. As shown, the cursor 1 is displayed such that it generally includes the extended projection point Pe' as adjusted.

For an operating system or an application performed on the CPU 103, the position of the extended projection point Pe' is recognized as an input position designated by a user through the cursor. For example, when a region overlapping a menu or icon displayed on the display device is designated by the extended projection point Pe', the operating system or the application performed on the CPU 103 assumes that the corresponding menu or icon is designated. Alternatively, when a region overlapping a menu or icon displayed on the display device is merely designated by the extended projection point Pe' with the cursor not being displayed, it may be assumed that the corresponding menu or icon is designated. In addition to the designation of an icon or menu, the designation of a position at the time of drawing processing, the designation of an editing position at the time of document edition, and so on are also accepted by the extended projection point Pe'. The adjustment by the extended projection point adjusting means 2 may be omitted. In this case, each of the above-mentioned designations is accepted directly by Pe in lieu of Pe'. Such acceptance of a designation is similarly made in each embodiment which will be explained in the following.

Since a distance from the input surface of the indicator 11 can be determined from the magnitude of an output of the photo transistor array, the display of the cursor may be operated in accordance with the determined distance, as required.

In the present embodiment, the array of photo transistors is used as the approximate extended projection point detecting means 1. Alternatively, an array of photo diodes arranged in a matrix form may be used.

As mentioned above, the adjustment by the extended projection point adjusting means 2 may be omitted. In this case, the cursor is displayed such that it generally includes the extended projection point Pe.

According to the first embodiment mentioned above, an approximate extended projection point of an indicator such as a finger or pen for an approximate input surface can be detected and adjusted in an operation for position indication by the indicator. Also, the approximate extended projection point can be confirmed by a cursor. Therefore, the apparatus is free of the influence of parallax. Further, corresponding to the condition of use, the operation for position indication can be performed with a natural feeling as if the approximate tip of the indicator was extended to the input surface. Thereby, it is possible to improve the operability of the operation for position indication or the like by the indicator such as a pen or finger.

Also, according to the first embodiment, the approximate extended projection point of the indicator for the approximate input surface can be detected irrespective of the contact/non-contact-of the indicator for the approximate input surface. Further, if a visible laser beam is emitted from the indicator, an approximate extension line of the indicator and the approximate extended projection point of the indicator for the approximate input surface can be visualized irrespective of the contact/non-contact of the indicator for the approximate input surface, thereby further improving the operability of the operation for position indication or the like by the indicator such as a pen or finger.

In the first embodiment, there is a need to bring the indicator into contact with the input surface. Accordingly, the deterioration of the visibility of the cursor due to the disappearance thereof behind the indicator or the like is small as compared with that in an apparatus which has a need to bring an indicator into contact with an input surface. Therefore, the light emitting diode may be disposed in the indicator 11 to emit a laser beam from the tip of the indicator normally or perpendicularly to the input surface so that an approximate normal projection point of the approximate indicator tip for the input surface is detected to process the detected point as the abovementioned point Pe.

Next, a second embodiment will be explained.

An input/output integrated information processing apparatus according to the second embodiment is different in only approximate extended projection point detecting means 1 from that according to the first embodiment.

Explanation will now be made of the approximate extended projection point detecting means 1 according to the second embodiment.

The approximate extended projection point detecting means 1 according to the second embodiment an input tablet 12, an indicator 11 and an input controller 102, as in the first embodiment.

Figure 5:
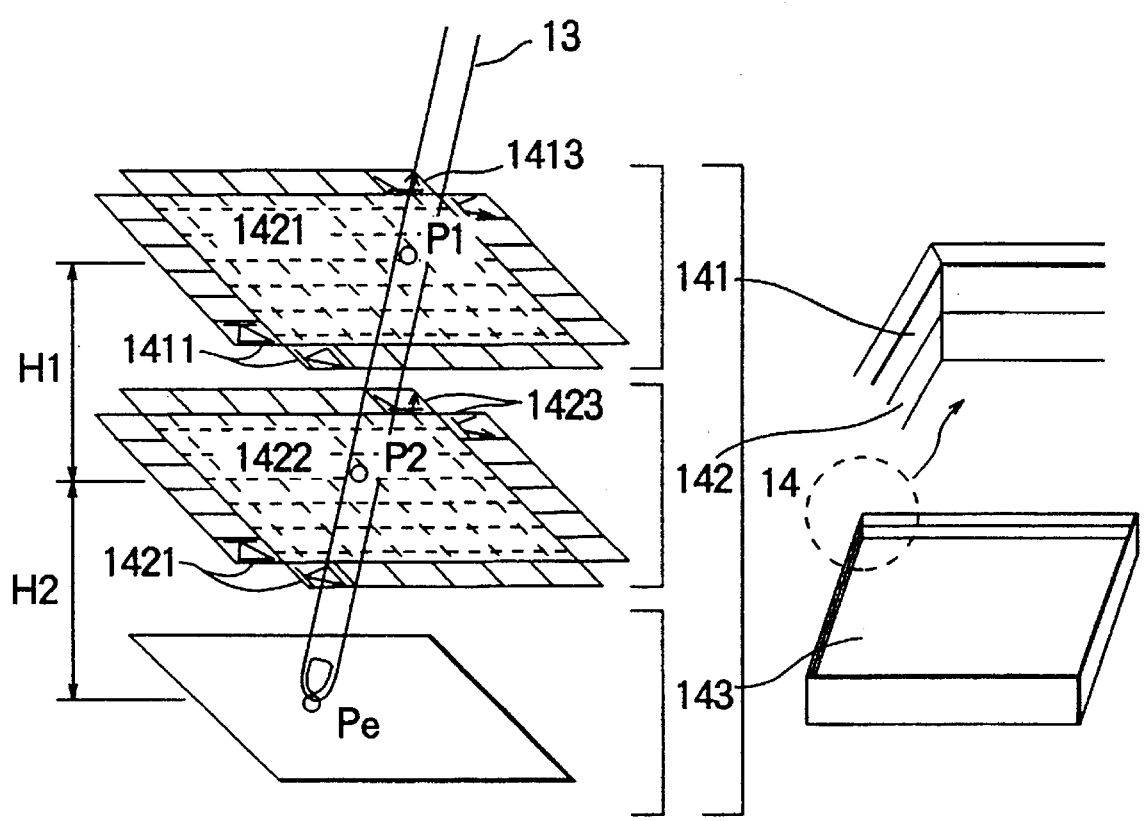
FIG. 5 is a view for explaining the construction of an input tablet according to a second embodiment of the present invention.

The input tablet 12 used in the second embodiment includes two photo sensor arrays 141 and 142 successively placed on an input surface 143 of a display device 5, as shown in FIG. 5. In contrast with the first embodiment, it is not necessary to use the indicator 11 having a special provision. Also, the input is possible directly by using a user's finger. In this case, no indicator is required. In the second embodiment, a finger or the indicator is denoted by reference numeral 13.

In FIG. 5, reference numeral 13 denotes a finger or indicator, numeral 14 indicates a photo sensor array for detecting a light intercepting position of the indicator or the like, numeral 141 represents a first photo sensor array, numeral 142 represents a second photo sensor array, and numeral 143 denotes an input surface.

Each of the photo sensor arrays 141 and 142 includes light emitting diode arrays 1411 and 1421 which are respectively arranged on two adjacent sides and converts an electrical signal into a laser beam or the like and photo transistor arraYs 1413 and 1423 which are respectively arranged on two sides opposite to the two sides having the light emitting diode arrays arranged thereon and converts a laser beam or the like into an electrical signal. In FIG. 5, reference numerals 1412 and 1422 denote laser beams emitted from the light emitting diodes.

In FIG. 5, reference symbols 21 and P2 denote passing point information of the indicator for first and second sensor surfaces detected by the first and second photo sensor arrays, symbol Pe indicates an extended projection point information of the indicator for the input surface, and symbols H1 and H2 represent an interval between the first sensor surface and the second sensor surface and an interval between the second sensor surface and the input surface. H1 and H2 are equal to each other.

As shown, the first photo sensor array 141, the second photo sensor array 142 and the input surface 143 are arranged at equal intervals in a direction perpendicular to the input surface. The first photo sensor array 141 and the second photo sensor array 142 are arranged such that laser beams 1412 and 1422 from the light emitting diode arrays 1411 and 1421 are emitted to the photo transistor arrays 1413 and 1423 opposite to the light emitting diode arrays. Also, when the laser beams 1412 and 1422 impinge upon the photo transistor arrays 1413 and 1423, the corresponding photo diode generate electrical signals.

The input controller 102 scans the presence/absence of an electrical signal in each column and each row of the photo diode arrays 1413 and 1423 to detect passing point information P1 and P2 of the indicator on the surfaces of the first and second photo sensor arrays 141 and 142.

Further, as shown by equation (2), extended projection point information Pe is detected considering the fact that a change between the passing point information 21 and the passing point information P2 becomes equal to a change between the passing point information P2 and extended projection point information se2 since the interval information H1 and H2 are equal to each other.

More particularly, changes between the X-axis and Y-axis components (P1x, P1y) of the passing point information P1 and the X-axis and Y-axis components (P2x, P2y) of the passing point information P2 are subtracted from the X-axis and Y-axis components (P2x, P2y) of the passing point information P2 to simply detect the X-axis and Y-axis components (Pex, Pey) of extended projection point information Pe:

$Pex=P2x-(P1x-22x)$ $Pey=P2y-(P1x-P2y)$ $(\because H1=H2).$ (2)

The approximate extended projection point detecting means 1 includes the input tablet 12, the indicator 11, the input controller 102 and the C2U 103 so that the input controller 102 determines only (P1x, P1y) and (P2x, P2y) and delivers them to the CPU 103 which in turn performs the calculation of equation (2) to determine (Pex, Pey).

In lieu of the combination of the light emitting diode array and the photo transistor array, the combination of a light emitting diode array and a photo diode array may be used for the photo sensor array 141 or 142. In the second embodiment, explanation has been made, for simplicity of explanation, in conjunction with the case where the interval between the first sensor surface and the second sensor surface and the interval between the second sensor surface and the input surface are equal to each other. However, those intervals may be different from each other. In this case, it is necessary to multiply the second terms of the right sides of equation (2) by proper coefficients.

According to the second embodiment mentioned above, an approximate extended projection point of an indicator such as a finger or pen for an input surface can be detected and adjusted in an operation for position indication by the indicator and the operation for position indication can be performed with a natural feeling as if the approximate tip of the indicator was extended to the input surface. Therefore, it is possible to improve operability of position indication or the like by the indicator such as a pen or finger.

According to the second embodiment, it is also possible to detect information of a tilt angle of the indicator in a normal direction for the input surface and information of a plane angle of the indicator for the input surface.

In the second embodiment also, there is a need to bring the indicator into contact with the input surface. Accordingly, the deterioration of the visibility of the cursor due to the disappearance thereof behind the indicator or the like is small as compared with that in an apparatus which has a need to bring an indicator into contact with an input surface. Therefore, a detection position of the light sensor array nearest to the input surface may be detected as an approximate normal projection point of the approximate indicator tip for the input surface is detected to process the detected point as the abovementioned point Pe.

Next, a third embodiment of the present invention will be explained.

Figure 6:
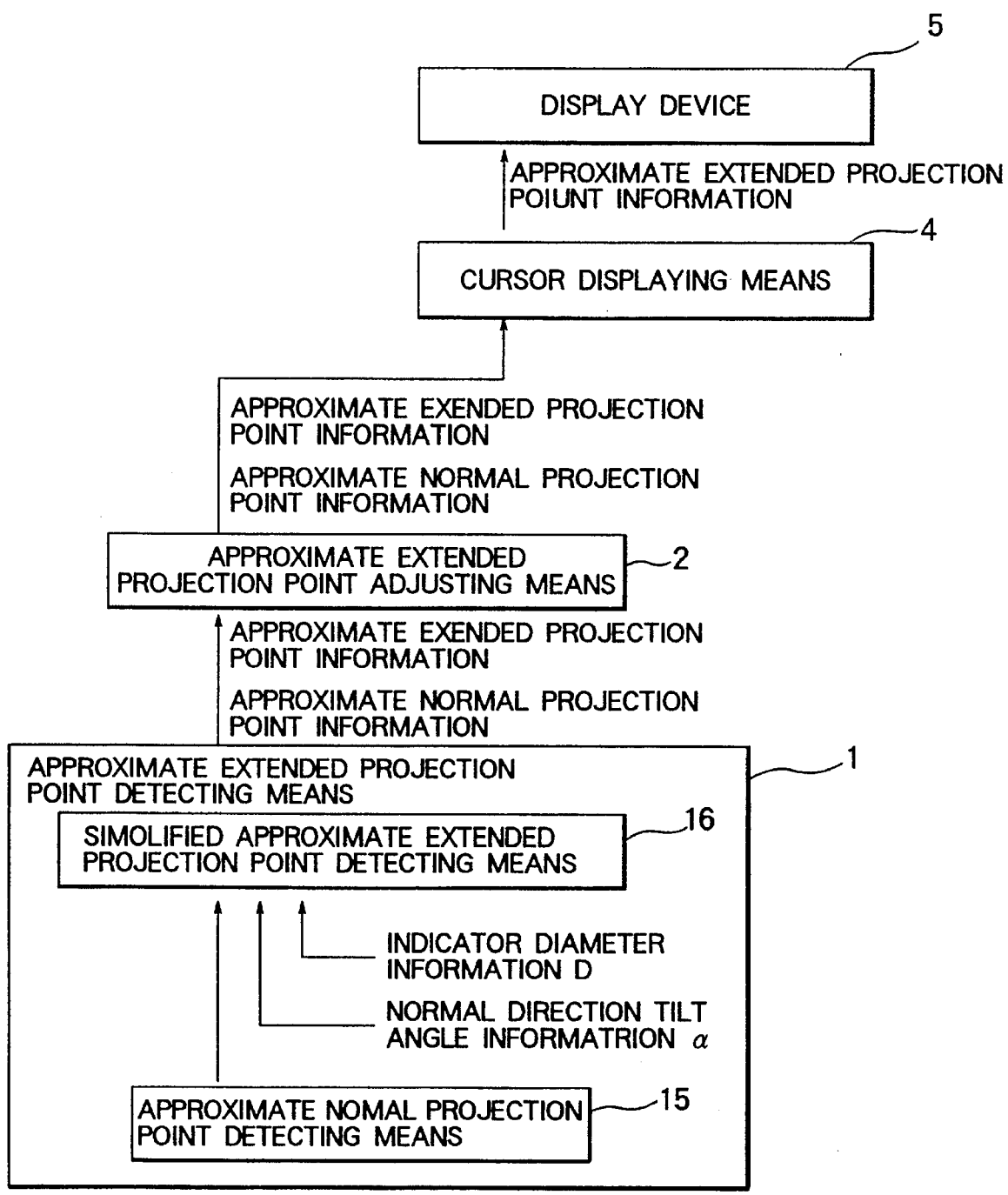
FIG. 6 is a block diagram showing the construction of an input/output integrated information processing apparatus according to a third embodiment of the present invention.

FIG. 6 shows the construction of an input/output integrated information processing apparatus according to the third embodiment.

In FIG. 6, reference numeral 1 denotes approximate extended projection point detecting means for detecting an approximate extended projection point, numeral 2 indicates approximate extended projection point position adjusting means for adjusting the position of the approximate extended projection point, numeral 4 represents cursor displaying means for controlling the display of a cursor corresponding to the adjusted position of the approximate extended projection point, and numeral 5 denotes a display device such as a liquid crystal display for displaying the cursor.

The approximate extended projection point detecting means 1 includes approximate normal projection point detecting means 15 for detecting an approximate normal projection point of the approximate tip of an indicator for an approximate input surface and simplified approximate normal projection point detecting means 16 for determining an approximate extended projection point of the indicator for the approximate input surface by use of the information of approximate normal projection point detected by the approximate normal projection point detecting means, information of the approximate diameter of the approximate indicator tip and information of a tilt angle of the indicator in an approximately normal direction for the approximate input surface.

Similarly to the input/output integrated information processing apparatus according to the first embodiment, the input/output integrated information processing apparatus according to the third embodiment is realized by, for example, a construction shown in FIG. 2.

The contents of the approximate extended projection point position adjusting means 2, the cursor displaying means 4 and the display device 5 are similar to those in the first embodiment.

Explanation will now be made of the approximate extended projection point detecting means 1 in the third embodiment which is different from that in the first embodiment.

The approximate normal projection point detecting means 15 of the approximate extended projection point detecting means 1 includes the input tablet 12 and the input controller 102. In contrast with the first embodiment, it is not necessary to use the indicator having a special provision. Also, the input is possible directly by a finger. In this case, no indicator is required. In the third embodiment, a finger or the indicator is denoted by reference numeral 151. The finger will be supposed in the following explanation.

The input tablet 12 used in the third embodiment is of a pressure sensitive type and will hereinafter be denoted by reference numeral 152. However, for the tablet, an electrostatic capacitance type, electrostatic coupling type, electrostatic induction type, ultrasonic type or the like may be used in lieu of the pressure sensitive type tablet.

In the following, the operation of the approximate normal projection point detecting means 15 will be explained in reference to FIG. 7.

Figure 7:
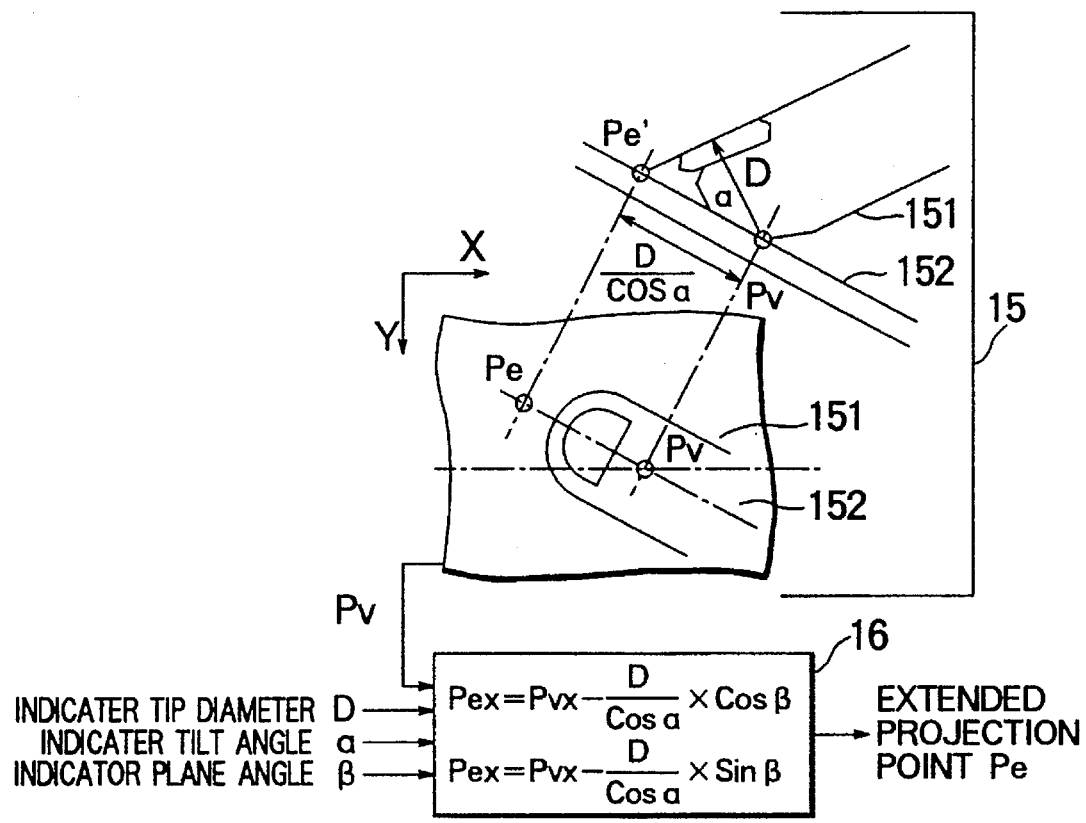
FIG. 7 is a view for explaining the operation of approximate extended projection point detecting means according to the third embodiment of the present invention.

In FIG. 7, reference symbol D denotes the diameter of the tip of a finger or an indicator, $\alpha$ a tilt angle of the indicator in a normal direction for the input surface, and $\beta$ a plane angle of the indicator for the input surface. D, $\alpha$ and $\beta$ are initially set taking the used indicator and its condition into consideration.

Reference numeral 15 denotes the approximate normal projection point detecting means, and numeral 16 denotes simplified approximate normal projection point detecting means.

When the input tablet 152 is pressed by the finger 151, the input controller 102 detects and takes in this coordinate or a normal projection point Pv(Pvx,Pvy).

The simplified approximate normal projection point detecting means 16 of the approximate extended projection point detecting means 1 is constructed by the input controller 102 or a program performed by the CPU 103 and performs the following processing.

Namely, the extended projection component ($D \div \cos \alpha$) of the indicator in an indicator plane angle $\beta$ direction is determined from the normal projection point Pv detected by the approximate normal projection Point detecting means 15, the indicator tilt angle $\alpha$ and the indicator tip diameter D, and the X-axis and Y-axis components (($D \div \cos \alpha \times \cos \beta$), ($D \div \cos \alpha \times \sin \beta$)) of the extended projection component of the indicator is subtracted from the X-axis and Y-axis components (Pvx, Pvy) of the normal projection point Pv to simply detect the X-axis and Y-axis components (Pex, Pey) of an approximate extended projection point Pe of the indicator 151, as shown in equation (3):

$$Pex = Pvx - \frac{D}{\cos\alpha} \times \cos\beta \qquad (3)$$

$$Pey = Pvy - \frac{D}{\cos\alpha} \times \cos\beta.$$

In practice, the diameter information D, normal direction tilt angle information $\alpha$ and plane angle information $\beta$ of the indicator chip may be fixed values. In this case, the second term of each equation (3) takes a fixed value. Accordingly, in this case, only fixed values directly determined by experiments or the like may beforehand or initially be set for the second term of each equation (3).

The normal direction tilt angle information a and plane angle information $\beta$ may be fixed values for the entire input surface. However, since those angles change depending upon an indicated position on the input surface, it is more preferable that proper values ($\alpha(xy)$, $\beta(xy)$) changing depending upon the coordinate of the normal projection point Pv(Pvx, Pvy) are used.

When the approximate extended projection point information Pe is thus determined, the approximate extended point position adjusting means 2 subtracts the X-axis and Y-axis components (Kx, Ky) of adjustment information K from the X-axis and Y-axis components (Pex, Pey) of the detected approximate extended projection point information Pe for adjustment into the X-axis and Y-axis components (Pex', Pey') of extended projection point information Pe', in accordance with the following equation (1) as in the first embodiment:

$$Pex'=Pex-Kx$$

$$Pey'=Pey-Ky. \qquad (1)$$

If not necessary, this adjustment processing is omitted.

Subsequently, as in the first embodiment, the cursor displaying means 4 receives the extended projection point Pe' adjusted by the approximate extended projection point position adjusting means 2 to change display data of the display memory 105 so that a cursor with Pe' as an indicating point thereof is displayed.

In the display device 5 constructed by the display memory 105, the display controller 106 and the display device 107, display data stored in the display memory 105 by the cursor displaying means 4 is displayed on the display device 107 by the display controller 106.

Figure 8:
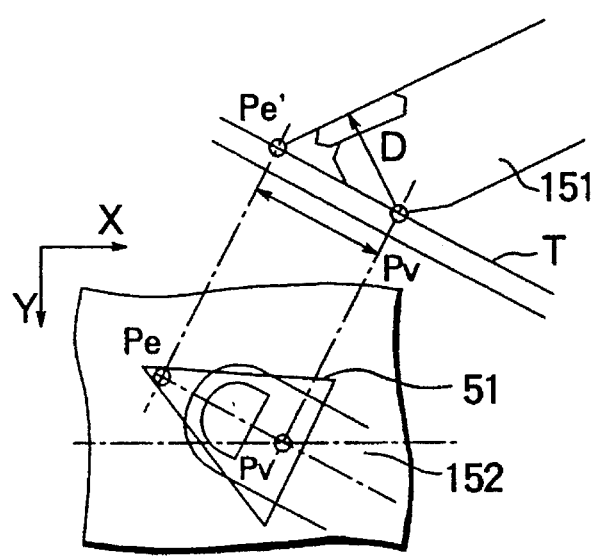
FIG. 8 is a view for explaining the state of display of a cursor in the third embodiment of the present invention.

FIG. 8 shows a cursor thus displayed. According to the third embodiment, the cursor is displayed on the extension line of the finger, as shown.

In the following, it will be shown that with the cursor thus displayed, a target position can be indicated satisfactorily by the cursor itself.

Figure 9:
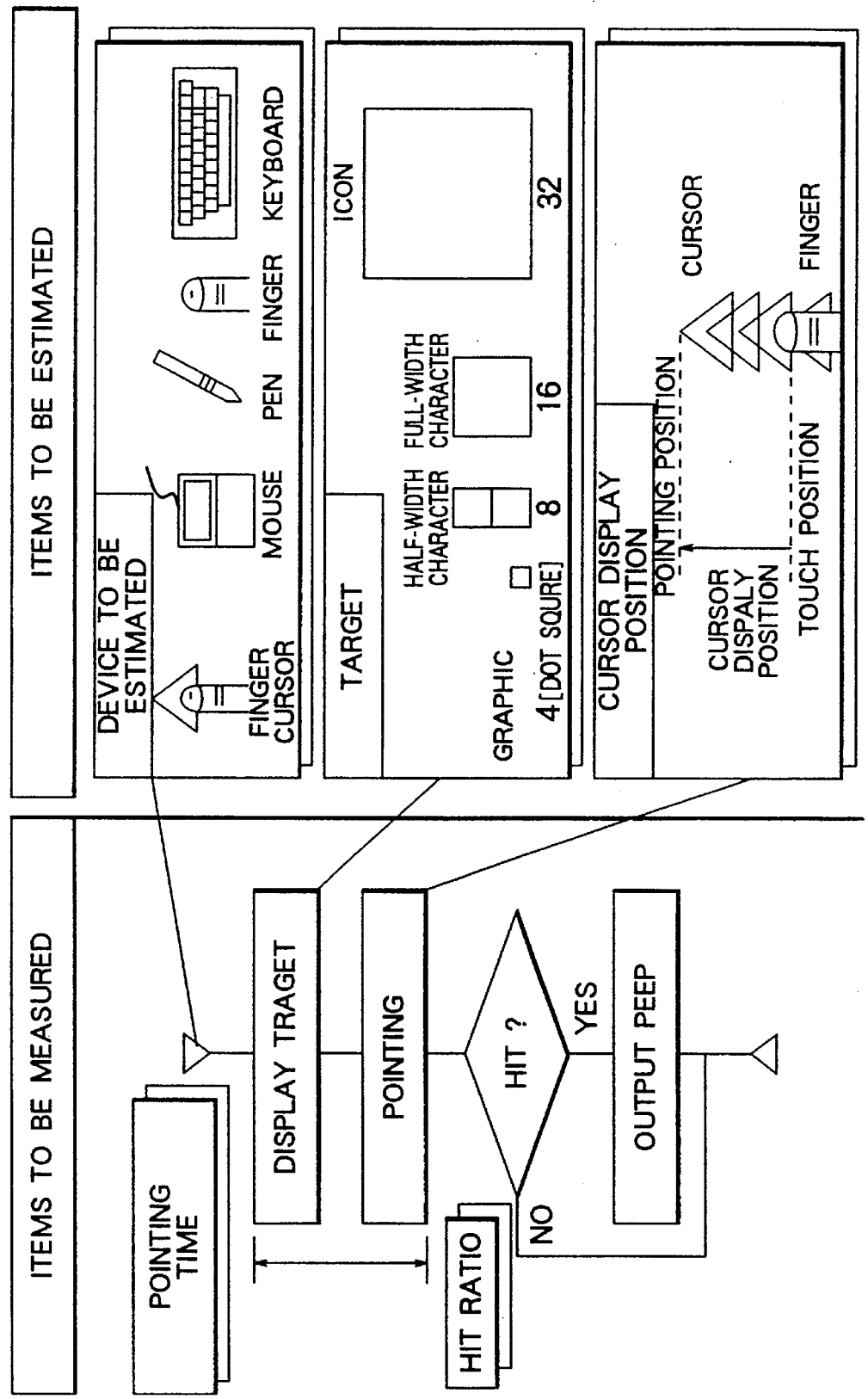
FIG. 9 is a first explanatory diagram showing the contents of experiments conducted by the present inventors.

FIG. 9 shows the method of experiments conducted by the present inventors.

In order to determine a proper value as the value of the second term of equation (3), the present inventors first measured a time required for the indication of a target figure (or a pointing time) by a cursor to make an indication based on the indication of a finger tip (hereinafter referred to as "finger cursor" for convenience' sake) in accordance with the third embodiment, as shown in FIG. 9.

Persons to be subjected to test were three inexperienced users for utilizng a finger cursor. As a display device was used a 10-inch display (640×480 dots) placed at a tilt angle of 45° to the rear of a keyboard at the heart of a desk. For each person to be subjected to the test, continuous measurement of twenty times was made three times for each of two target figures of 4×4 dots and 16×16 dots in size with a distance between a normal projection point Pv and an approximate extended projection point Pe being changed. The position of approximate extended projection point information Pe is a position which is actually indicated.

Figure 11:
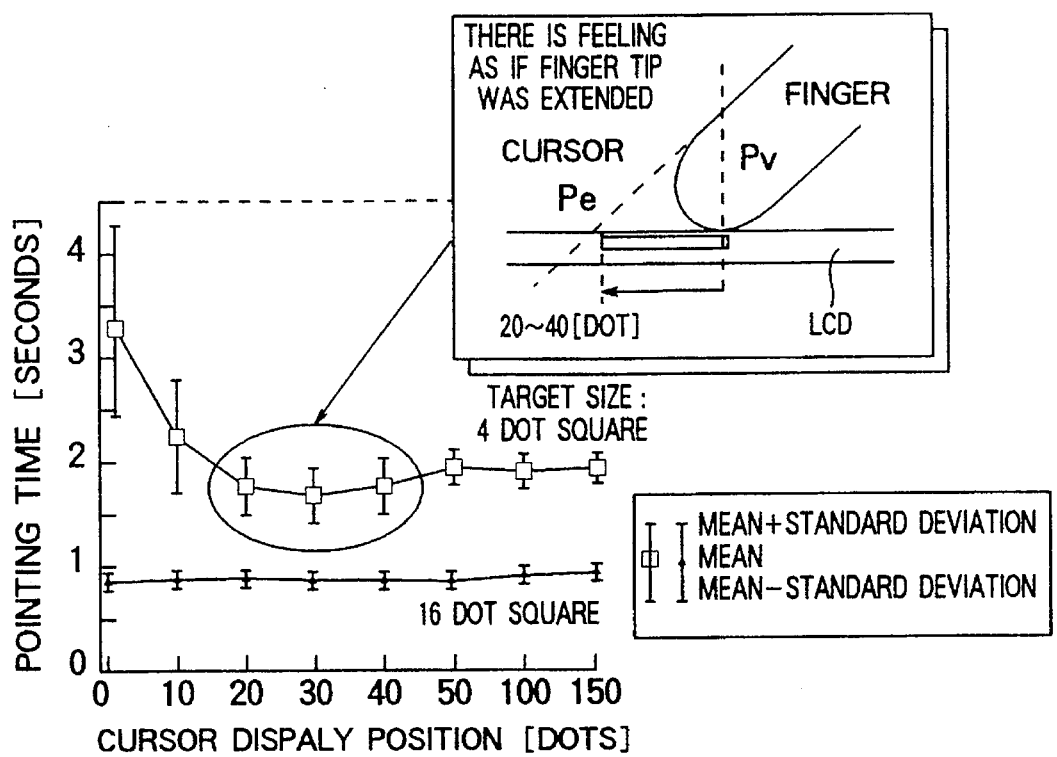
FIG. 11 is an explanatory diagram showing the first results of experiments.

The results are shown in FIG. 11. As for the 16×16 dot target figure, the pointing time has little change even with the distance between the normal projection point Pv and the approximate extended projection point Pe being changed, as shown. On the other hand, as for the 4×4 dot target figure, there were observed an area in which the pointing time is decreased, an area in which a change in pointing time is small and an area in which the pointing time is increased. The area having the small change in pointing time is an area in which the distance between the normal projection point Pv and the approximate extended projection point Pe is 20 to 40 dots, and the minimum value of the pointing time was obtained at the distance of 30 dots.

Figure 10:
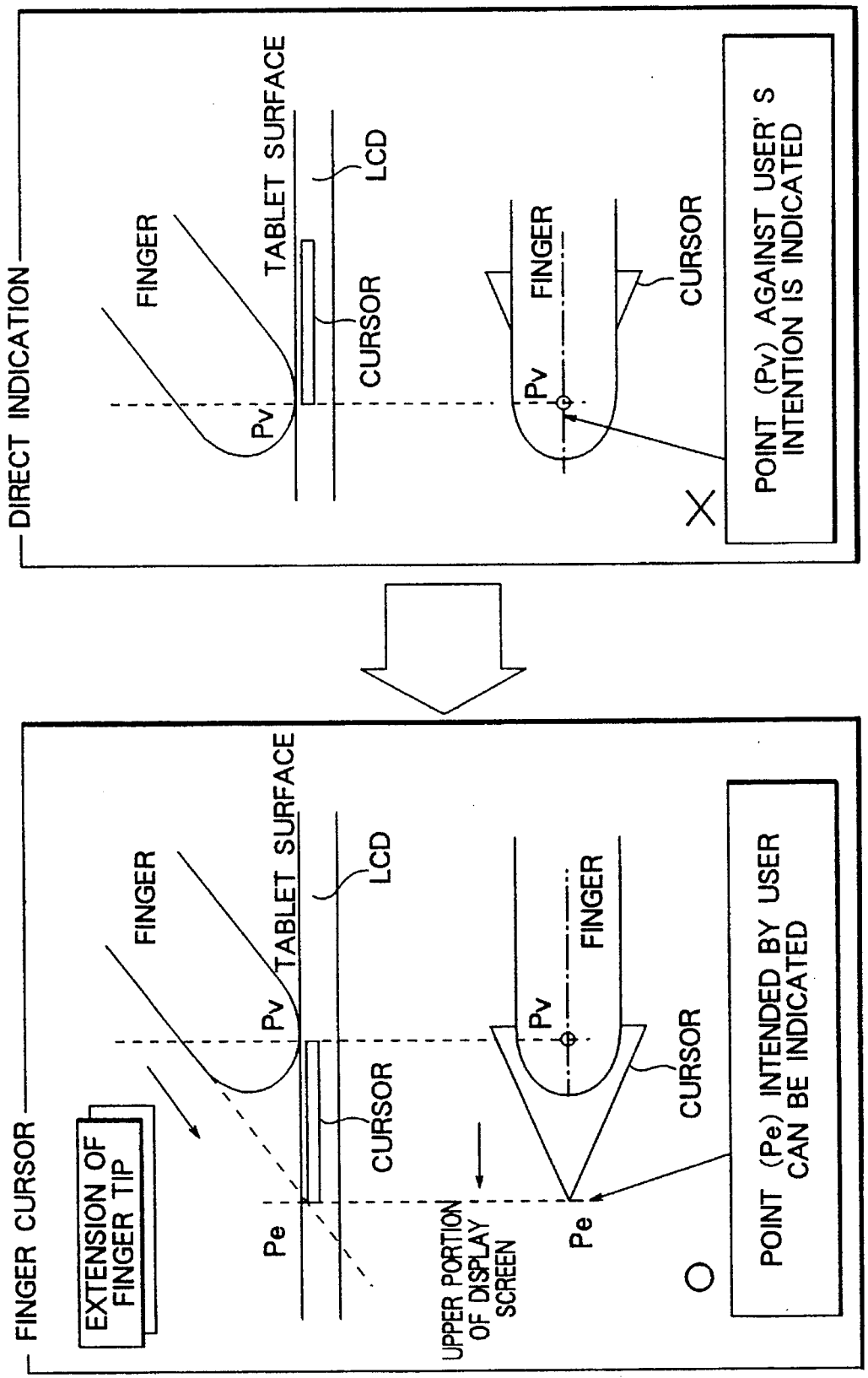
FIG. 10 is a second explanatory diagram showing the contents of experiments conducted by the present inventors.

Thus, based on the assumption that the distance between the normal projection point Pv and the approximate extended projection point Pe is proper between 20 to 40 dots and is the optimum at 30 dots, the present inventors measured a pointing time and a hit ratio, in a procedure shown in FIG. 9, for the two target figures of 4×4 dots and 16×16 dots in size with the second term of equation (3) being such that the distance between the normal projection point Pv and the approximate extended projection point Pe takes 30 dots. The hit ratio is a ratio at which the target figure could be indicated accurately. Also, for the purpose of comparison, the present inventors made similar measurement for the conventional position input methods including the direct indication of the target figure by a mouse, keyboard and finger and the direct indication of the target figure by a pen. The direct indication of the target figure by a finger is a method in which the target figure is indicated by the touch position Pv of the finger, as shown in FIG. 10. The X-axis and Y-axis components (Kx, Ky) of the adjustment information K were set to (0, 0). The conditions of persons to be subjected to test, a display device and the times of measurement were the same as those mentioned above.

Figure 12A:
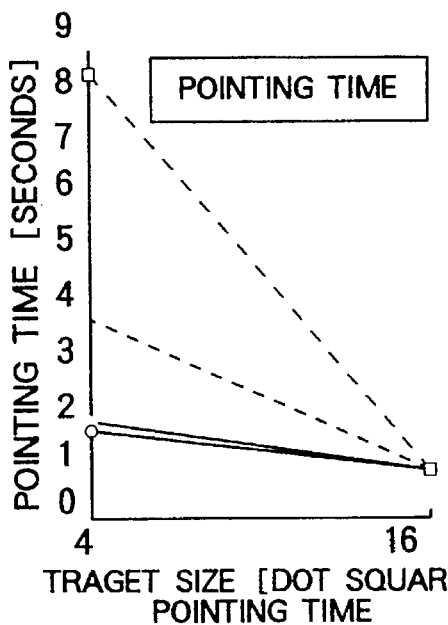
FIGS. 12A and 12B are explanatory diagrams showing the second results of experiments.
Figure 12B:
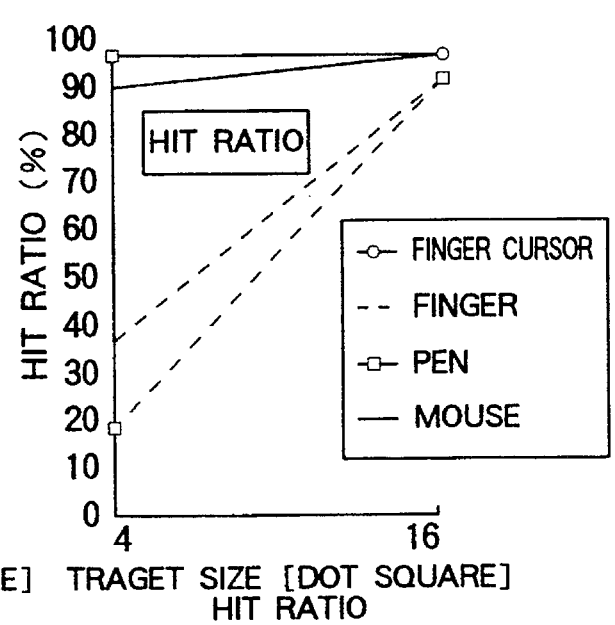

The results are shown in FIGS. 12A and 12B. Regarding the pointing time, no difference depending upon the input method was observed as for the target figure of 16×16 dots in size, as shown. As for the target figure of 4×4 dots in size, however, the indication by the finger cursor was more satisfactory than the direct indication by the pen or finger and equivalent to the direct indication by the mouse. Regarding the hit ratio too, though no difference depending upon the input method was observed as for the target figure of 16×16 dots in size, the indication by the finger cursor was more satisfactory than the direct indication by the pen or finger and equivalent to the direct indication by the mouse as for the target figure of 4×4 dots in size.

Accordingly, the input method according to the third embodiment is superior in operability to the conventional input method using a finger or a pen type indicator.

According to the third embodiment mentioned above, an approximate extended projection point of an indicator such as a finger or pen for an approximate input surface can be detected and adjusted in an operation for position indication by the indicator. Also, the approximate extended projection point can be confirmed by a cursor such as an indicator. Therefore, the apparatus is free of the influence of parallax. Further, corresponding to the condition of use, the operation for position indication can be performed with a natural feeling as if the approximate tip of the indicator was extended to the input surface. Therefore, it is possible to improve the operability of the operation for position indication or the like by the indicator such as a pen or a finger. Furthermore, since the approximate extended projection point detecting means can be realized with a simple construction, the whole of the system can be made small in size, light in weight and low in cost.

In the foregoing embodiments, the form of a cursor has been shown as a triangle. However, it may be another form such as an arrow. Also, the cursor may be displayed in an arbitrary manner, for example, in such a manner that the interior of the cursor is fully displayed or the cursor blinks. The width of the cursor may be the same as, larger than or smaller than that the width of a finger or indicator. But, if the width of the cursor may be approximately equivalent to the diameter of the indicator tip, a more natural feeling is obtained.

Also, the approximate extended point detecting means 1 or the approximate extended point detecting means 1 and the approximate extended point detecting means 6 in each embodiment constructed by the input tablet and the input controller may be integrated to form an independent input tablet device. In this case, the input tablet device is provided with output means for outputting position information of an approximate extended projection point or an adjusted approximate extended projection point to the exterior.

Coordinate transformation means in a fourth embodiment of the present invention will now be explained by use of FIGS. 13, 14, 15 and 16.

First, the system construction of coordinate transformation means in an input/output integrated information processing apparatus will be explained using FIG. 13.

Figure 13:
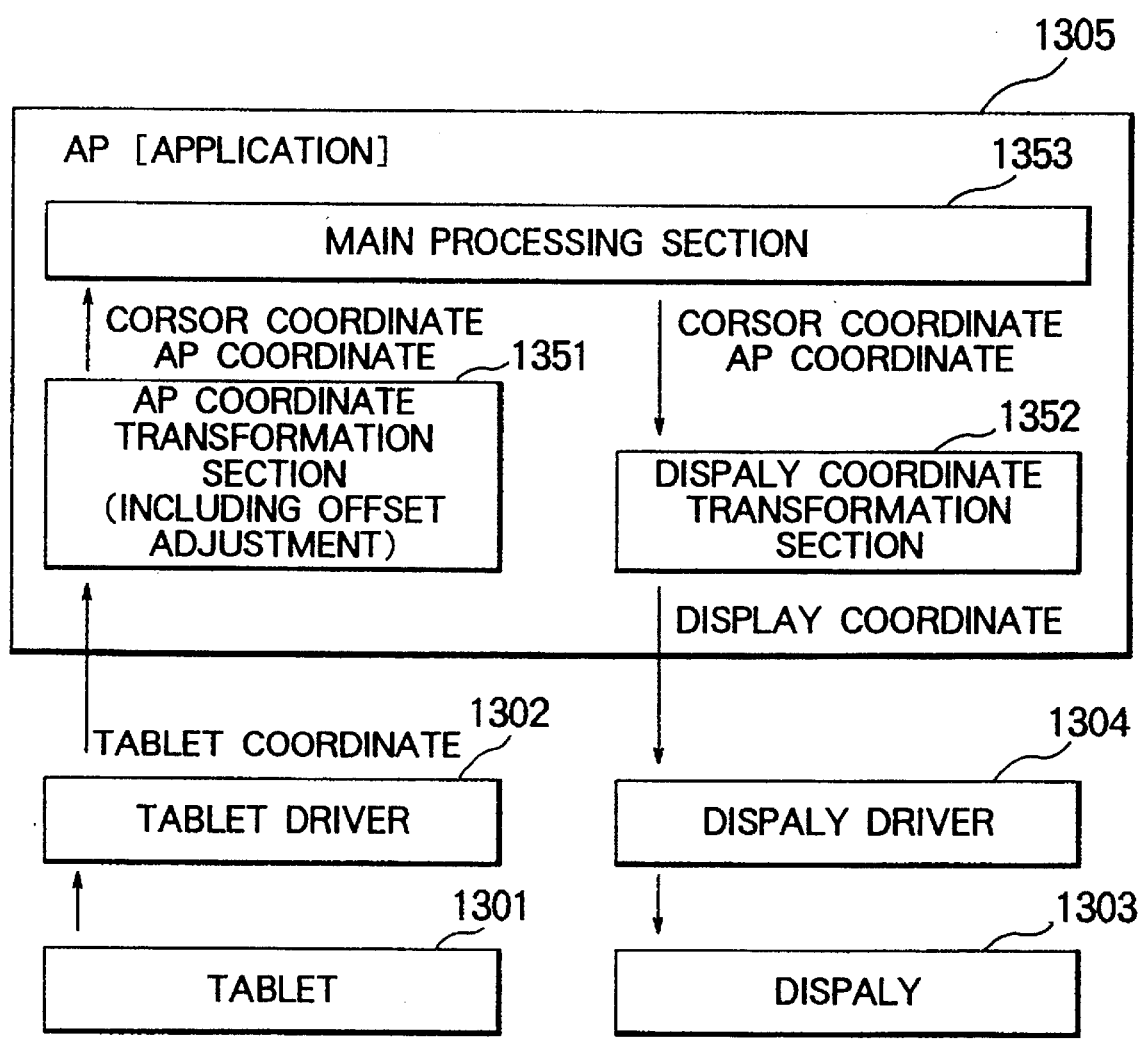
FIG. 13 is a diagram schematically showing the systematic construction of coordinate transformation means in a fourth embodiment of the present invention.

FIG. 13 shows the schematic system construction coordinate transformation means. In the figure, reference numeral 1301 denotes a tablet which is an input device for transforming an operation of indication by a finger or the like into coordinate information, numeral 1302 indicates a tablet driver for controlling the tablet, numeral 1303 represents a display device which is an output device of the information processing apparatus, numeral 1304 represents a display driver for controlling the display device, and numeral 1305 denotes an application program of the information processing apparatus (hereinafter referred to as AP). Also, numeral 1351 denotes an AP coordinate transformation section for making the transformation of a tablet coordinate into an AP coordinate and a cursor coordinate handled by a main processing section inclusive an offset adjustment, numeral 1352 indicates a display coordinate transformation section for making the transformation of the AP coordinate and the cursor coordinate into a display coordinate, and numeral 1353 represents the main processing section for the AP.

Next, the flow of a coordinate transformation processing on the schematic system construction will be explained using FIG. 14.

Figure 14:
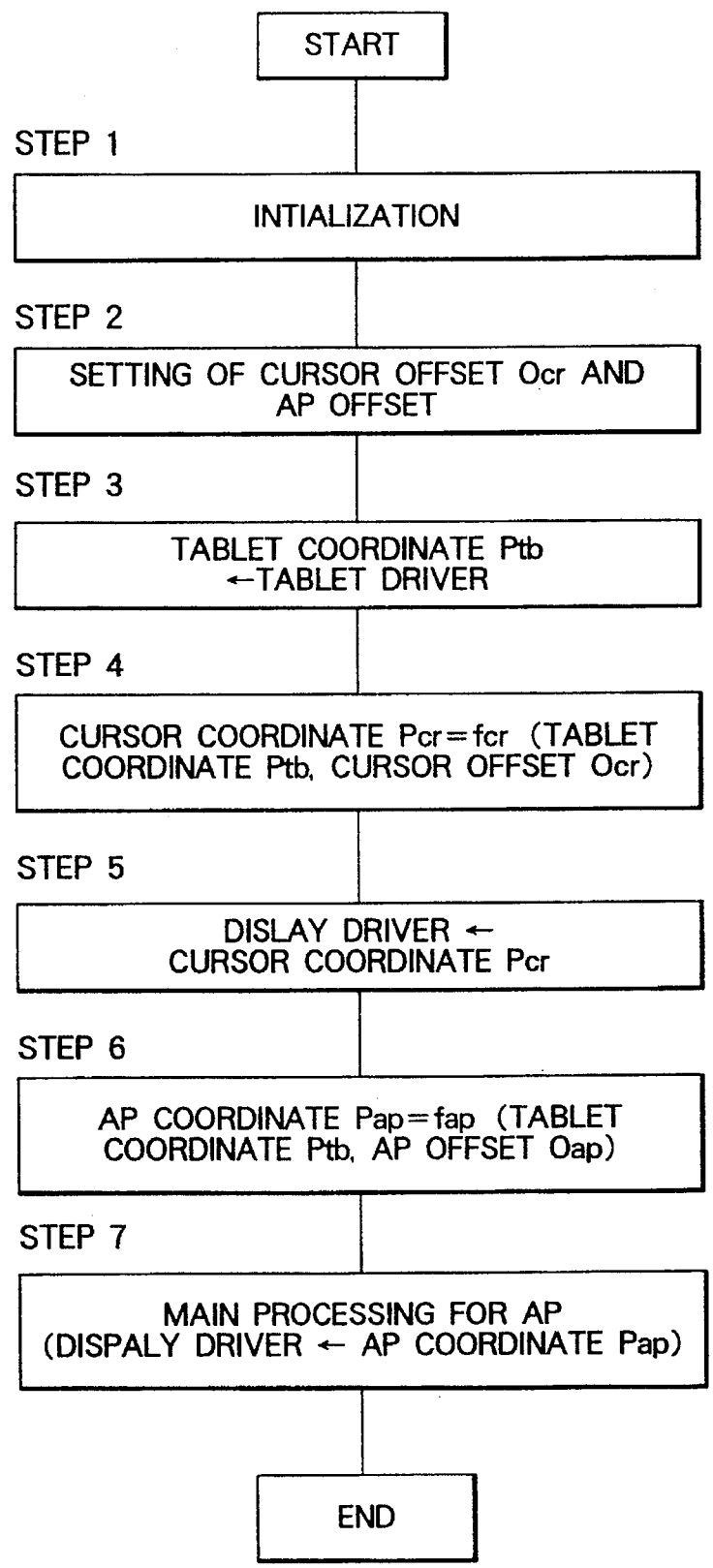
FIG. 14 shows the flow of a coordinate transformation processing in the fourth embodiment of the present invention.

FIG. 14 shows the flow of a coordinate transformation processing performed under the condition of the AP 1305.

In step 1, the initialization of the tablet 1301, the display device 1303, and so on, is made.

In step 2, offsets including a cursor offset Ocr and an AP offset Oap are set. The setting of offset is made by the setting of a standard value, the setting of a numeral value by a user, the display of a cursor followed by a finger touch by a user, and set forth.

In step 3, a tablet coordinate Ptb is acquired from the tablet 1301 through the tablet driver 1302.

In step 4, the tablet coordinate Ptb of a tablet coordinate system is transformed into a cursor coordinate Pcr of a cursor coordinate system by the AP coordinate transformation section. Also, an offset adjustment by the cursor offset Ocr is made.

In step 5, the display of the cursor at the cursor coordinate Pcr is made through the display driver 1304.

In step 6, the tablet coordinate Ptb of the tablet coordinate system is transformed into an AP coordinate Pap of an AP coordinate system by the AP coordinate transformation section. Also, an offset adjustment by the AP offset Oap is made.

In step 7, main processing for AP is performed by use of the cursor coordinate Pcr, the AP coordinate Pap and so on. Also, processing for display at the AP coordinate Pap is performed through the display driver 1304, as required.

The positional correspondence of coordinate systems in the coordinate transformation processing flow shown in FIG. 14 will now be explained using FIG. 15.

Figure 15:
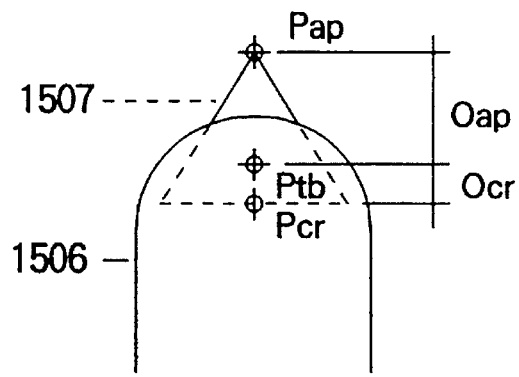
FIG. 15 is a diagram showing the positional correspondence of coordinate systems on an input/output device in the fourth embodiment of the present invention.

FIG. 15 shows the positional correspondence of coordinate systems on an input/output device in which the tablet 1301 and the display device 1303 are integrated. In the figure, reference numeral 1506 denotes a finger and numeral 1507 denotes a cursor. Also, symbol Ptb denotes an input position of the tablet, symbol Pcr a reference position of the cursor, and numeral Pap an AP input position which is a position used at the main processing section 1353 for the AP 1305. Further, symbol Ocr denotes an offset between the tablet input position and the cursor reference position, and numeral Oap denotes an offset between the tablet input position and the AP input position.

As shown, the cursor offset Ocr and the AP offset Oap exist between the tablet input position Ptb by the finger 1506 and the reference position Pcr of the cursor 1507 and between the tablet input position Ptb by the finger 1506 and the AP input position Pap, respectively. Also, the AP offset is approximately equal to a difference between the height of the cursor 1507 and the cursor offset Ocr so that the AP input position Pap is positioned at an approximate vertex of the cursor 1507.

Explanation will now be made by use of FIG. 16 in conjunction with the case where a free curve is input on the input/output device in which the tablet 1301 and the display device 1303 are integrated.

Figure 16:
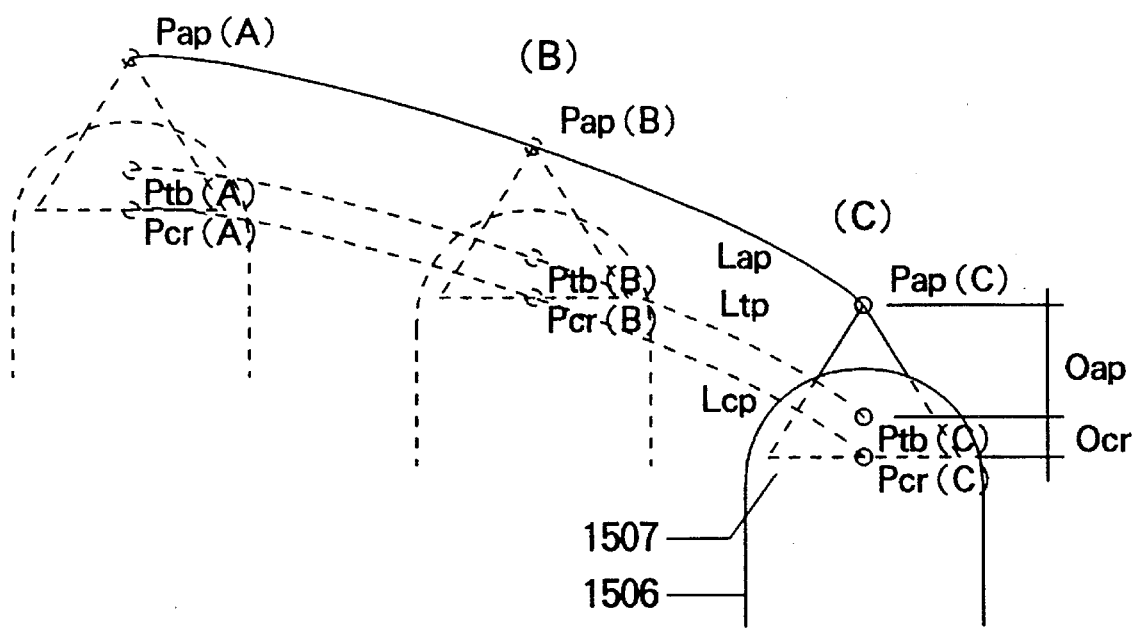
FIG. 16 is a diagram showing the input of a free line by a finger in an illustration AP in the fourth embodiment of the present invention.

FIG. 16 shows the inputting of a free curve by a finger in an illustration AP. In FIG. 16, reference symbol Ltb denotes the trace of a finger input from (A) to (C) through (B), symbol Lcr the trace of the reference position of the cursor 1507 attendant upon the finger input trace, and symbol Lap a free curve input attendant upon the input trace of the finger 1506.

As shown, a cursor offset Ocr and an AP offset Oap exist between the finger input trace Ltb and the cursor reference position trace Lcr and between the finger input position trace Ltb and the free curve Lap, respectively. Also, the free curve Lap is equal to the trace of the vertex of the cursor 1507.

In the present embodiment, each of the cursor offset Ocr and the AP offset Oap has been explained for only a Y-direction component thereof. However, it may be only an X-direction component or the combination of the X-direction component and the Y-direction component.

Also, in the present embodiment, the form of the cursor has been explained in conjunction with the case where it is an approximately equilateral triangle. However, the present invention is not limited to such a case.

According to the present embodiment, in an operation for position indication by a pen, finger or the like, any offset can be provided between an input position of the pen, finger or the like and a processing position of AP. A mere direct indication of any position enables the position indication with a natural feeling as if the finger tip or the like was extended. Therefore, it is possible to improve the operability of the operation for position indication, or the like, by a pen, finger or the like.

Coordinate transformation means in a fifth embodiment of the present invention will now be explained by use of FIG. 17.

The positional correspondence of coordinate systems in an input/output integrated information processing apparatus different from the fourth embodiment will be explained using FIG. 17. FIG. 17 shows the positional correspondence of coordinate systems on an input/output device in which the tablet 1301 and the display device 1303 are integrated. In the figure, reference numeral 1511 denotes an input area of the tablet and numeral 1531 denotes a display area of the display device. In order to facilitate the input of all points on the display area 1531, the input area 1511 is made larger than the display area 1531.

Figure 17:
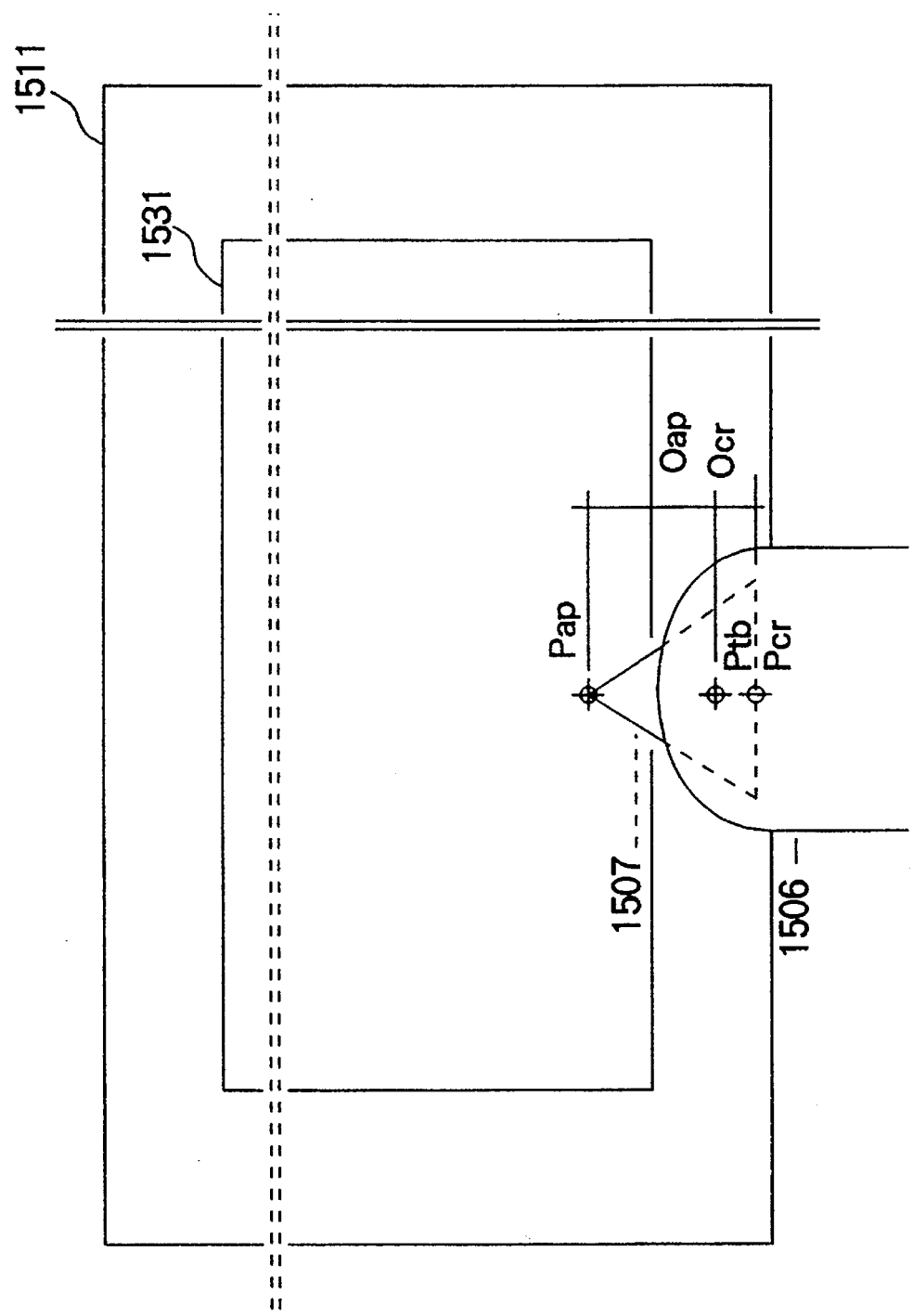
FIG. 17 is a diagram showing the positional correspondence of coordinate systems on an input/output device in a fifth embodiment of the present invention.

When the lower periphery of the display area is to be indicated, the lower periphery of the input area, which does not overlap the display area, is indicated by the finger 1506, as shown in FIG. 17.

In the present embodiment, as for four peripheries or the upper, lower, right and left peripheries, the input area is made larger than the display area. However, it is only necessary that this requirement is satisfied as for one or more peripheries.

According to the present invention, in an operation for position indication by a pen, finger or the like, any offset can be provided between an input position of the pen, finger or the like and a processing position of AP. Even in the vicinity of the periphery of an effective area of a display device, a mere direct indication of any position enables the position indication with a natural feeling as if the finger tip or the like was extended. Therefore, it is possible to improve the operability of the operation for position indication or the like by a pen, finger or the like.

Also, the present embodiment, in which the input area is made larger than the display area as for four peripheries or the upper, lower, right and left peripheries, is effective for the improvement of the operability of the operation for position designation or the like by a pen, a finger or the like from four directions as in the case where the length and breadth of display are changed over or in the case where two or more operators perform operations from respective directions.

Figure 18:
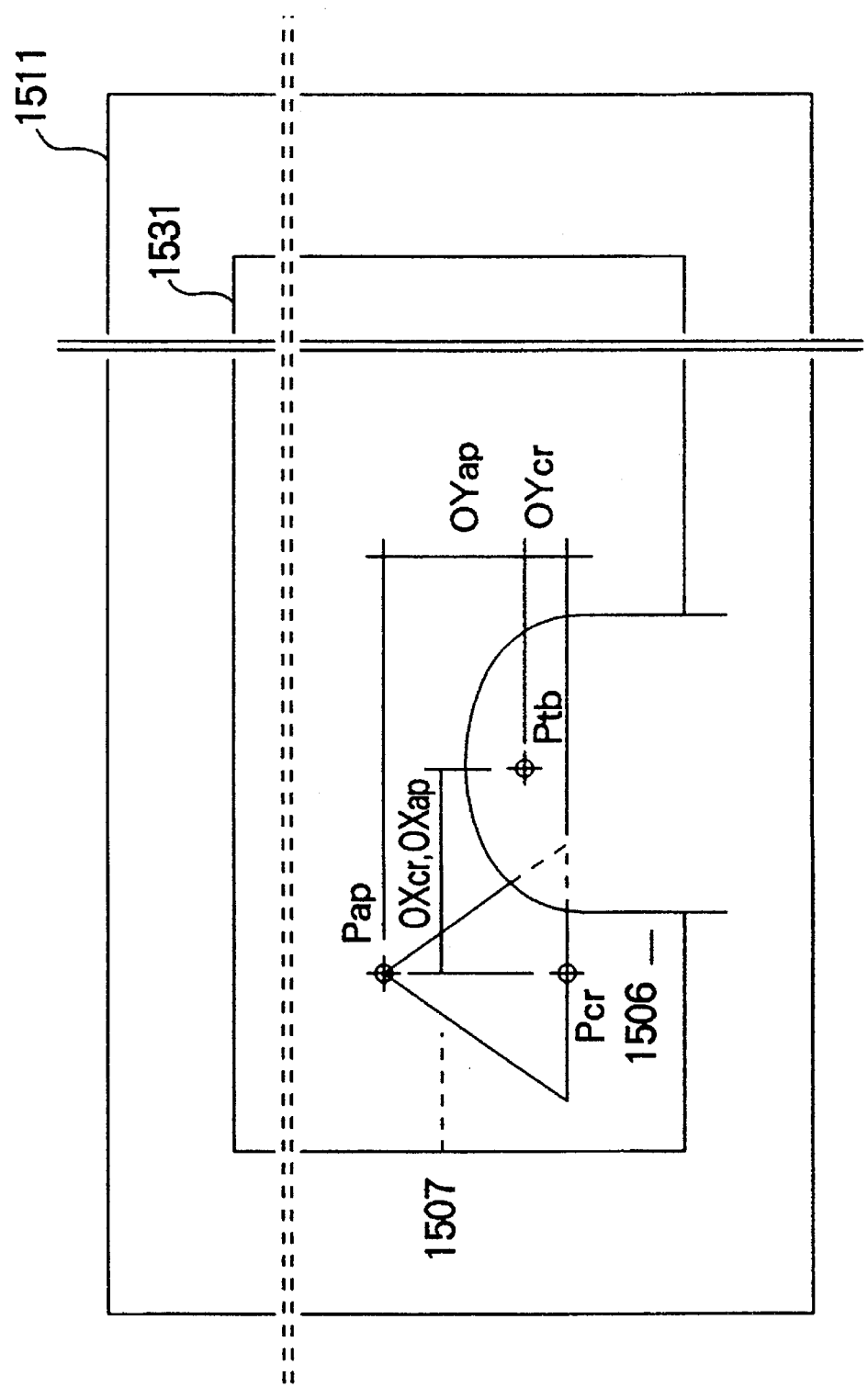
FIG. 18 is a diagram showing the positional correspondence of coordinate systems on an input/output device in a sixth embodiment of the present invention.

Coordinate transformation means in a sixth embodiment of the present invention will now be explained by use of FIG. 18.

The positional correspondence of coordinate systems in an input/output integrated information processing apparatus different from the fourth embodiment will be explained using FIG. 18. FIG. 18 shows the positional correspondence of coordinate systems on an input/output device in which the tablet 1301 and the display device 1303 are integrated. In the figure, reference numeral 1511 denotes an input area of the tablet and numeral 1531 denotes a display area of the display device. Also, reference symbols OXcr and OYcr respectively denote the x and Y components of a cursor offset, and symbols OXap and OYap respectively denote the X and Y components of an AP offset.

When the left periphery of the display area is to be indicated, a cursor 1507 is displayed on the left side of the finger 1506, as shown in FIG. 17. More particularly, the X component OXcr of the cursor offset and the X component OXap of the AP offset are adjusted.

In the present embodiment, the explanation has been made in conjunction with the left periphery. However, similar processing can also be performed for another periphery.

According to the present invention, in an operation for position indication by a pen, finger or the like, any offset can be provided between an input position of the pen, finger or the like and a processing position of As. Even in the vicinity of the periphery of an effective area of a display device, a mere direct indication of any position enables the position indication with a natural feeling as if the finger tip or the like was extended. Therefore, it is possible to improve the operability of the operation for position indication or the like by a pen, a finger or the like.

Coordinate transformation means in a seventh embodiment of the present invention will now be explained by use of FIG. 19.

The positional correspondence of coordinate systems in an input/output integrated information processing apparatus different from the fourth embodiment will be explained using FIG. 19.

Figure 19:
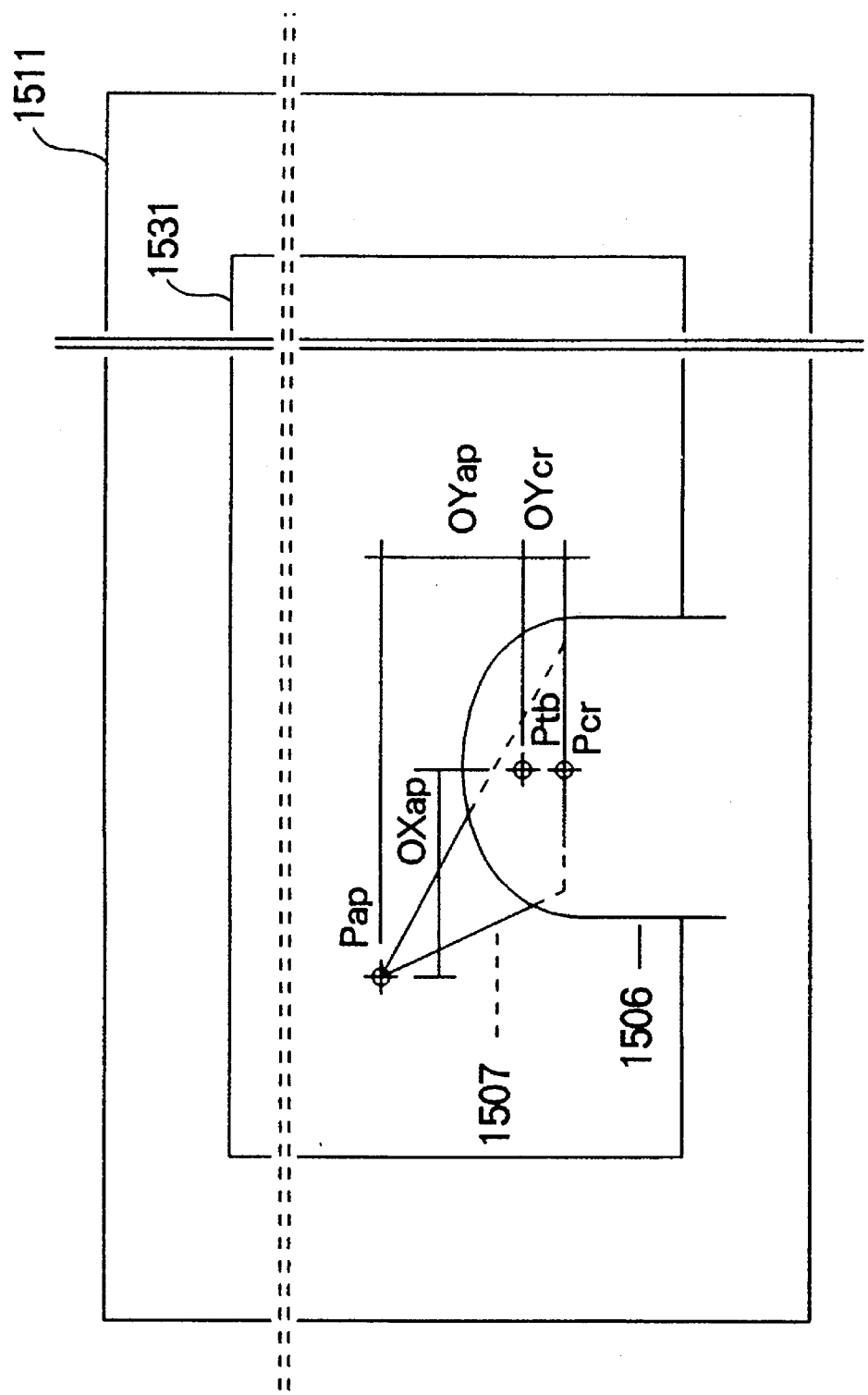
FIG. 19 is a diagram showing the positional correspondence of coordinate systems on an input/output device in a seventh embodiment of the present invention.

FIG. 19 shows the positional correspondence of coordinate systems on an input/output device in which the tablet 1301 and the display device 1303 are integrated. In the figure, reference numeral 1511 denotes an input area of the tablet and numeral 1531 denotes a display area of the display device. Also, reference symbol OYcr denotes the Y component of a cursor offset, and symbols OXap and OYap respectively denote the X and Y components of an AP offset.

When the left periphery of the display area is to be indicated, a cursor 1507 is displayed on the left side of the finger 1506, as shown in FIG. 17. More particularly, the form of the cursor and the X component OXap of the AP offset are adjusted.

In the present embodiment, the explanation has been made in conjunction with the left periphery. However, similar processing can also be performed for another periphery.

According to the present invention, in an operation for position indication by a pen, finger or the like, any offset can be provided between an input position of the pen, finger or the like and a processing position of AP. Even in the vicinity of the periphery of an effective area of a display device, a mere direct indication of any position enables the position indication with a natural feeling as if the finger tip or the like was extended. Therefore, it is possible to improve the operability of the operation for position indication or the like by a pen, finger or the like.

In the fourth to seventh embodiments as mentioned above, explanation has been made in conjunction with the position indication by a finger. However, the similar can also be performed for the position indication by another element such as a pen.

Also, though the explanation has been made in conjunction with the case where the form of a cursor is a triangle, it may be another form. As for the display of the cursor such the full display of the interior of the cursor or the blinked display of the cursor, another displaying manner can be used similarly. Further, though the explanation has been made in conjunction with the case where the width of the cursor is smaller than the width of a finger, the former may be the same as or larger than the latter. Furthermore, though the explanation has made in conjunction with the case where the number of cursors is one, the number of cursors may be plural.

Figure 20:
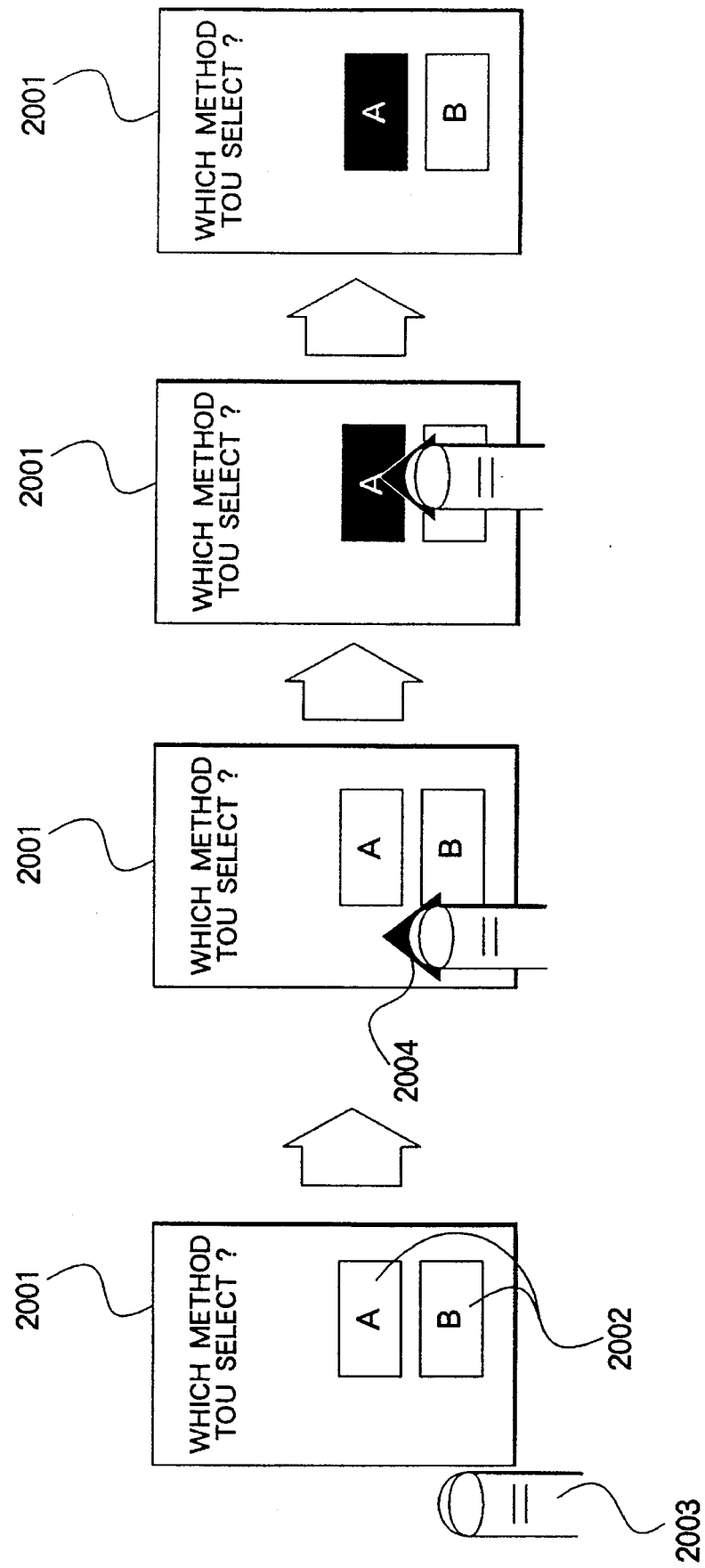
FIG. 20 is a diagram for explaining the operation of selection according to the present invention.

Next, an embodiment of the present invention will be explained by use of FIGS. 20 to 24. FIG. 20 concerns an example of the operation of a display information indicating method in the present embodiment. FIG. 20 shows a display screen of an information processing apparatus having a (display/input integrated) structure in which an input section and a display section are superimposed. In FIG. 20, reference numeral 2001 denotes display information on the display screen, numeral 2002 a button for selecting a function in the display information 2001, numeral 2003 an indicating portion (or a finger), and numeral 2004 a cursor for representing an extended projection point.

Figure 21:
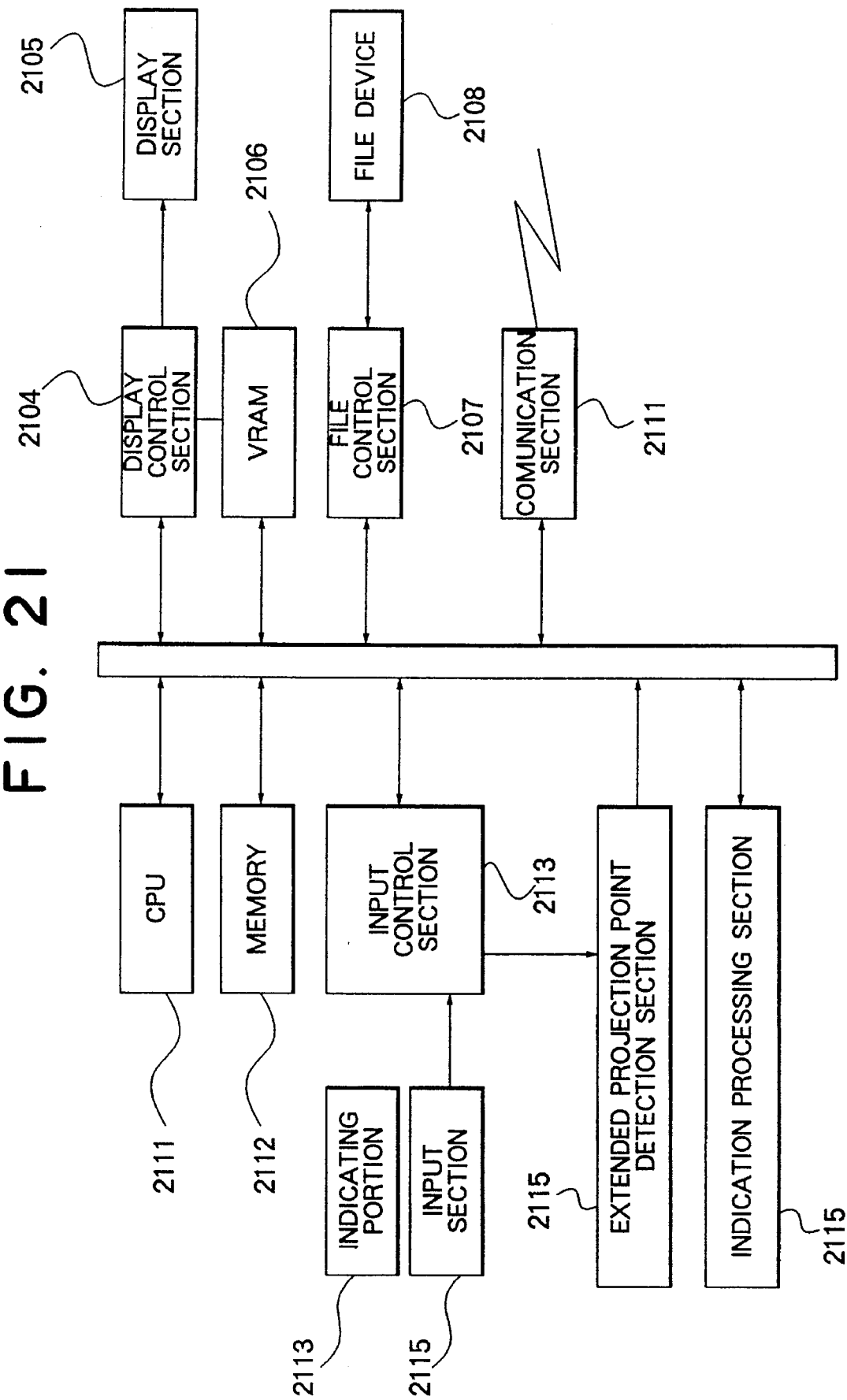
FIG. 21 is a block diagram showing the construction of an entire information processing apparatus to which the present invention is applied.

FIG. 21 is a block diagram of the information processing apparatus. In FIG. 21, reference numeral 2111 denotes a CPU (central processing unit) for controlling the whole of the apparatus, and numeral 2112 denotes a memory such as a RAM (random access memory) or a ROM (read only memory) for storing programs or data. Numeral 2113 denotes an input control section for making a coordinate detection function of an input section 2119, numeral 2104 indicates a display control section for making a control so that display data stored in a VRAM (video RAM) 2106 represents is displayed on a display section, numeral 2105 indicates the display section for such as a liquid crystal display or a CRT, and numeral 2106 denotes the VRAM for storing display data. Numeral 2107 denotes a file control section for controlling the reading/writing of data from/into a file device 2108, and numeral 2108 denotes the file device for such as a floppy disk device, a hard disk device or an IC memory card device. Numeral 2119 denotes the input section such as an electrostatic capacitance type input panel or a resistance film type input panel, numeral 2113 indicates an indicating portion such as a finger or a pen for inputting an indication position to the input section, and numeral 2110 represents communication means such as LAN, telephone, facsimile, modem. Numeral 2115 denotes an extended projection point detecting section for detecting an extended projection point. In the present embodiment, the extended projection point detecting section 2115 is realized by software and performed by the CPU 2111. Numeral 2116 denotes an indication processing section which is realized by software and performed by the CPU 2111, in the present embodiment.

Figure 22:
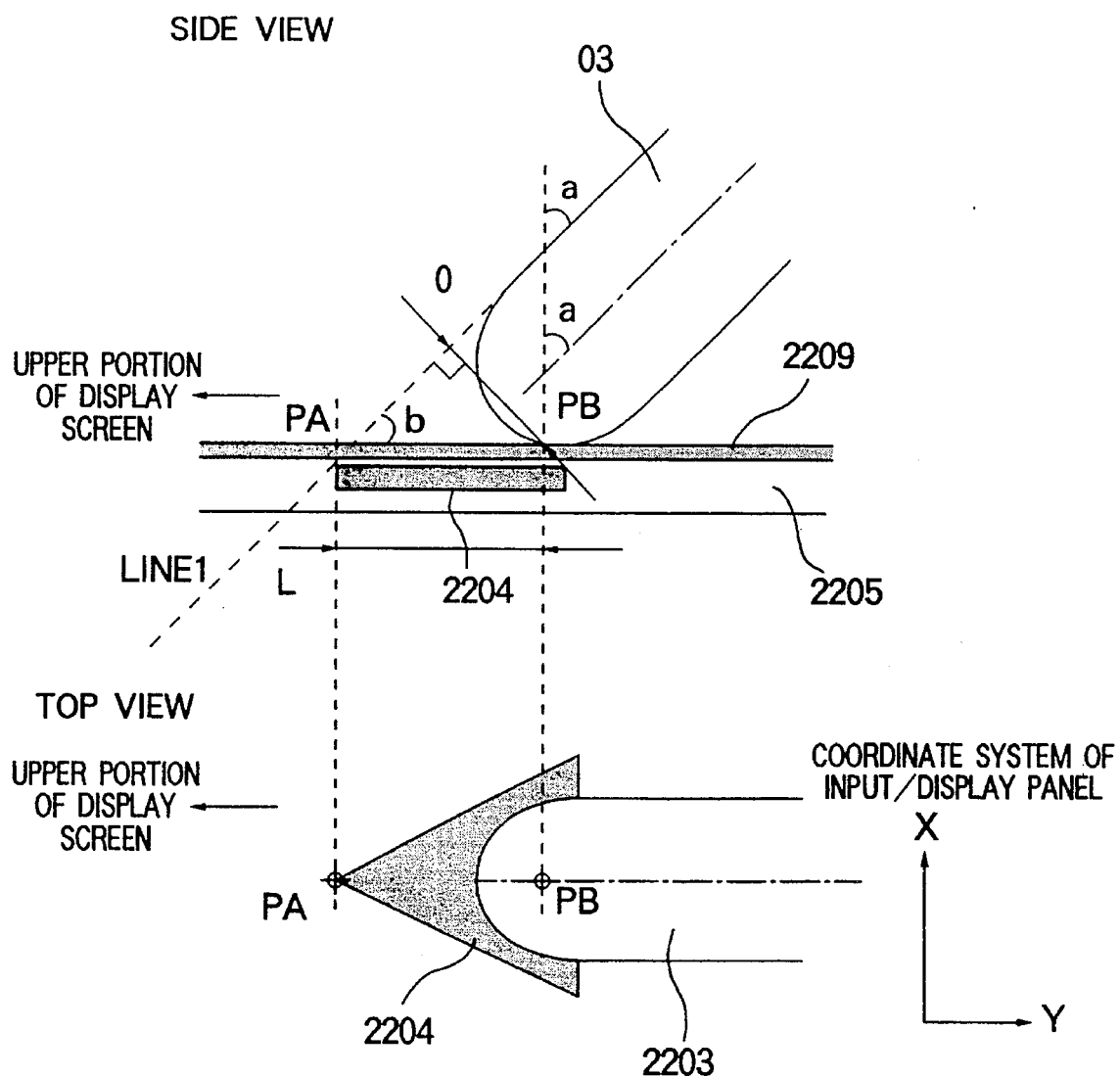
FIG. 22 is an explanatory view showing the system for detection by an extended projection point detecting section.

FIG. 22 is a view for explaining the principle of a system for detection of an extended projection point which is the essence of the present invention. In FIG. 22, reference numeral 2203 denotes an indicating portion such as a finger, numeral 2204 indicates a cursor for representing an extended projection point, and numerals 2205 and 2209 indicate a display integrated panel.

Figure 23:
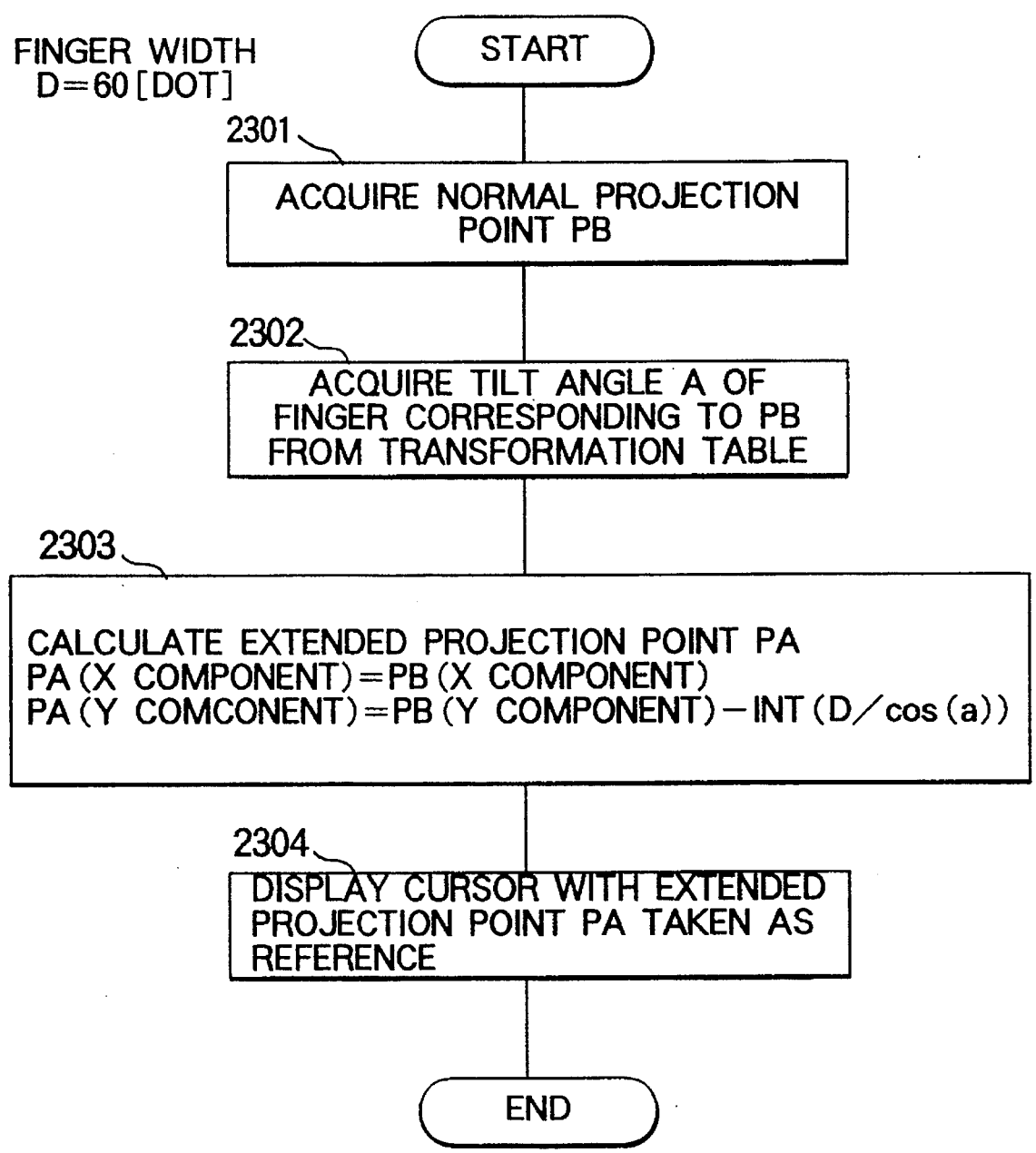
FIG. 23 is a flow chart of the procedure of operation of the extended projection point detecting section.

FIG. 23 is a flow chart of the procedure of operation of an extended projection point detecting section 2205 (see FIG. 22). In the present embodiment, the extended projection point detecting section 2205 is realized by a program which is executed by the CPU 2111. However, there is possible a construction in which a part or the whole of the extended projection point detecting section 2205 is realized by a dedicated hardware.

Figure 24:
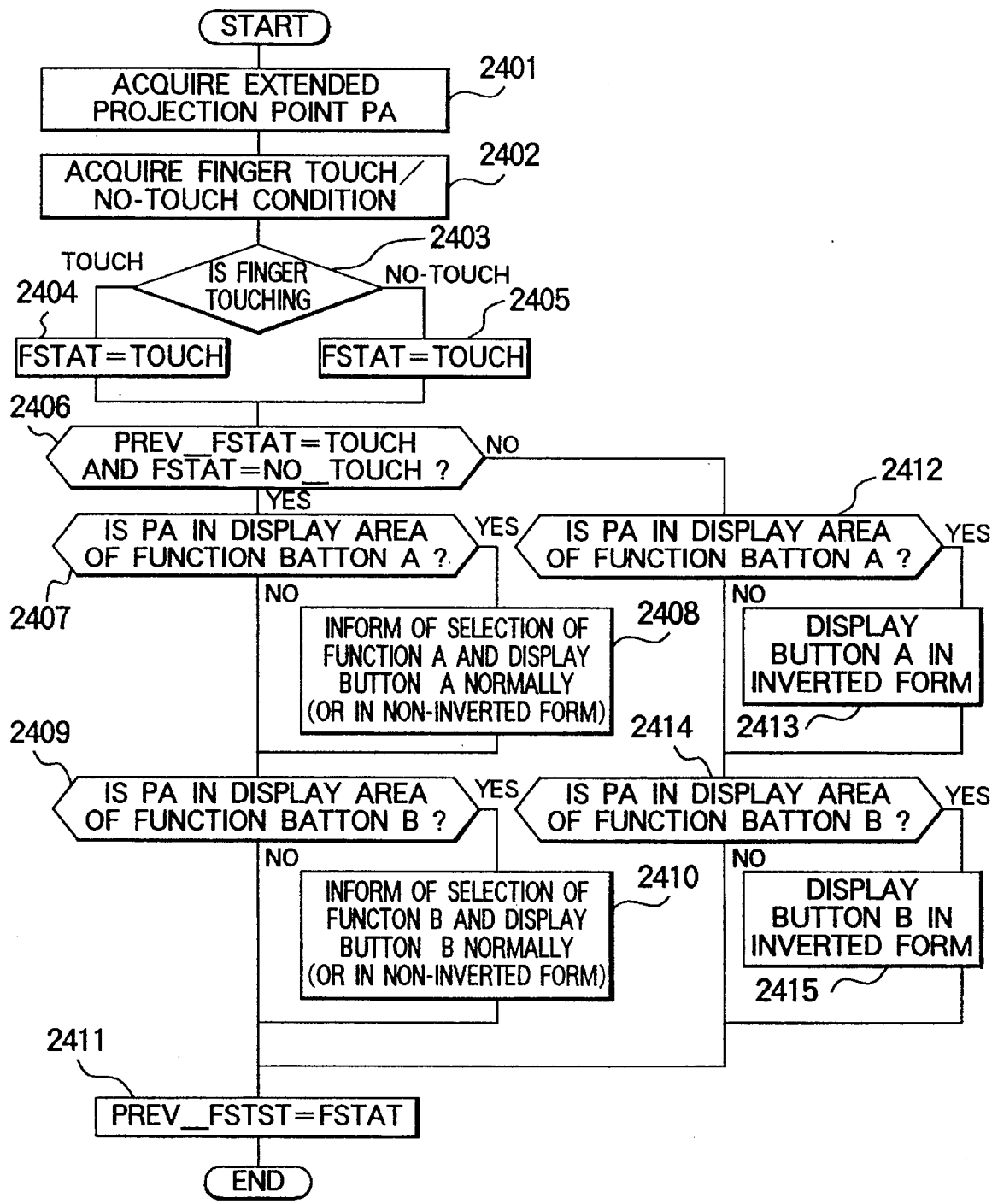
FIG. 24 is a flow chart of the procedure of operation of an indication processing section.

FIG. 24 is a flow chart of the procedure of operation of the indication processing section 2116. In the present embodiment, the indication processing section 2116 is realized by a program which is executed by the CPU 2111. However, there is possible a construction in which a part or the whole of the extended projection point detecting section 2205 is realized by a dedicated hardware.

In the following, the operation of the present invention will be explained in references to FIG. 24. FIG. 24 shows a state in which the indicating portion (or finger) 2111 is performing an indicating operation by use of the input section 2119. The point of intersection of an indicating extension line (or indicating direction line) LINE 1 representing an indicating direction of the indicating portion 2113 and the input section 2119 is an extended projection point PA which is an indicating point intended by a user. The input section 2119 in the present embodiment detects the coordinate of a point at which it contacts the indicating portion 2113 (or a normal projection point PB). The extended projection point detecting section 2115 makes the detection of the extended projection point PA on the basis of the normal projection point ss. In the present embodiment, the detection by the input section 2119 and the extended projection point detecting section 2115 is realized by a processing performed by the CPU 2111.

The operation of the extended projection point detecting section 2115 will be explained in reference FIG. 24. A processing shown in FIG. 24 (or an extended projection point detection processing) is activated periodically by a timer or the like or a periodicals bs the generation of a specified condition or the like. A finger width D and a transformation table (see FIG. 46) used in step 2302 are set at the time of turn-on of a power supply before the processing of FIG. 23 is started. The finger width D may be set by using a preset value or by detecting the finger width of a user. When the extended projection point detection processing is activated, (the X and Y components of) a normal projection point PB detected by the input section 2119 is acquired (step 2301). In the present embodiment, a coordinate system at the input section 2119 is determined beforehand as shown in FIG. 47. Next, the extended projection point detecting section 2115 acquires the corresponding tilt angle a of the finger from the normal projection point PB by use of the transformation table (step 2302). Namely, the tilt of the indicator (or finger) is estimated from the magnitude of the Y component of the acquired normal projection point PB. In step 2303, (the X and Y components of) an extended projection point PA is determined from the X and Y components of the normal projection point PB and the estimated finger tilt angle a. INT(x) represents a function by which fractions of E below the decimal point are omitted. In step 2304, there is displayed a cursor (2204 in FIG. 22) which has the extended projection point PA as a reference (or points the extended projection point PA).

With the above processing, it becomes possible to detect an extended projection point PA from a normal projection point PB capable of being detected by the input section 2209 shown in FIG. 22, and the cursor 2104 is displayed with the extended projection point PA being taken as a reference. (The display is not limited to the cursor display. An emphasized display such as the display of the extended projection point PA with a different brightness may be used.)

Figure 42:
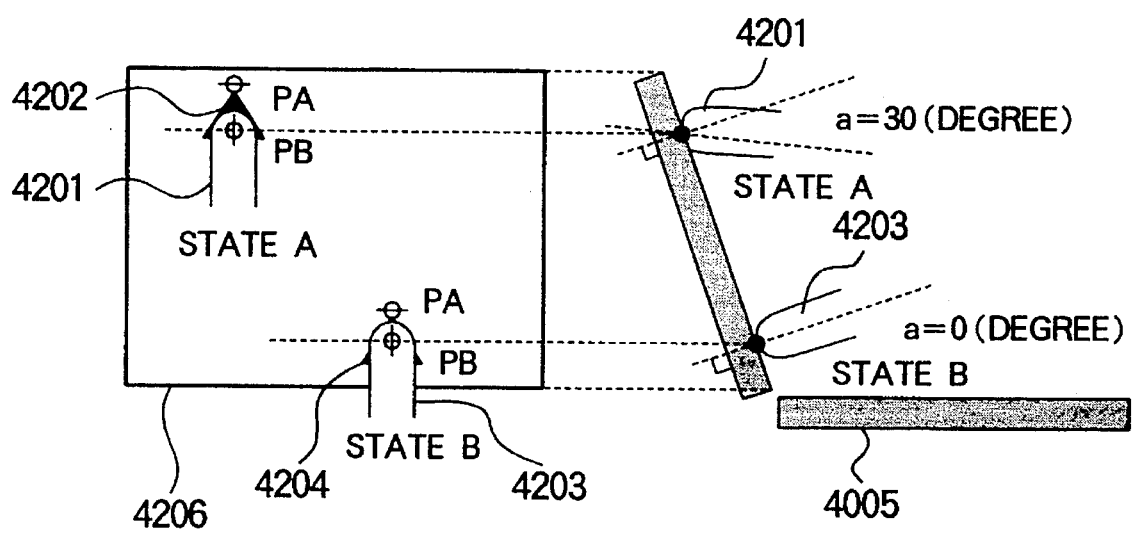
FIG. 42 is a view for explaining an extended projection point detection processing.

A cursor displayed by the extended projection point detection processing is shown in FIG. 42. When an indicating portion 4201 is positioned at an upper portion of an input section 4206 or the Y component of PB is 0 to 100 (state A), a cursor 4202 is displayed estimating the tilt angle a of the finger as being 30°. When an indicating portion 4203 is positioned at a lower portion of the input section 4206 or the Y component of PB is 301 to 399 (state B), a cursor 4204 is displayed estimating the tilt angle a of the finger as being 0°.

The processing shown in FIG. 23 may be performed in such a manner that the tilt angle b (see FIG. 22) is acquired referring to a transformation table for determining the tilt angle b (step 2302) and the extended projection point PA is calculated using sin (b) in lieu of cos (a) (step 2303).

Next, the operation when two functions are selected will be explained, as an example of the indication of characters/figures and the selection of functions/items, in reference to FIGS. 20 and 24. FIG. 24 is a chart showing the procedure of operation of the indication processing section 2116 (see FIG. 21) which realizes the selecting function. A processing shown in FIG. 24 is activated periodically by a timer or the like or a periodically by the generation of a specified condition.

First, an extended projection point PA detected by the extended projection point detecting section is acquired (step 2401). In step 2402, there is acquired information regarding whether or not an indicating portion 2403 such as a finger is touching an input section 2409 (or touch condition information). In steps 1403 to 2405, the touch/no-touch of the input section 2409 and the indicating portion 2403 is set for a flag FSTAT.

In step 2406, detection is made of whether or not the touch condition of the input section 2409 and the indicating portion 2403 is changed from touch to notouch. When the condition of step 2406 is satisfied (or in the case where the touch condition is changed from touch to no-touch), the judgement is made as to whether or not the extended projection point PA is in a display area of a display button A (step 2407). When the extended projection point PA is in the display area, a system application or the like is informed of the selection of a function A (step 2408) and then the flow proceeds to step 2409.

In step 2409, judgement is made as to whether or not the extended projection point PA is in a display area of a display button A. When the extended projection point PA is in the display area, a system application or the like is informed of the selection of a function B (step 2410) and then the flow proceeds to step 2411.

In step 2411, the information of present touch/non-touch is saved to FSTAT.

When the condition of step 2406 is not satisfied (or in the case where the touch condition is not changed from touch to no-touch), there is performed an inverted display processing of the display area of the function button A/B when the extended projection point PA enters the display area of the button A/B (steps 2412 to 2415).

With the above processing, the operation shown in FIG. 20 is realized. Namely, when a finger 2003 touches an input panel 2001 (or the finger 2003 takes an approximate touch condition in which it approaches the input panel to a distance not longer than a predetermined threshold value), a cursor 2004 representing an extended projection point indicated by a user is displayed. When the cursor 2004 enters the display area 2002 of the button of the function A or B (or a button area), the display of the corresponding button area is inverted. When the finger 2003 is brought into a no-touch condition with the cursor 2004 remaining in the button area, the corresponding function is selected. FIG. 20 shows a state in which the function A is selected.

According to the present embodiment as mentioned above, it becomes possible to accurately detect and indicate an object such as a function button to be indicated which is in an indicating direction intended by a user. As a result, a possibility of an indication of an erroneous object is reduced, thereby improving the reliability.

In FIG. 24, the detection is made regarding whether or not the touch condition is changed from touch to notouch.

Further, a depressing pressure in the contact condition may be detected. When the pressure is changed, there is performed a processing similar to when the touch condition is changed from touch to no-touch.

Next, another embodiment of the present invention will be explained in reference to FIGS. 25 to 34. FIGS. 25 to 34 show an example of an operating display screen in an application utilizing communication functions such as telephone, facsimile and so on.

Figure 25:
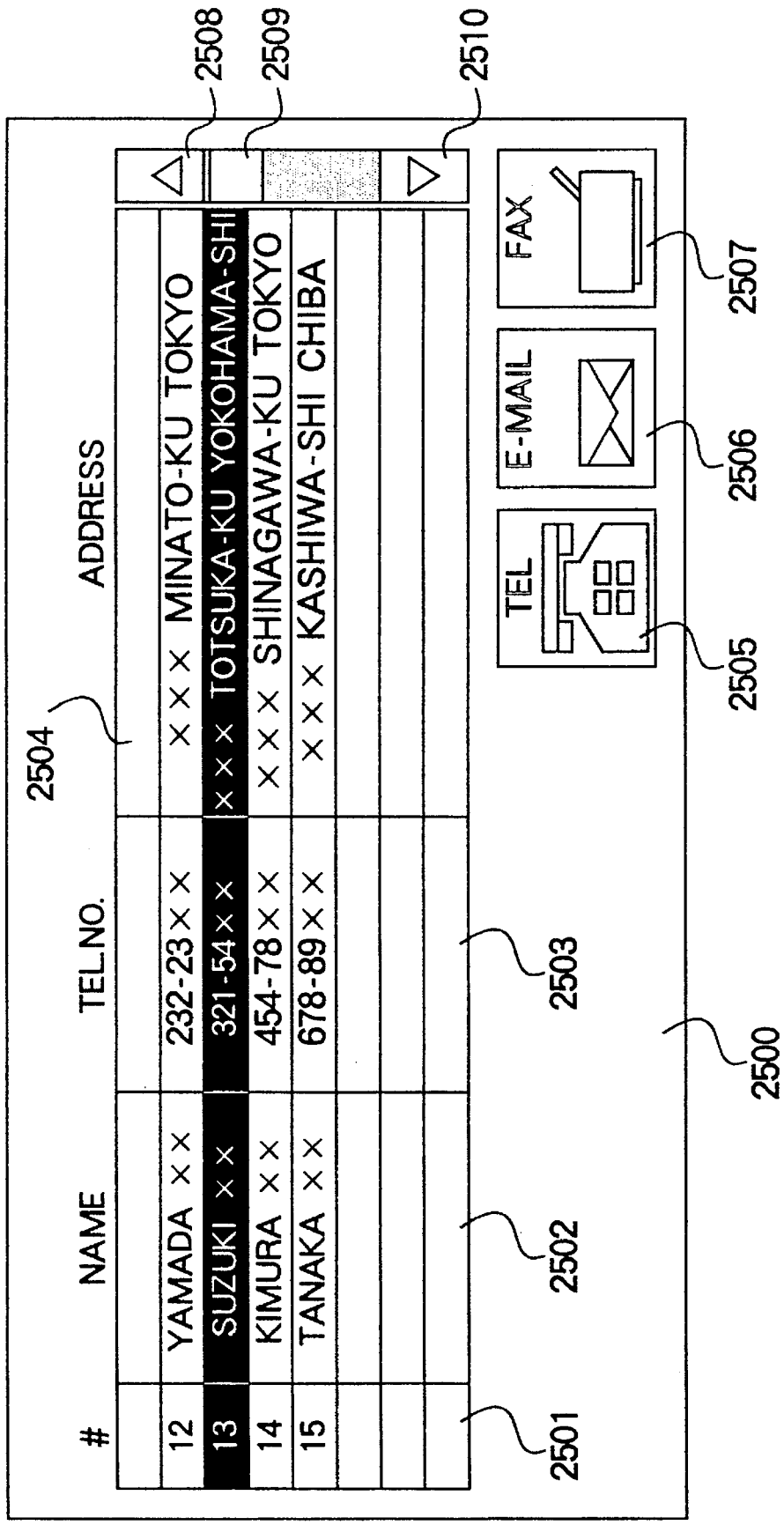
FIG. 25 is a view for explaining an example of a display screen in an application (address book)

In FIG. 25, reference numeral 2500 denotes a display screen of an information processing apparatus and numeral 2501 denotes an item number column of an address book in which data such as (full) names, addresses, telephone numbers and so on is stored. Numeral 7Fnv denoter a name column of the address book numeral 2503 a telephone number column, and numeral 2504 an address column. Numeral 2505 denotes a telephone function selecting button, numeral 2506 an electronic mail function selecting button, and numeral 2507 a facsimile function selecting button. Numerals 2508, 2509 and 2510 denote buttons for scrolling the address book to display data desired by a user. Though the finger 2203 and the cursor 2204 are not shown particularly in FIG. 25, a processing similar to that in the foregoing embodiment (including FIG. 21) is realized by the extended projection point detecting section 2115 and the indication processing section 2116. (This also holds for FIGS. 26 to 34.) Thus, it becomes possible to indicate and display an object to be indicated which is intended by the user. FIG. 25 shows a state in which the item 13 is selected from the address book.

Figure 26:
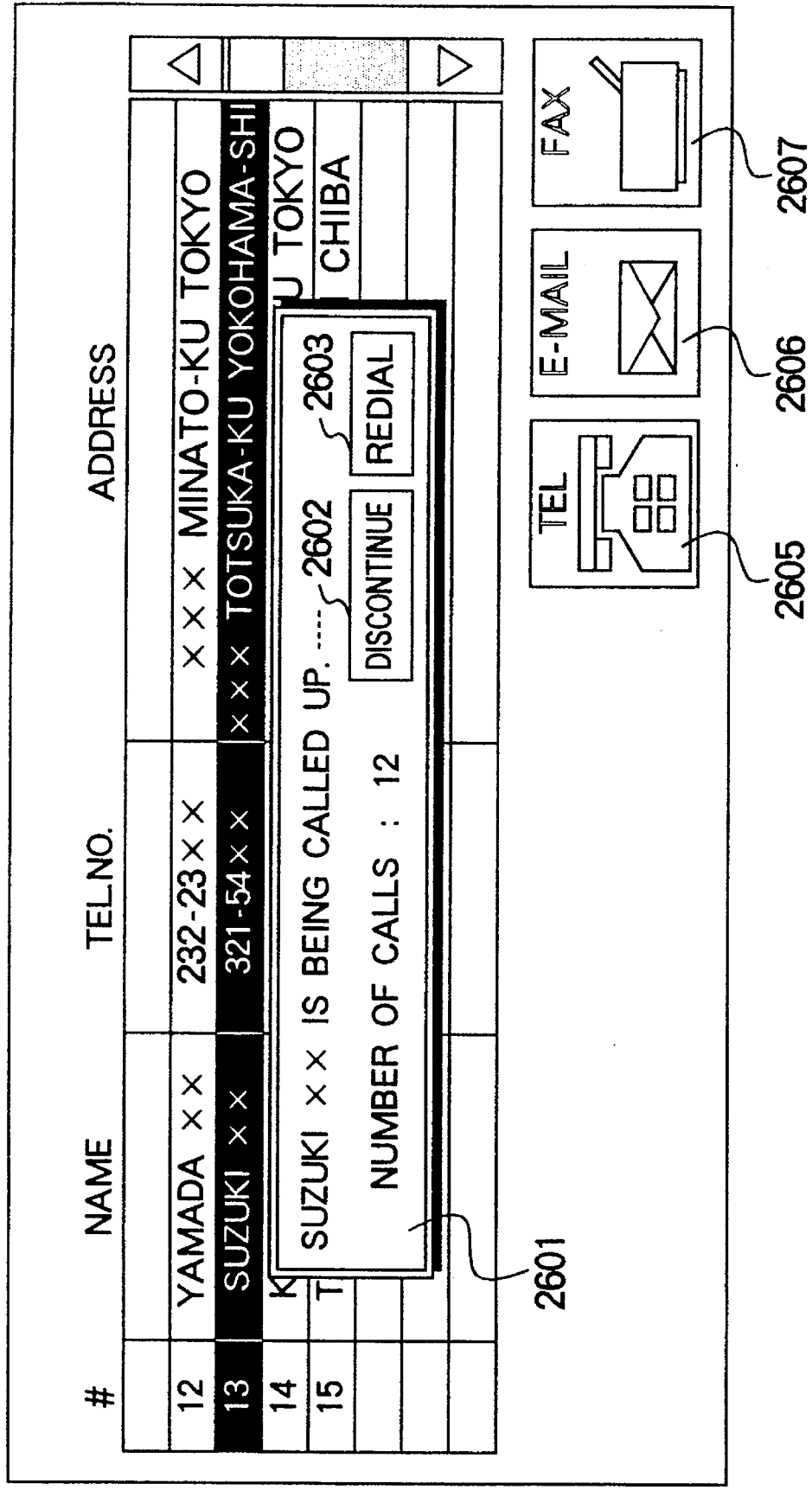
FIG. 26 is a view for explaining an example of a display screen in an application (in course of the call-up on the telephone)

When the telephone function selecting button 2605 is indicated and selected, as shown in FIG. 26, a window (or dialogue) 2601 is displayed to show that the selected item 13 is being called up. Information such as the number of calls may be displayed. From such information, the user can select a DISCONTINUE button 2602 when the call is to be discontinued. If a REDIAL button 2603 is selected, it is possible to discontinue the call once and to call up the same item again after the lapse of a specified time (for example, 5 minutes). As for these buttons, a button corresponding to an indicating direction intended by the user can be selected by the extended projection point detecting section 2605.

FIG. 31 shows an example of the window (or dialogue) 2601 after the lapse of a set time (for example, 5 minutes) when the user selects the REDIAL button 2603 in FIG. 26. In FIG. 26, the execution of redialing is confirmed to the user by virtue of a window (or dialogue) 3101. The user can select an EXECUTE button 3102 when the execution of redialling is to be made and can select a CANCEL button 3103 when the execution of redialing is to be stopped.

Figure 27:
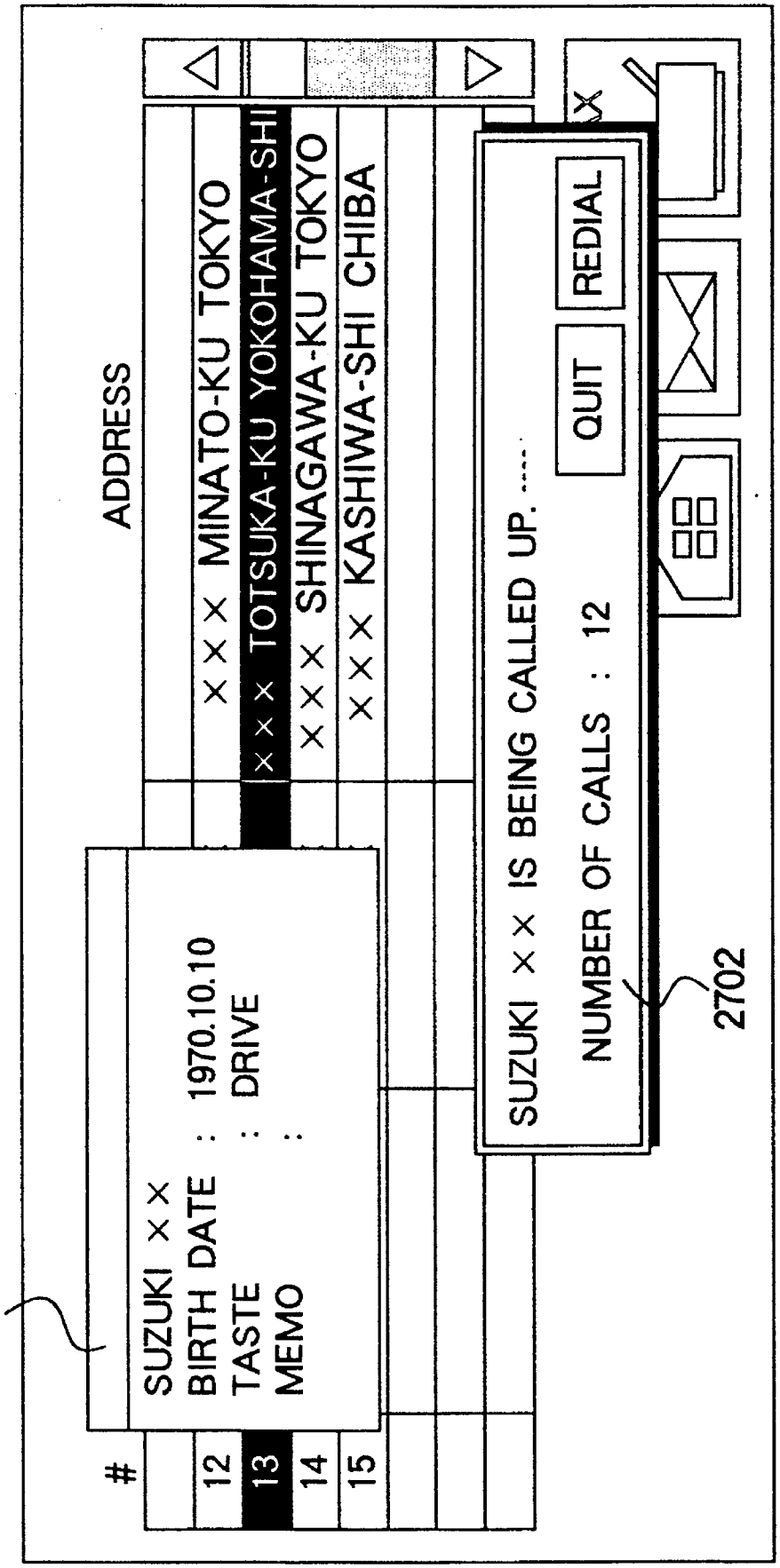
FIG. 27 is a view for explaining an example of a display screen in an application (in course of the call-up on the telephone)

FIG. 27 shows another example of the display screen for the telephone function selecting button 05 in FIG. 25. In addition to a window 2702 similar to the window 2601 in FIG. 6 is shown a window 2501 which displays information such as the birth date of a receiver corresponding to the selected item 13.

FIG. 28 shows an example of the display screen when the telephone function selecting button is first selected without selecting any item of the address book. In this case, an input frame 2801 is displayed to request a user to input the telephone number of a receiver. When no particular representation of an extended projection point is necessary as during the inputting of the telephone number in this example, a construction may also be possible in which the display of a cursor for representing the extended projection point is interrupted once. Further, a construction may be possible in which the extended projection point itself is not detected. As another example, it is possible to make a change-over by which the cursor for representing the extended projection point is displayed or not displayed, as required. Also, it is possible to set a situation (or mode) in which the extended projection point itself is not used for indication/selection.

FIG. 29 shows an example of the display screen for the next processing when a telephone number is input by a keyboard, finger plus pen, or the like to specify a receiver. Such a display is made before the start of a call or after the completion of the call. In the shown example, a user is inquired of whether or not the telephone number input in 2901 is to be registered into the address book. When the registration is to be made, a REGISTER button 2902 is selected. When the registration is to be stopped, a CANCEL button 2903 is selected.

FIG. 30 shows another example of the display screen when the telephone function selecting button is selected. A window (or dialogue) 3001 for confirming the actual call to a receiver is displayed, thereby enabling a confirmation by a user. When the call is to be executed, an EXECUTE button 3002 is selected. When the call is to be stopped, a CANCEL button 3003 is selected.

FIG. 32 shows an example of the display screen in which the order of sequence of display of the address book can be changed/set. When a button 3201 is selected, the address book is displayed in the "a, i, u, e, o" order (or in the Japanese alphabetical order). When a button 3202 is selected, the address book is displayed in accordance with a classification based on an attribute set beforehand for each receiver. Any attribute such as the order of proximity of the preceding calls may be set in accordance with the use or purpose.

FIG. 34 shows an example of the display screen when a facsimile transmission is to be made. When a receiver is selected from the item number column 2501, the name column 2502 or the like in FIG. 25 and the facsimile function selecting button is selected, a window (or dialogue) 3301 shown in FIG. 33 is displayed. A document to be transmitted is specified by virtue of the window 3301 and the actual transmission is made by an EXECUTE button.

FIG. 34 shows another example of the operating display screen when a facsimile transmission is to be made. In the present embodiment, there is shown an example in which a facsimile transmission is made, for example, in the course of edition of a document by a word processor. When the facsimile function selecting button is selected, for example, in the course of edition of a document, a window (or dialogue) 3401 is displayed. When the document in course of edition is to be transmitted, an EXECUTE button 3402 is selected.

FIG. 43 shows a further example of the operating display screen when a facsimile transmission is to be made. In the present embodiment, there is shown another example in which a facsimile transmission is made, for example, in the course of edition of a document by a word processor. When the facsimile function selecting button is selected, for example, in the course of edition of a document, a window (or dialogue) 4301 is displayed. When the document in course of edition is to be transmitted, an EXECUTE button 3402 is selected specifying a receiver.

Figure 35:
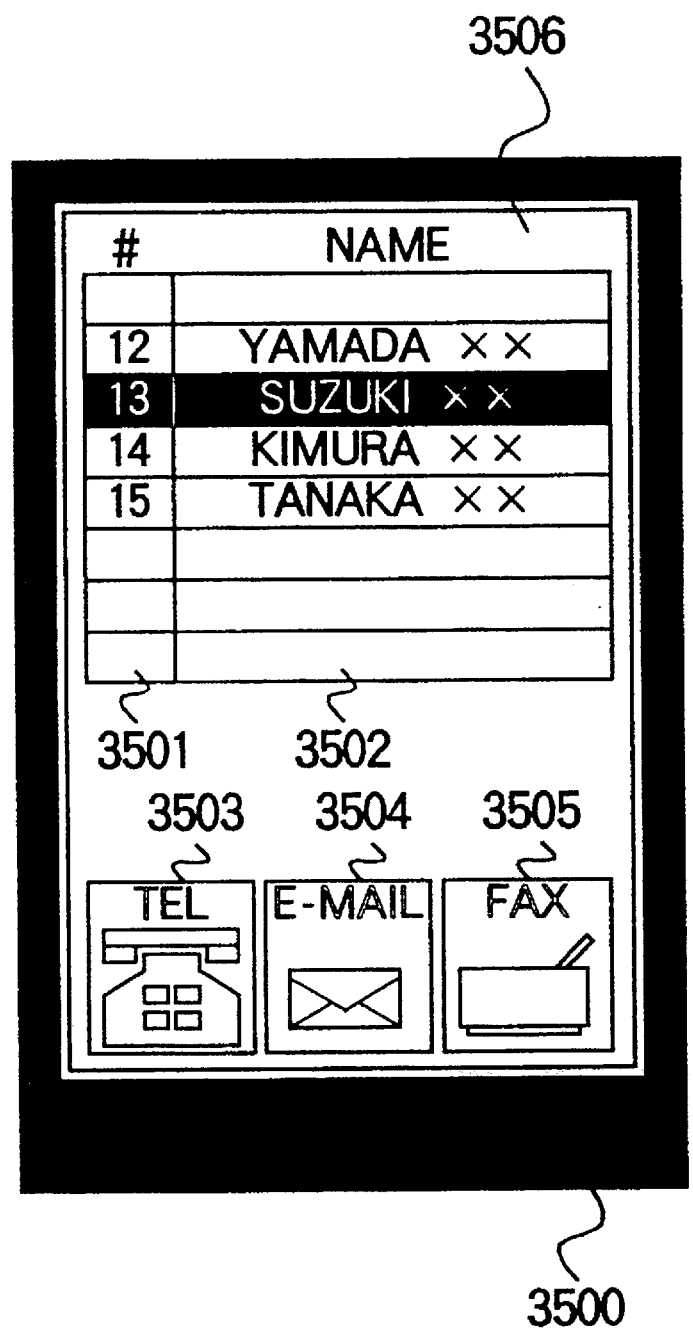
FIG. 35 is a front view of an example of a portable information processing apparatus.

Examples of the display screen when the electronic mail function is selected, can be realized similarly to those shown in FIGS. 33, 34 and 35.

According to the present embodiment as mentioned above, since an object positioned in an indicating direction intended by a user can be indicated by the indicating portion at the time of function selection or item selection in an application or a system, the reliability of selection is improved.

Further, even when the display area of an object to be selected is small as in the selection of item numbers or the selection of names in the present embodiment, the selection with a high accuracy becomes possible, thereby improving the convenience of use.

In the following, another embodiment of the present invention will be explained by use of FIGS. 35 to 38. FIG. 35 is a view showing an example of the external appearance and the display screen of a portable information terminal. In FIG. 35, reference numeral 3501 denotes an item number column of an address book, numeral 3502 a name column of the address book, numeral 3503 a telephone function selecting button, numeral 3504 an electronic mail function selecting button, and 3505 a facsimile function selecting button. Numeral 3506 denotes a display/input integrated input section in which a display section and an input section overlap each other.

Figure 36:
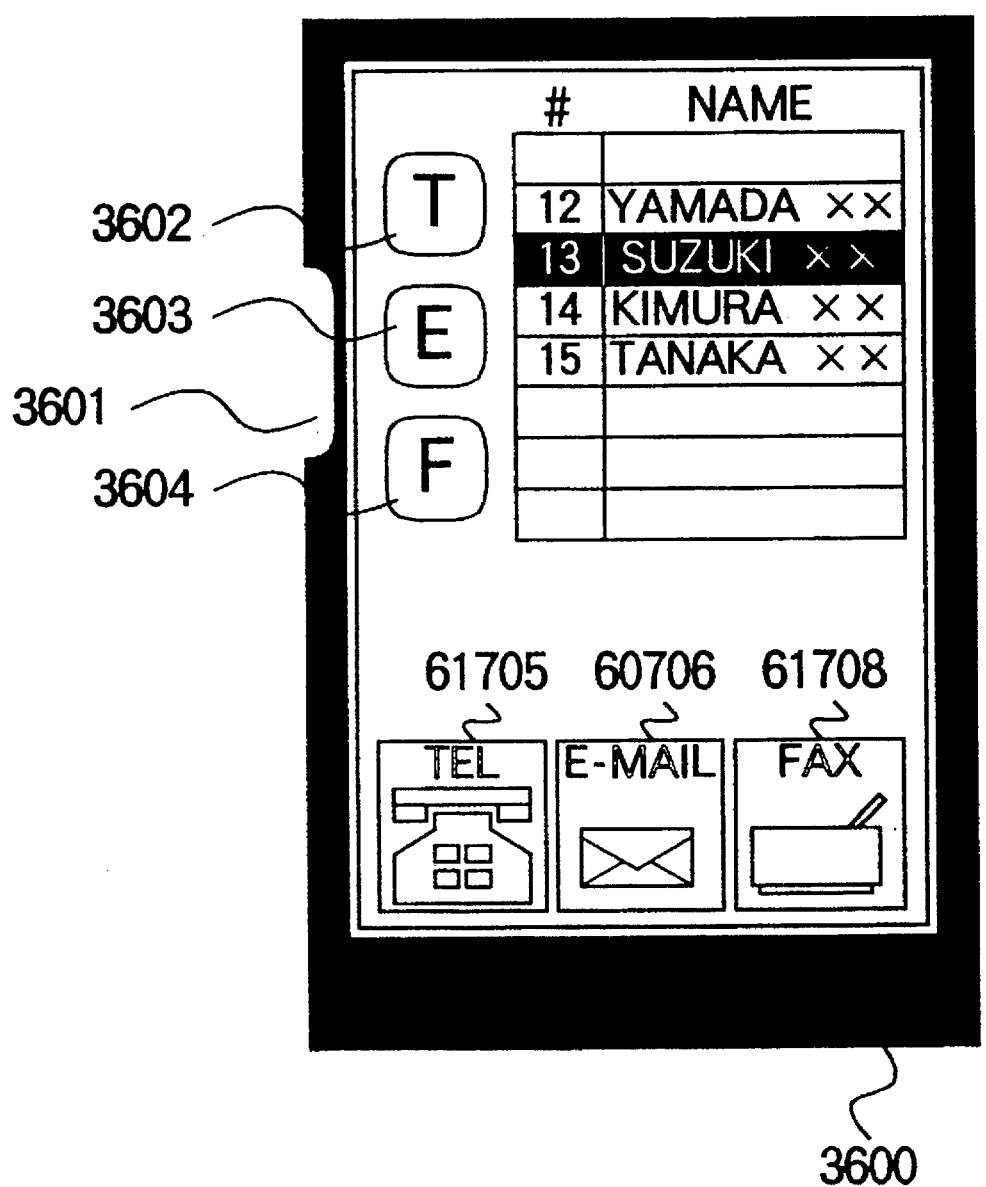
FIG. 36 is a view for explaining an example of a display screen in an application (or a view showing an example of display in the portable information processing apparatus)

FIG. 36 is a view showing the display screen construction and the casing structure of an information processing apparatus suitable for a construction in which the finger of a hand to hold the information processing apparatus is used as an indicating portion. In FIG. 36, reference numeral 3600 denotes the information processing apparatus, numeral 3601 indicates an indicating portion hold mechanism for giving assistance to an indicating operation in a state in which the information processing apparatus is held, numeral 3602 represents a simplified telephone function selecting button which has a function equivalent to a telephone function selecting button 3605, numeral 3603 indicates a simplified electronic mail function selecting button which has a function equivalent to an electronic mail function selecting button 3606, and numeral 3604 represents a simplified facsimile function selecting button which has a function equivalent to a facsimile function selecting button 3608. If those simplified selecting buttons have a convex or concave structure, a selection error at the time of selection is reduced, thereby improving the reliability and the operability.

Figure 37:
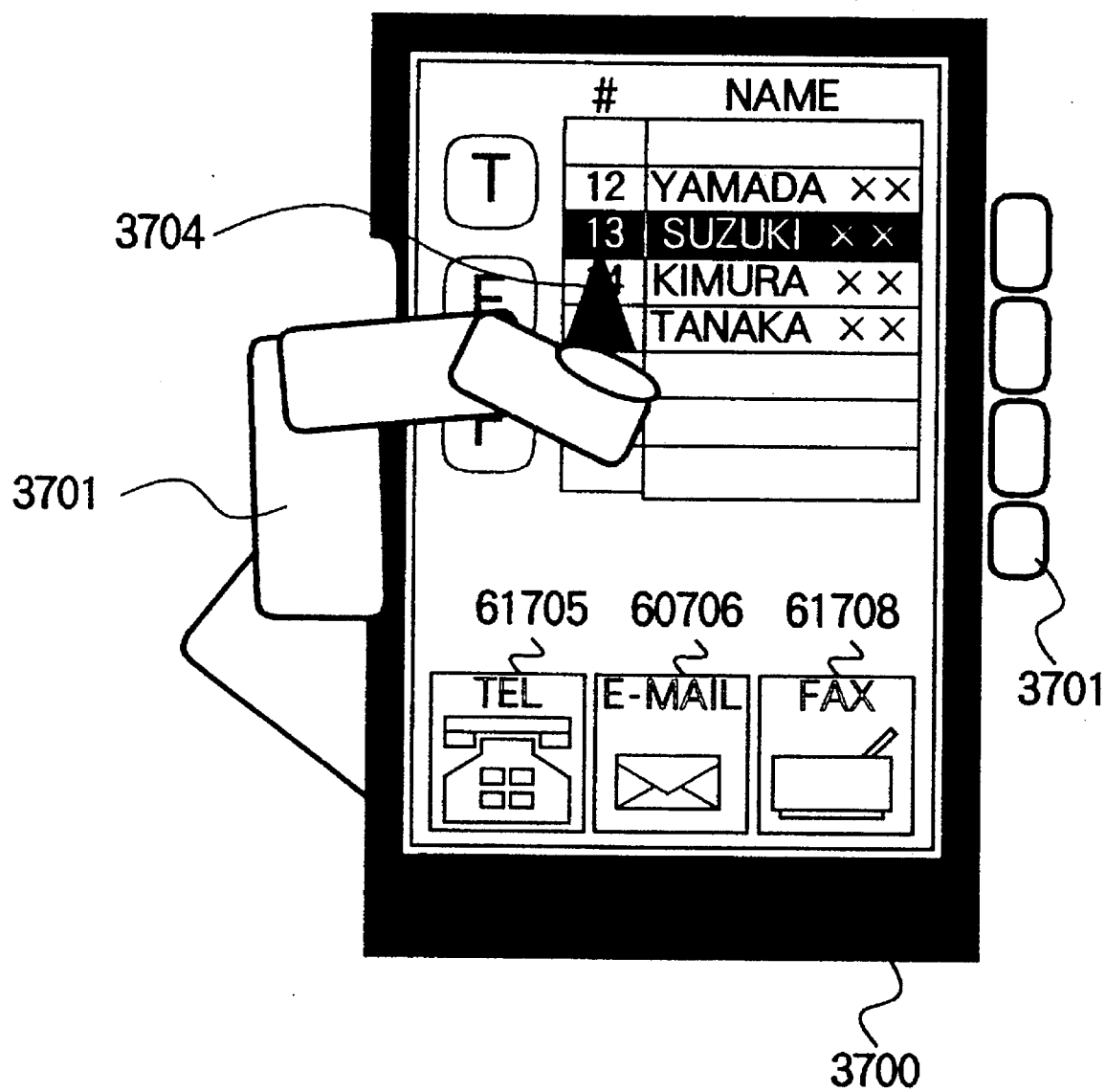
FIG. 37 is a view for explaining an example of the operation of a display screen (or a view for explaining an example of the operation of the portable information processing apparatus)

FIG. 37 is a view showing an example of the operation of the information processing apparatus shown in FIG. 36. In FIG. 37, an indicating portion is a thumb 3701. The information processing apparatus is held by a hand having the thumb 3701 as the indicating portion. With the indicating portion hold mechanism, an area allowing the indication by the indicating portion is expanded and the holding of the information processing apparatus is facilitated. In the present embodiment, an indicating direction intended by a user is assumed not to be a major axis direction but an upper direction of the information processing apparatus since the degree of freedom of the indicating portion is deteriorated. FIG. 37 shows a cursor 3704 representing an extended projection point which is the point of intersection of the indicating direction and the input section. Also, though no particular illustration is shown in FIG. 37, the extended projection point detecting section 2115 for enabling the detection of the extended projection point and the indication processing section 2116 for enabling the indication by the extended projection point are provided as in the foregoing embodiments.

Figure 38:
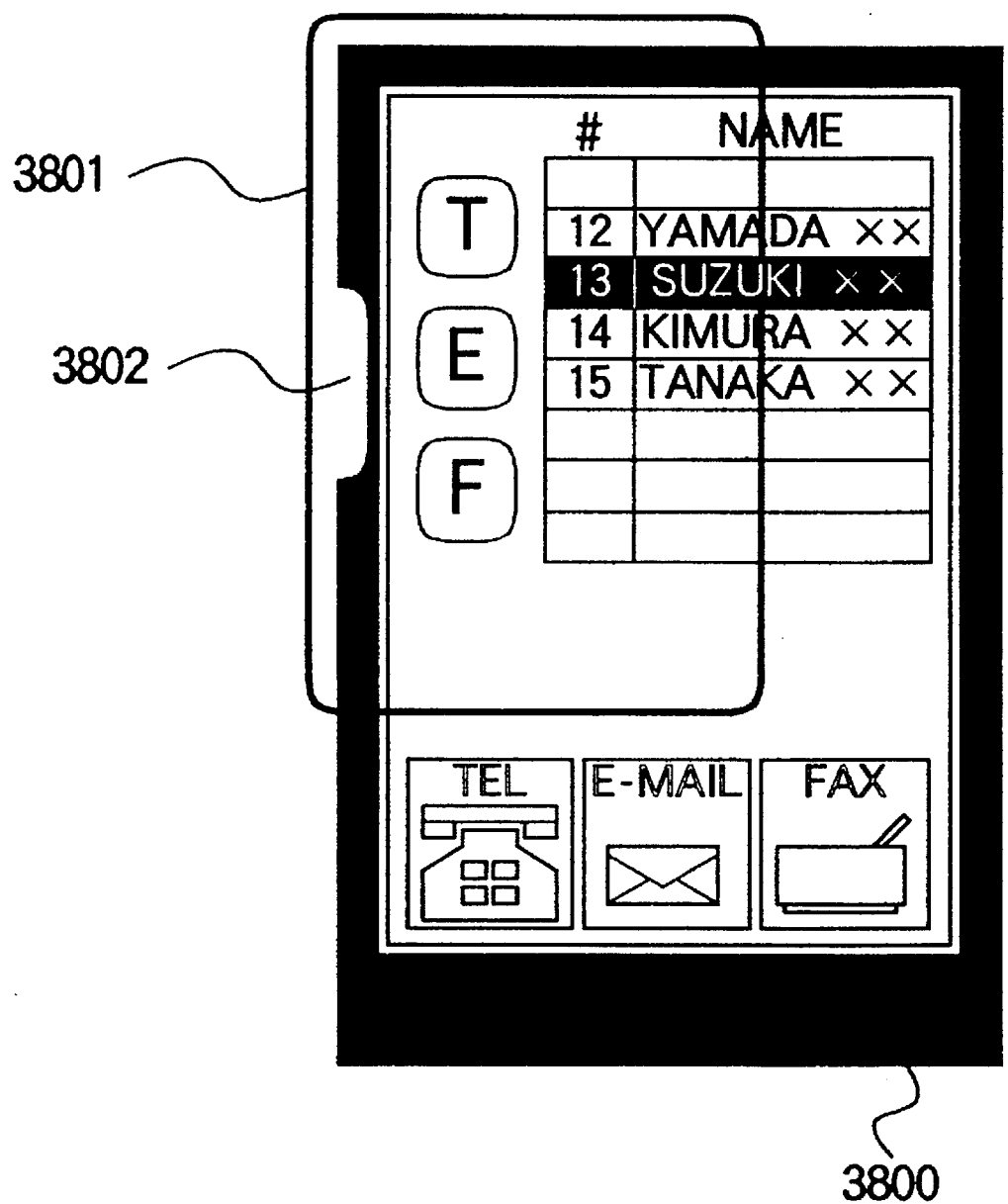
FIG. 38 is a view showing an area where the indication is possible in the portable information processing apparatus.

FIG. 38 shows an area 3801 on the input section where the indication is possible by the holding method and the indicating method of the present embodiment.

According to the present embodiment as mentioned above, even in a portable information processing apparatus, an extended projection point indicating an indicating direction intended by a user can be detected by the extended projection point detecting section 2115, thereby improving the convenience of use. Further, the holding of the apparatus and the indication/selection of display information can be made simultaneously, thereby improving the operability.

Figure 39:
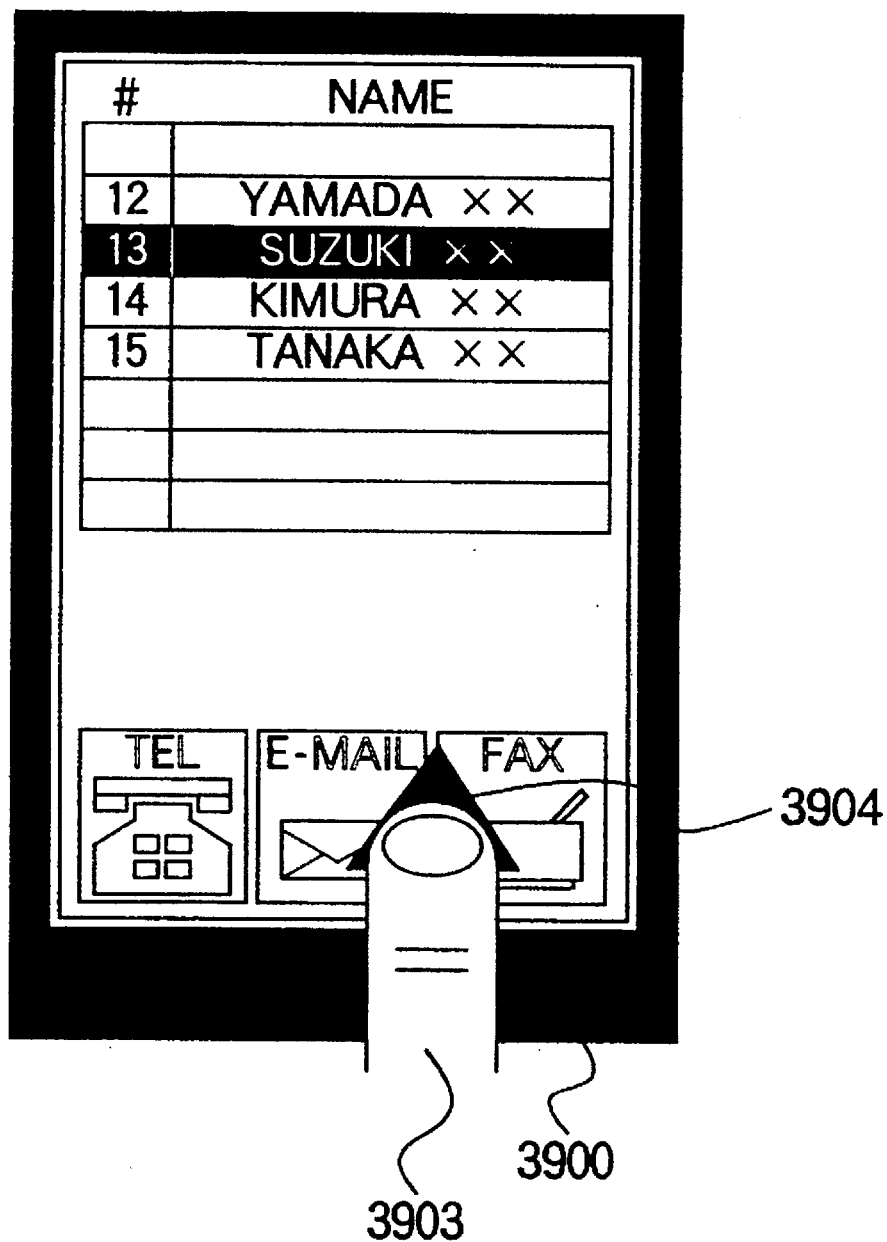
FIG. 39 is a view for explaining an example of an item number selecting operation.

In the following, another embodiment of the present invention will be explained by use of FIG. 39. FIG. 39 is a view showing an example of the item number selecting operation in the present embodiment. In an indicating portion 3903, an item number is input in a handwritten form to an input section. Thereby, address data of the corresponding item number is selected. In this embodiment, "13" is input as the item number. Since techniques for recognition of handwritten characters and techniques concerning the utilization of recognition results as gestures are widely utilized in handwritten input information processing apparatuses or the like and known, no detailed explanation will be made. An input handwritten character may be actually displayed or merely input as a trace without being actually displayed.

According to the present embodiment, a direct/intuitive operating method, in which an item number is written, becomes applicable in the selection of functions/items, thereby improving the convenience of use.

Figure 40:
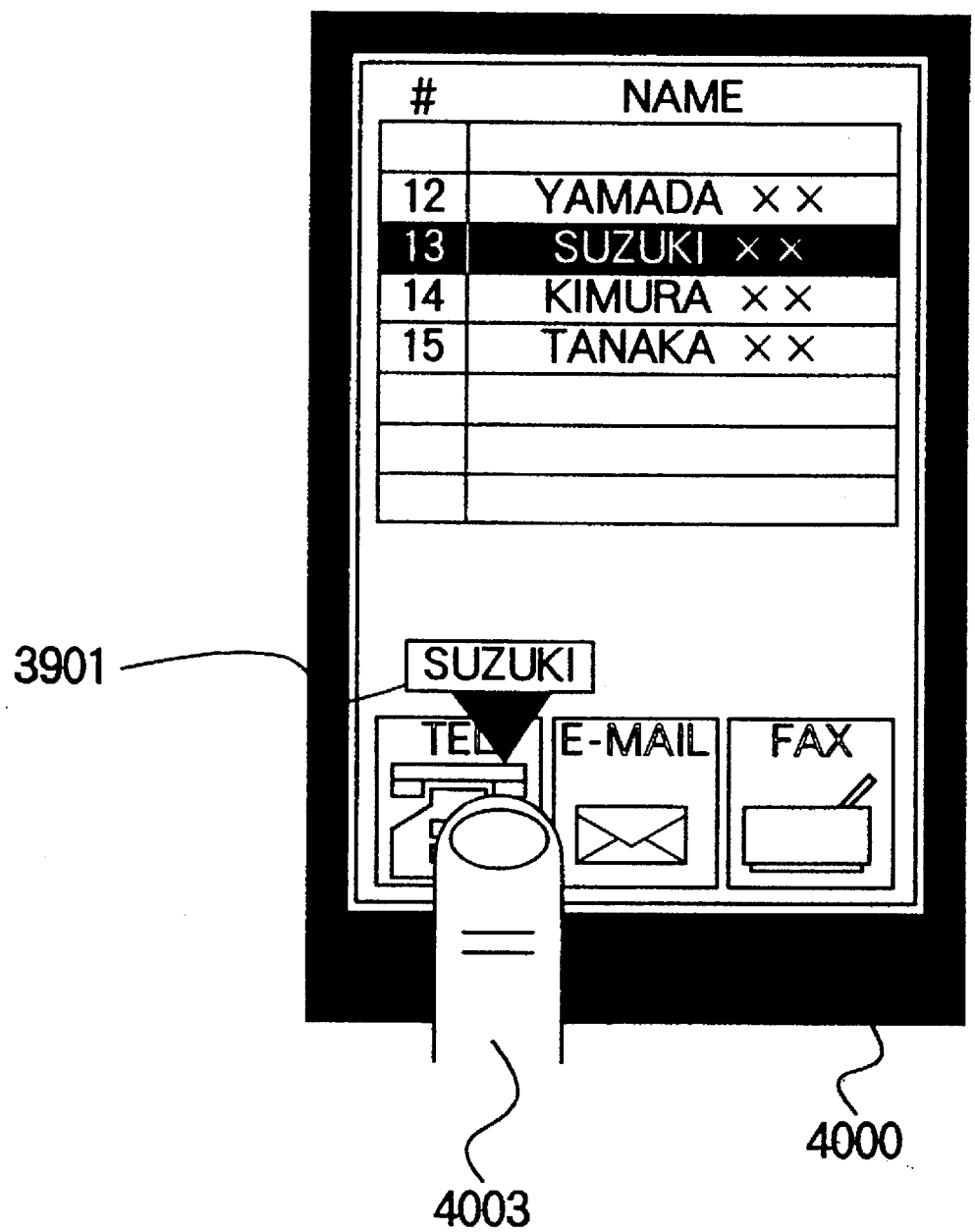
FIG. 40 is a view for explaining an example of the selecting operation in which the form of a cursor is changed.
Figure 41:
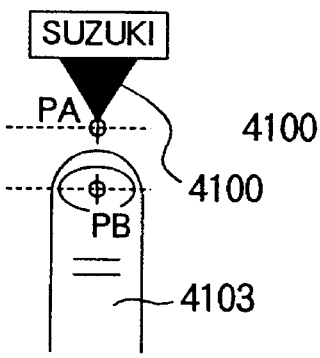
FIG. 41 is a view showing the form of the cursor.

In the following, another embodiment of the present invention will be explained by use of FIGS. 40 and 41. The operation of the present embodiment will now be explained using FIG. 40. FIG. 40 shows a state in which the item number "13" of the address book is selected. Before the selection, a cursor has, for example, the form of a triangle. After the selection, however, the cursor is changed to a form which enables the identification of a selected object or is added with information which enables the identification of a selected object. In FIG. 40, the cursor is changed to a cursor 4100 which indicates name information of a selected receiver. At the time of completion of a series of transmitting procedures or at the time of execution of a specified procedure, the cursor is changed to take the initial form or another form. FIG. 41 is a view showing the Position of an extended projection point by a cursor 4100 (or the cursor 4001 shown in FIG. 40) which enables the identification of a selected object.

According to the present embodiment, it becomes possible to confirm the result of a selecting operation while an extended projection point intended by a user is represented by a cursor. Thereby, the reliability is improved.

In the foregoing embodiments, if a projected or recessed structure for position decision is provided on a surface of the input section which touches the indicating portion, the convenience of use in the indicating operation is further improved. As a method for attaining a similar purpose, a construction is possible in which the input section is provided with position informing means having a specified structure such as a concave or convex structure. Examples of the position informing means include slits in a horizontal or vertical direction.

Though the embodiments have been shown in conjunction with the example of selection in which an extended projection point is taken as a reference, a construction is also possible in which the indication/selection is made with a normal projection point or another specified indicating point being taken as a reference.

The contents of an operation for selection of an object by a tapping will be explained by virtue of FIG. 50.

Figure 50:
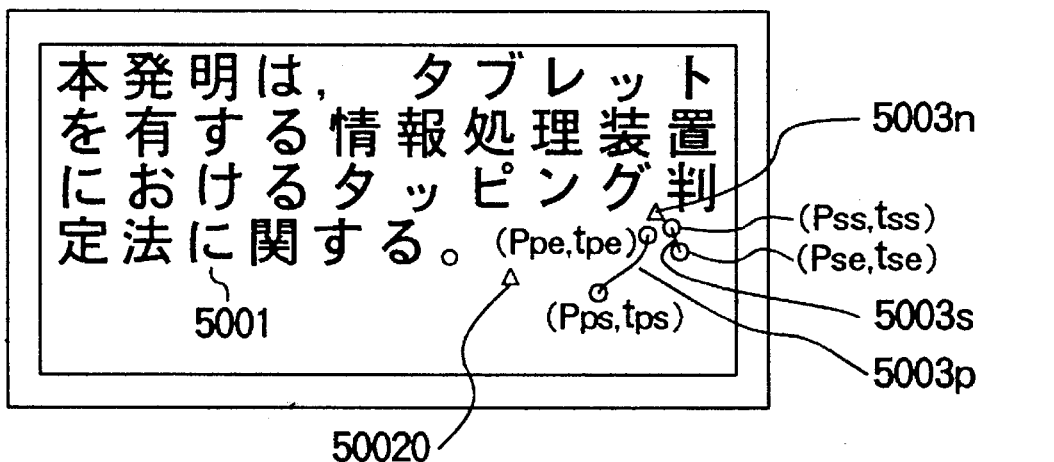
FIG. 50 is a view showing the contents of an operation for selection of an object by a tapping in the embodiment of the present invention.

FIG. 50 shows the contents of operation in the case where in selecting an object by a tapping, a cursor at the end of a character string 5001 is moved to a space between "タッピング" ("TAPPING" in English) and "判定" ("JUDGEMENT METHOD" in English) in the character string 5001.

In FIG. 50, reference numeral 5001 denotes a character string "THE PRESENT INVENTION RELATES TO A TAPPING JUDGEMENT METHOD IN AN INFORMATION PROCESSING APPARATUS HAVING A TABLET." (in the English version of the Japanese representation) which has already been input to the system, numerals 5002O and 5002n respectively denote a cursor before movement and that after movement, and numerals 5003p and 5003s respectively denote the trace of a finger in a position indicating operation and that in a selection indicating operation. Also, symbols Pps and the respectively denote the start and end points of the finger input in the position indicating operation, symbols Pss and Pse respectively denote the start and end points of the finger input in the selection indicating operation, symbols tps and tpe respectively denote the time instants of the start and end points of the finger input in the position indicating operation, and symbols tss and tse respectively denote the time instants of the start and end points of the finger input in the selection indicating operation. Further, symbols aD and tT denote a distance and a time difference between the end point of the position indicating operation and the start point of the selection indicating operation, respectively.

In a first step, the position indicating operation to a space between "タッピング" and "判定法" in the character string 5001 is performed. As is shown by the trace 5003p of position indicating operation, this operation includes bringing a finger into touch with the position indicating operation start point Pps in the vicinity of the space between "タッピング" and "判定法" in the character string 5001, then moving the finger to the position indicating operation end point Ppe between "タッピング" and "判定法" in the character string 5001 in a state in which the touch of the finger is maintained, and thereafter detaching the finger therefrom.

In a second step, the indication of selection of the position indicating operation end point Ppe between "タッピング" and "判定法" in the character string 5001 position-indicated in the first step is performed. As is shown by trace 5003s of selection indicating operation, this operation includes bringing the detached finger into touch with the selection indicating operation start point Pss in the vicinity of the position indicating operation end point Ppe between "タッピング" and "判定法" in the character string 1 for a minute time, and thereafter detaching the finger therefrom. The reason why the selection indicating operation also has a trace such as the trace 5003s of selection indicating operation, is that the touch condition of the finger or the touch position thereof itself may be changed for the minute time.

In the contents of the operation of selection of an object by such a tapping, the distance ΔD and the time difference ΔT between the end point of the position indicating operation and the start point of the selection indicating operation are about 3 mm and 0.3 seconds, respectively, or small to certain degrees. Paying attention to this fact, a tapping judgement method, which will be mentioned, has been thought out from the distance ΔD and the time difference ΔT.

A tapping judgement method in another embodiment of the present invention will be explained by use of FIGS. 48 and 49.

The tapping judgement method will be explained using FIG. 48.

Figures 48, 49:
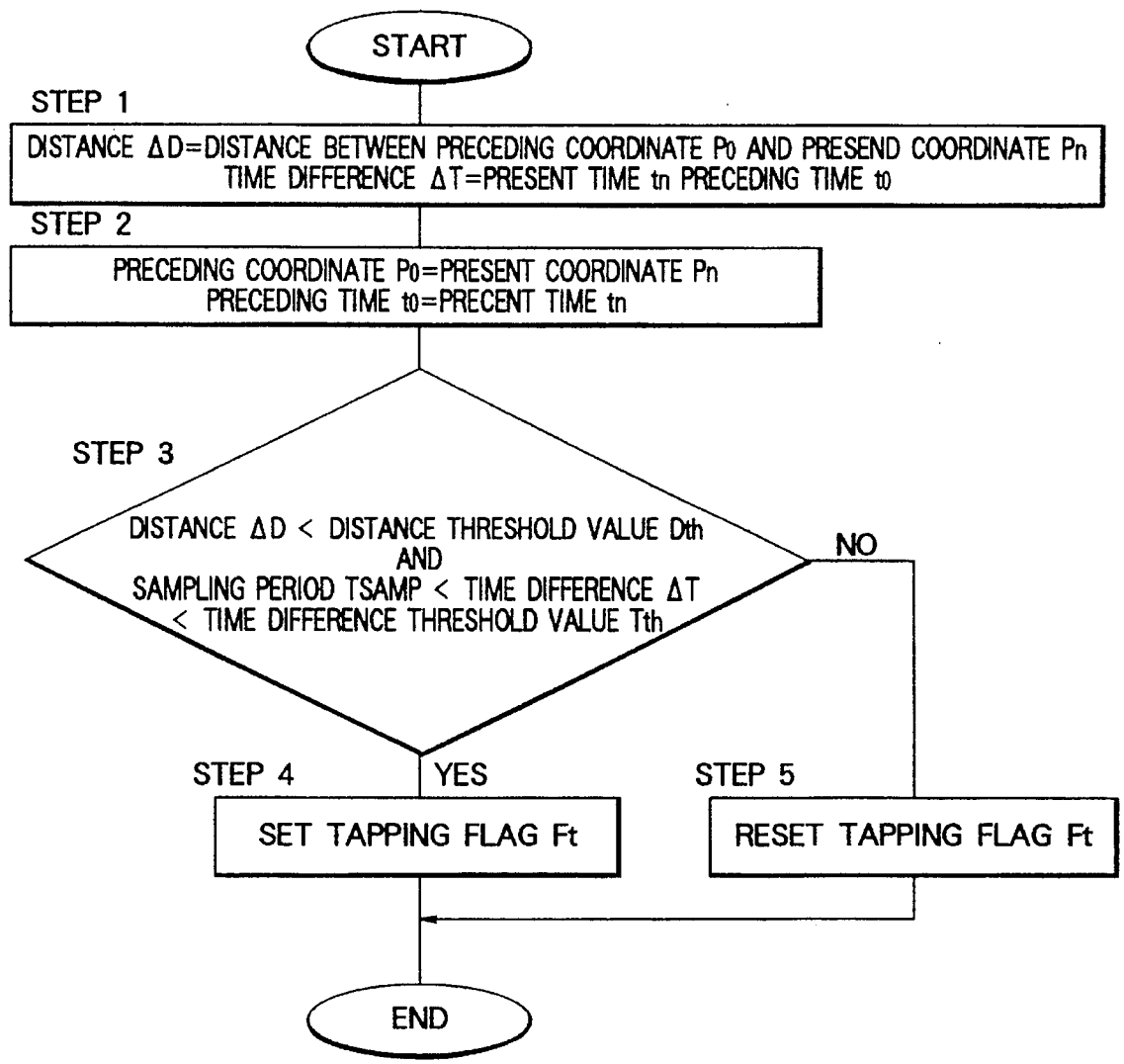
FIG. 48 is a diagram showing a tapping judgement method in an embodiment of the present invention.
FIG. 49 is a chart showing the flow of a tapping judgement processing in the embodiment of the present invention.

FIG. 48 shows a tapping judgement table. As shown in FIG. 48, the judgement of a tapping is made from coordinate information of a tablet and time information of a system so that the tapping is judged as being present at the coordinate of a start point of the condition of non-acquisition of the coordinate information when a time of the condition of noninput of the coordinate information is small to a certain degree and a distance between the coordinate values of start and end points of the condition of nonacquisition of the coordinate information is small to a certain degree. On the other hand, when a time of the condition of non-acquisition of the coordinate information is large to a certain degree or when the distance between the coordinate values of start and end points of the condition of nonacquisition of the coordinate information is large to a certain degree, the tapping is judged as being absent.

Applying this tapping judgement method to the contents of the operation shown in FIG. 50, a tapping can be judged as being present at the selection indicating operation start point Pss since a time of the condition of non-input of the coordinate information is small to a certain degree and a distance between the coordinate values of start and end points of the condition of non-acquisition of the coordinate information is small to a certain degree.

A tapping judgement processing will be explained using FIG. 49.

FIG. 49 shows the flow of a processing in a system using the tapping judgement method shown in FIG. 48. This processing flow is activated by the input of coordinate information from a tablet.

In step 1, a distance ΔD between the preceding coordinate Po and the present coordinate Pn and a time difference ΔT between the preceding instant to and the present instant tn are determined.

In step 2, the preceding coordinate Po and the preceding instant tn are substituted by the present coordinate Pn and the present instant to, respectively.

In step 3, judgement is made as to whether or not the distance ΔD is smaller than a distance threshold value Dth and the time difference ΔT is larger than a sampling period Tsamp of the tablet and smaller than a time difference threshold value Tth. When the result of judgement is affirmative, a processing of step 4 is performed. When the result of judgement is negative, a processing of step 5 is performed.

In step 4, a tapping flag Ft is set. In step 5, the tapping flag Ft is reset.

According to the present invention, since it is possible to absorb a deviation which may be caused in an operation by a finger or the like between a position subjected to position indication and a position subjected to tapping, the judgement of a tapping for selection indication can be made accurately. Therefore, it is possible to eliminate the planar movement of a finger or the like between an operation for position indication and an operation for selection indication from the selection of an object by a finger or the like, thereby improving the operability of an object selection operation or the like.

In the present embodiment, no explanation is made of the setting of the distance threshold value Dth and the time difference threshold value Tth. These values may be set initially or by a user.

In the present embodiment, no explanation is made of a method for the judgement of a double tapping. The double tapping judgement method can easily be realized by extending the above-mentioned tapping judgement method.

Figure 51:
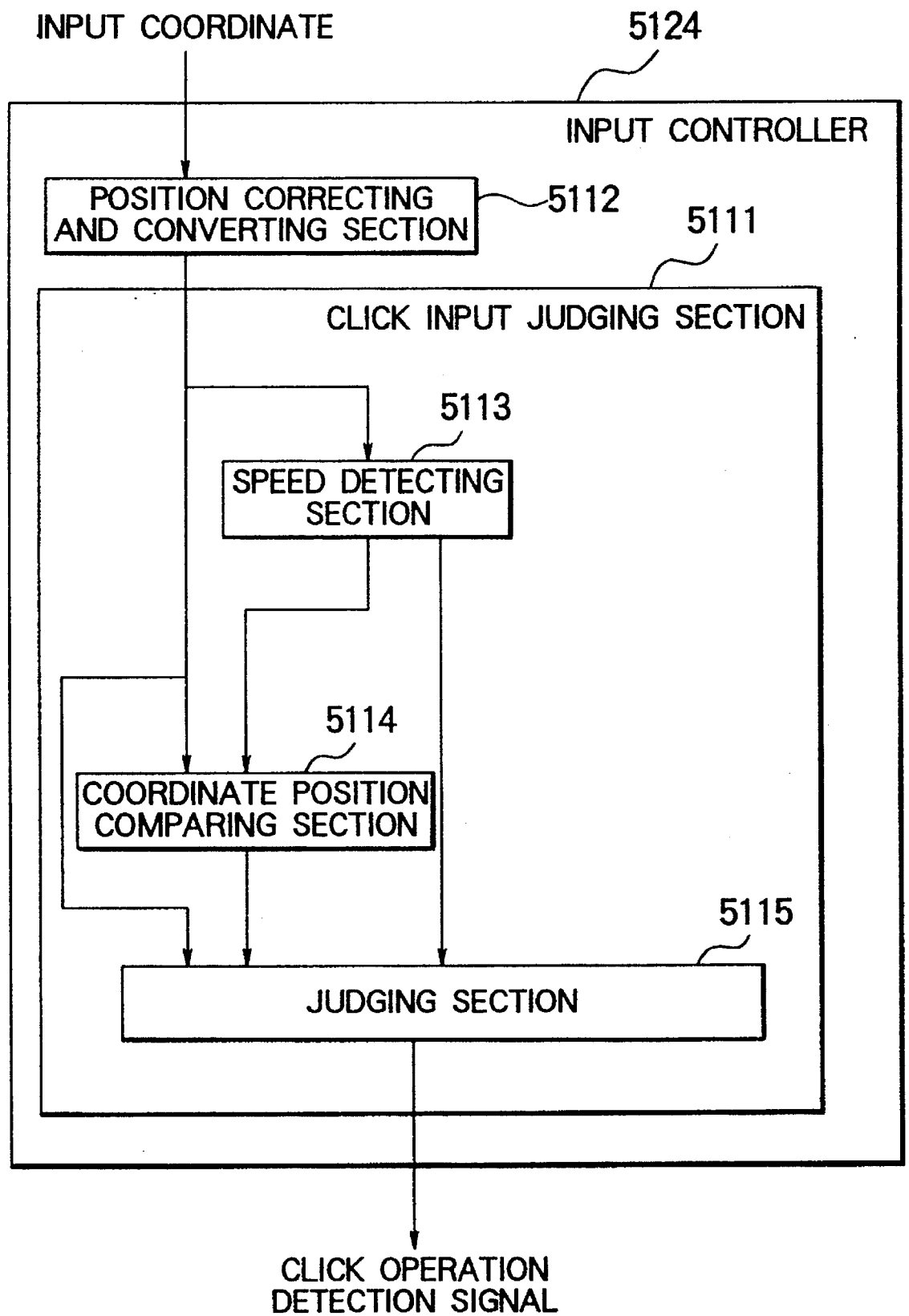
FIG. 51 is a block diagram of an input controller according to an embodiment of the present invention.
Figure 52:
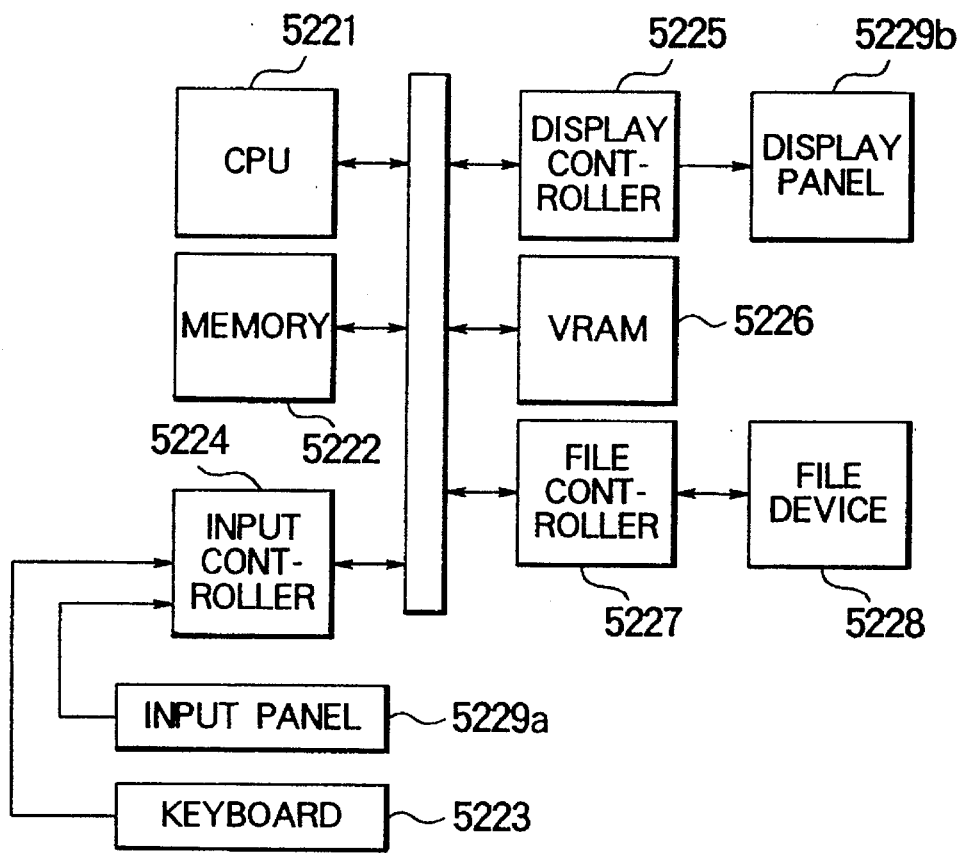
FIG. 52 is a block diagram showing the construction of an information processing apparatus according to the embodiment of the present invention.
Figure 53:
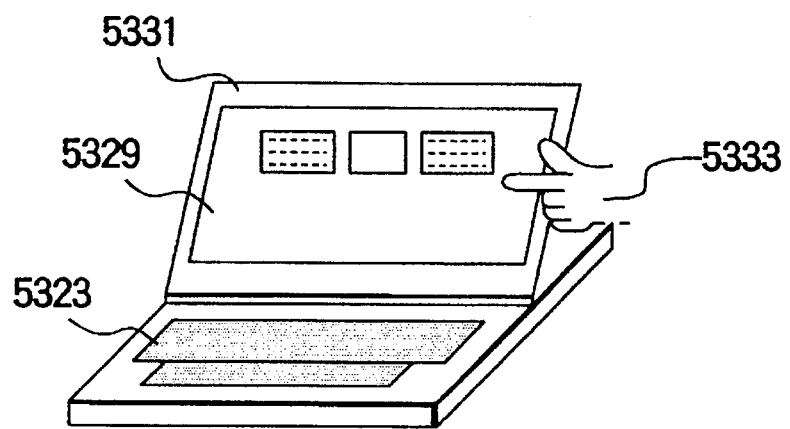
FIG. 53 is a view showing the external appearance of the information processing apparatus according to the embodiment of the present invention.
Figure 54A:
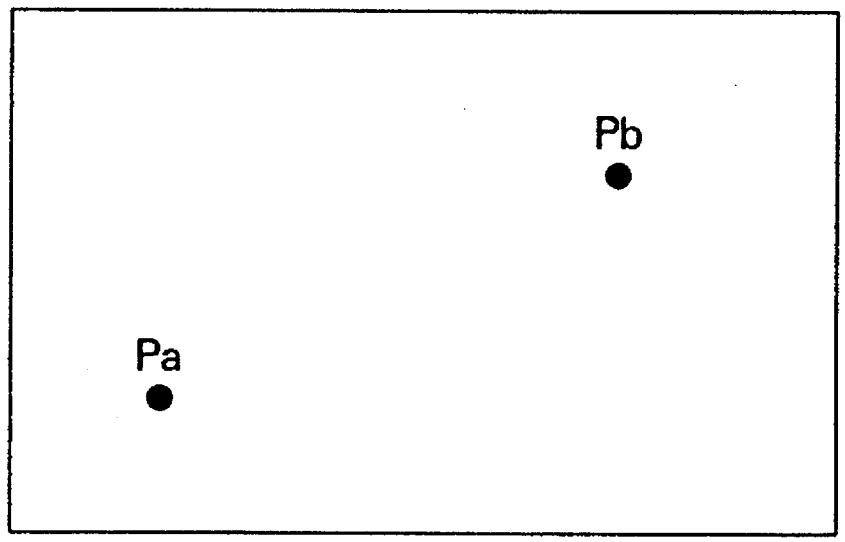
FIGS. 54A and 54B are explanatory diagrams showing an input coordinate inputted by an input panel and an input coordinate detected by the input controller.
Figure 54B:
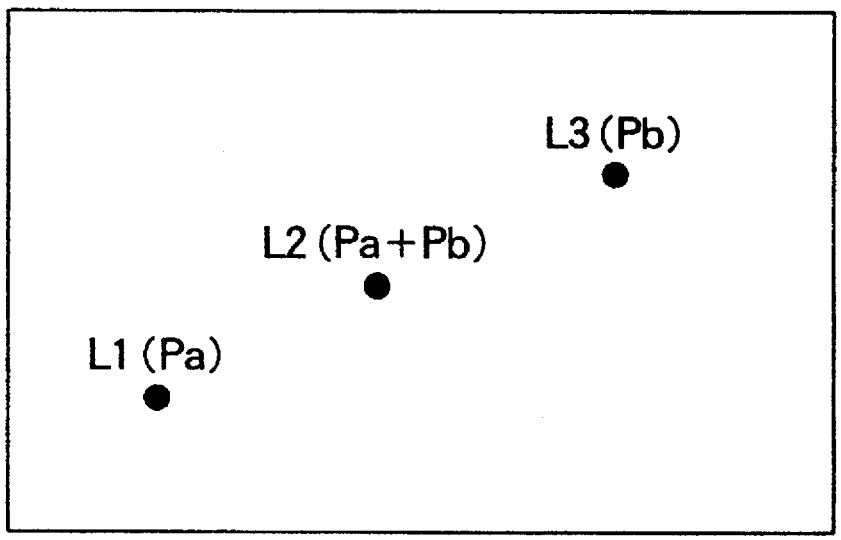
Figure 55A:
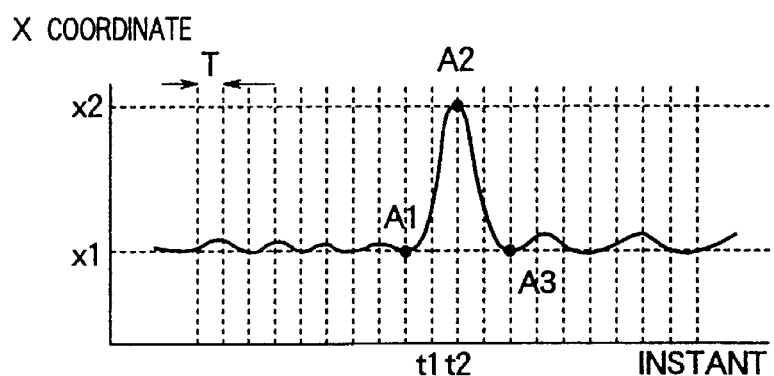
FIGS. 55A to 55D are explanatory diagrams showing an input coordinate and a coordinate change speed detected by the input controller.
Figure 55B:
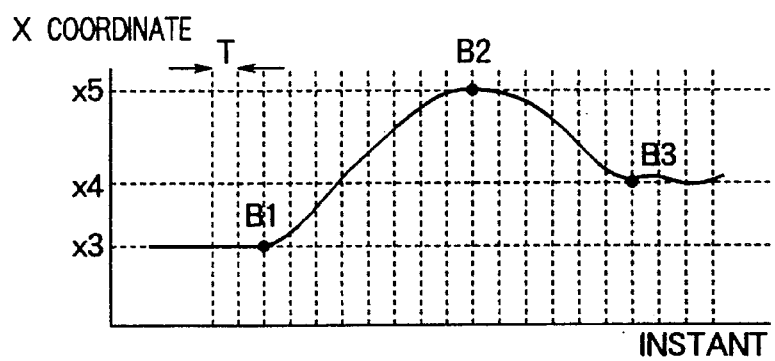
Figure 55C:
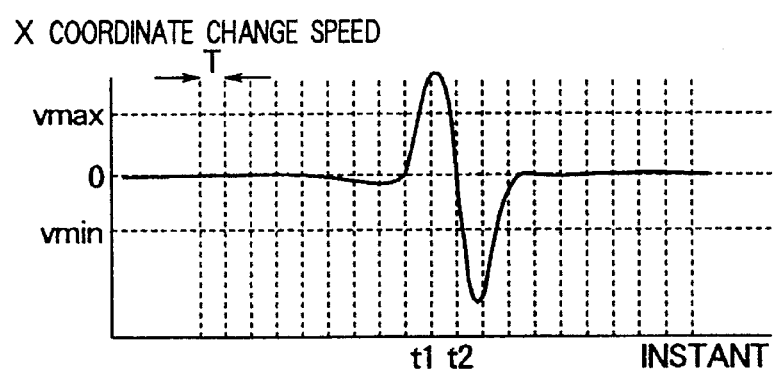
Figure 55D:
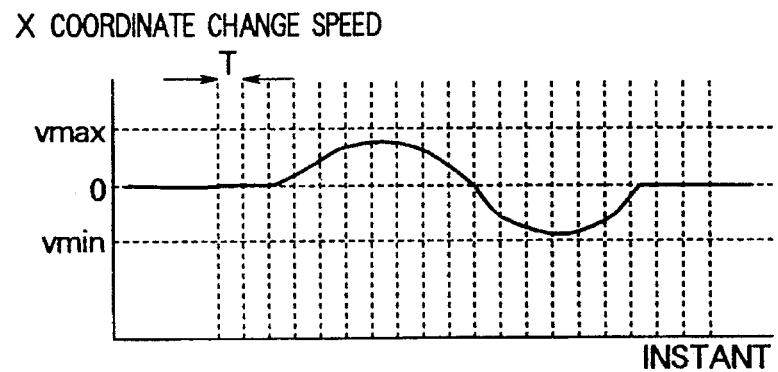
Figure 56:
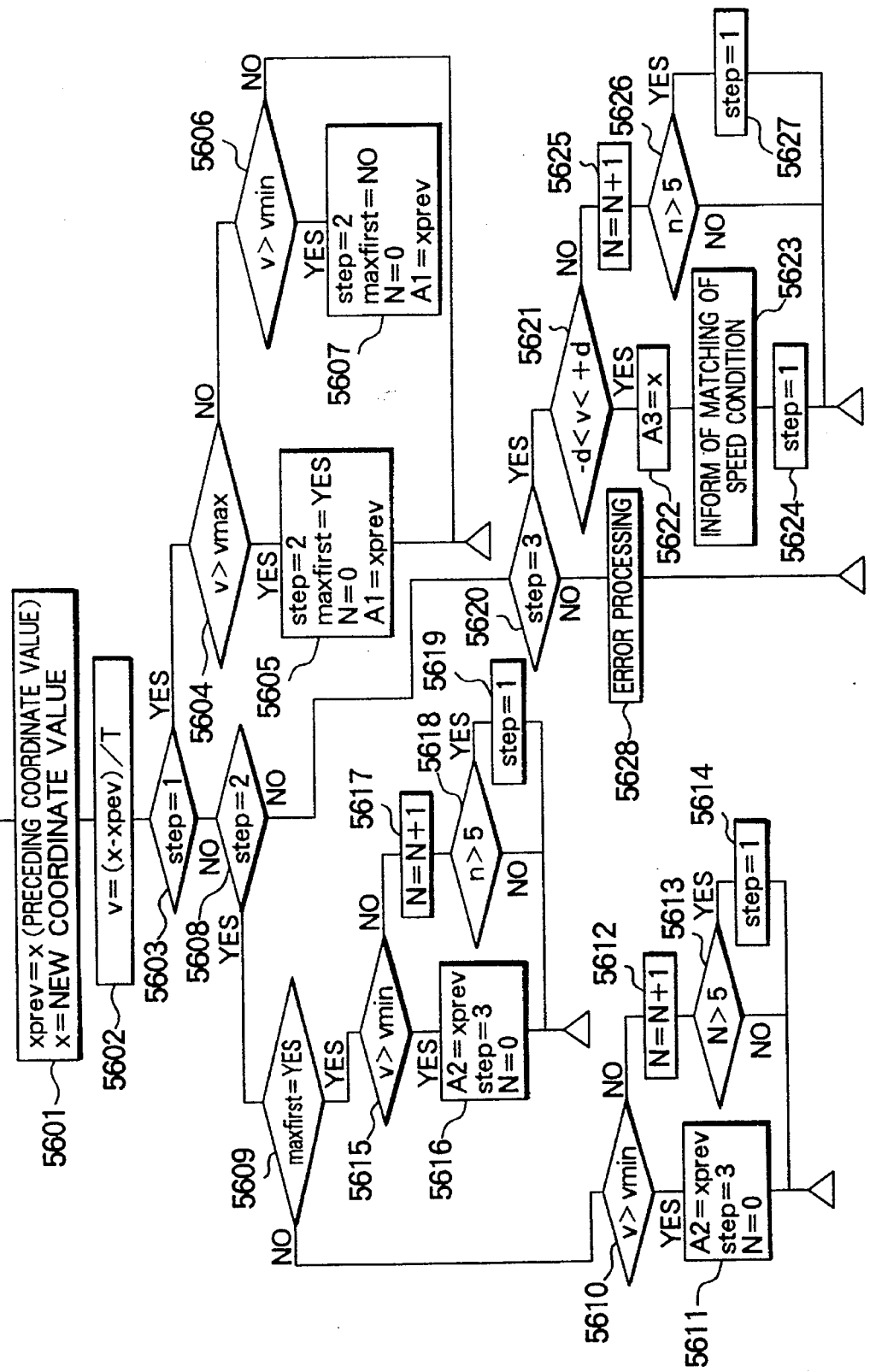
FIG. 56 is a flow chart of a processing performed by a speed detecting section.
Figure 57:
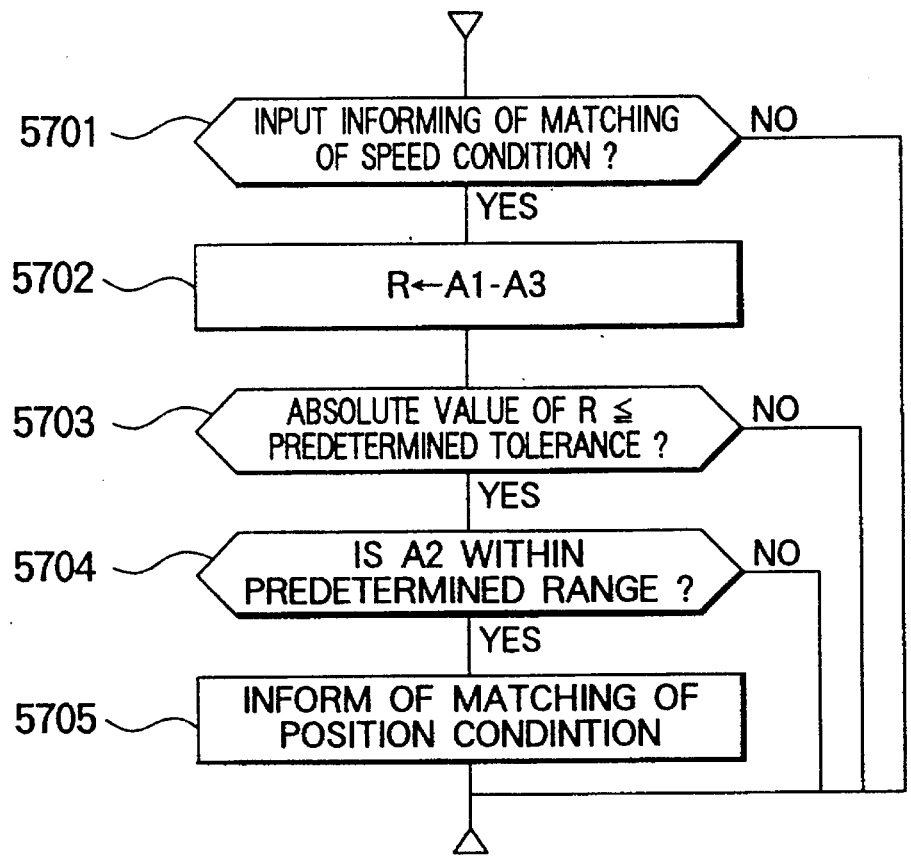
FIG. 57 is a flow chart of a processing performed by a coordinate position comparing section.
Figure 58:
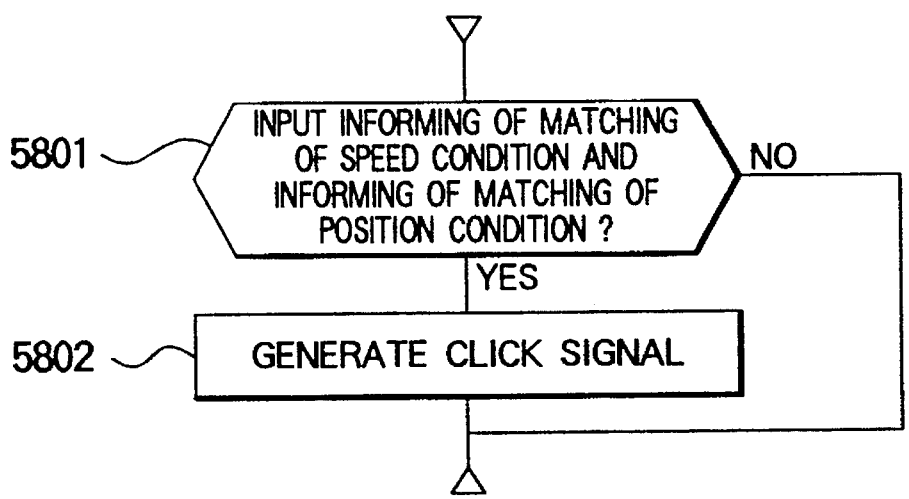
FIG. 58 is a flow chart of a processing performed by a judging section.
Figure 59:
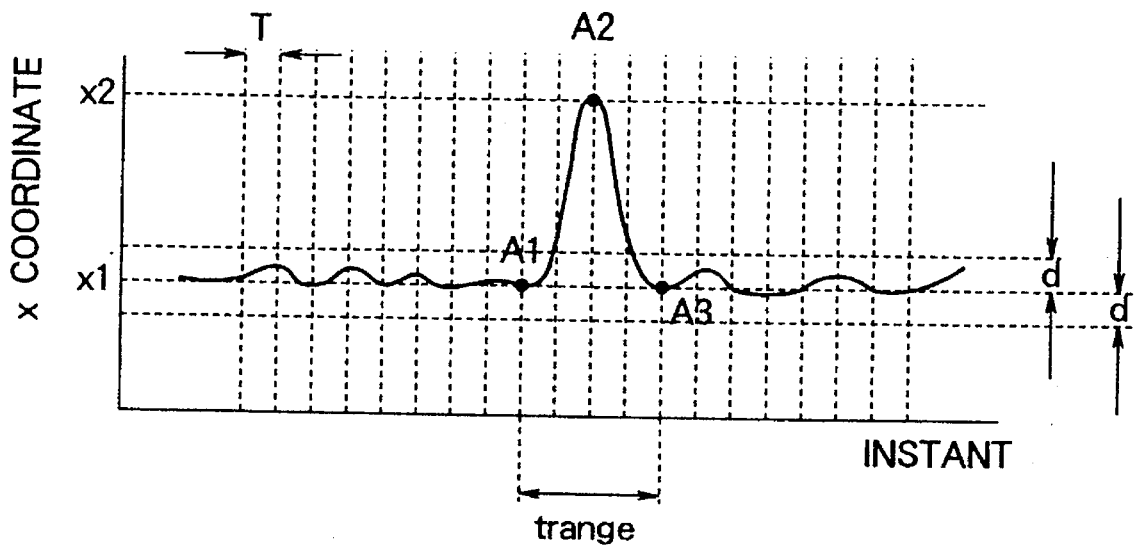
FIG. 59 is an explanatory diagram showing an input coordinate detected by the input controller.
Figure 60:
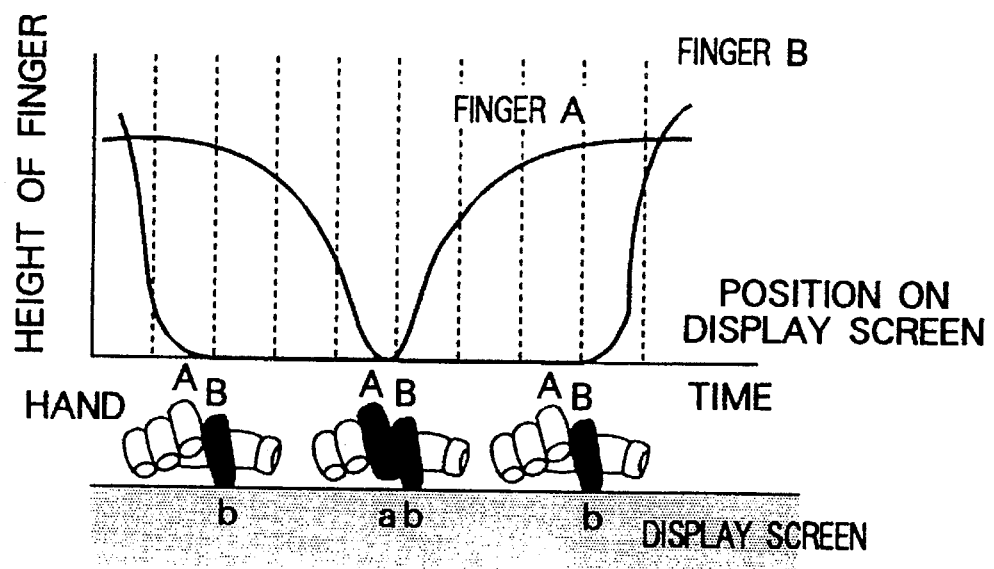
FIG. 60 is an explanatory diagram showing the movement of the fingers of a user at the time of a click input operation.
Figure 61A:
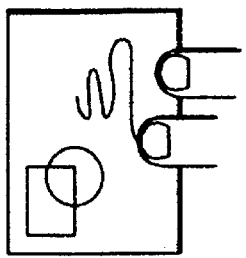
FIGS. 61A to 61C are explanatory diagrams showing specific examples of a click input operation by a user.
Figure 61B:
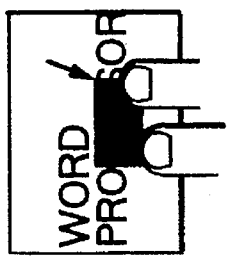
Figure 61C:
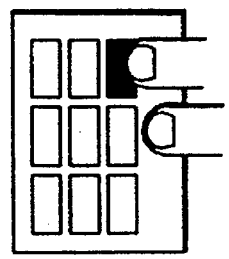

In the following, another embodiment of the present invention will be explained by use of FIGS. 51 to 61. FIG. 51 is a block diagram of a click input controller according to the present embodiment. FIG. 52 is a block diagram of an information processing apparatus. FIG. 53 is a view showing the external appearance of the information processing apparatus. FIGS. 54A and 54B are diagrams showing input coordinates. FIGS. 55A to 55D are diagrams showing an input coordinate detected by the input controller. FIG. 56 shows the procedure of a processing performed by a speed detecting section. FIG. 57 shows the procedure of a processing performed by a coordinate position comparing section. FIG. 58 shows the procedure of a processing performed by a judging section. FIG. 59 is a diagram showing an example of an input coordinate. FIG. 60 is a diagram showing the movement of the fingers of a user at the time of a click operation. FIGS. 61A to 61C are diagrams showing specific examples of a click input operation.

When a click operation shown in FIG. 60 is performed by a user, two points Pa and Pb shown in FIGS. 54A and 54B are depressed. As a result, L2 is output as a coordinate. The change of the coordinate on a time axis is shown by FIGS. 55A to 55D. FIGS. 55A and 55C show a click operation input, and FIGS. 55B and 55D show an input other than click. An input controller 5124 shown in FIG. 51 discriminates the click operation input and the input other than click from each other to detect a click input. The procedures of processings performed by a speed detecting section 5113, a coordinate position comparing section 5114 and a judging section 5115 forming the input controller 5124 are shown by FIGS. 56, 57 and 58, respectively.

FIG. 59 shows an example of a system in which the convenience of use is improved in the present embodiment by allowing a change in input coordinate before and after a click operation to a certain degree. When the change in coordinate is not larger than d, the judgement as being a click input is made.

With the construction shown in FIG. 59, a construction is also possible in which the judgement based on speed information is eliminated while thereinstead using the judgement condition that points A1 and A3 before and after a click operation are generated in a predetermined time (trange).

Examples of the application of the present embodiment are shown in FIGS. 61A, 61B and 61C. The example shown in FIG. 61A is suitable for a function selecting operation for button/function or the like. For example, the click operation in the present invention can be used as an alternative to a double click operation of a mouse. The example shown in FIG. 61B is suitable for area designation for character/figure (drag operation). The example shown in FIG. 61C is suitable for a drawing operation for figure. For example, the click operation in the present invention can be applied for the decision of a drawing start point (or a start point).

In the following, other embodiments of an information processing apparatus of the present invention will be explained in detail by use of the drawings.

Figure 62:
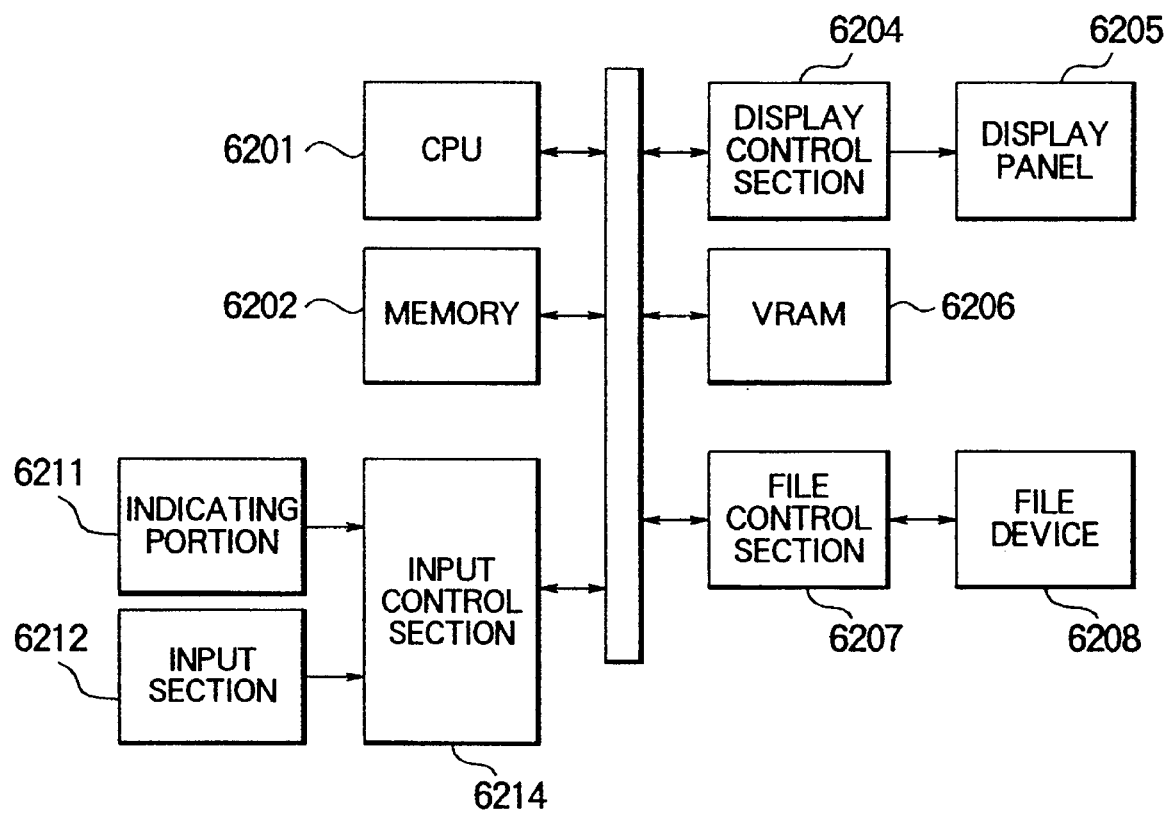
FIG. 62 is a diagram schematically showing an embodiment of an information processing apparatus of the present invention.

FIG. 62 is a diagram which schematically shows the an embodiment of an information processing apparatus of the present invention. In FIG. 62, reference numeral 6211 denotes an indicating portion (for example, a hand finger) for making the indication of a coordinate to be input, numeral 6212 indicates an input section (for example, a pressure sensitive type tablet) to which coordinate information is input, numeral 6214 represents an input control section for controlling the input section 6212, numeral 6201 represents a CPU (or processing execution means) for controlling the whole of the information processing apparatus, numeral 6202 denotes a memory such as a RAM or ROM, numeral 6204 a display control section for making a display output control, numeral 6205 indicates a display panel such as LCD (liquid crystal display) or CRT for making a display output, numeral 6206 represents a VRAM (video RAM) for storing display data, numeral 6207 represents a file control section for making an input/output control for a data file, and numeral 6208 denotes a file device (for example, a floppy disk, hard disk, memory card or IC card) for storing and holding the data file.

In FIG. 62, the functions and operations performed by the information processing apparatus are stored and held as programs in the file device 6208 and the memory 6202. The CPU 6201 (or processing execution means) performs processings which correspond to the programs. The display control section 6204 outputs, data such as the result of execution generated to the VRAM 6206 by the CPU 6201, to the display panel 6205 which in turn displays the data. Information input by a user by virtue of the input section 6212 and the indicating portion 6211 is stored and held into the memory 6202 through the input control section 6214. Thereby, access from the CPU 6201 or the like becomes possible. For example, when the indicating portion 6211 is a user's finger, the CPU 6201 performs processings including a processing for displaying a cursor at a coordinate on the display screen corresponding to information of a coordinate at which the depression by the user's finger is detected by the input section 6212 and a judgement processing for judging, when the user's finger is detached from input section 6212 on specified display content regions such menus, the presence/absence of selection of a menu item.

Figure 63:
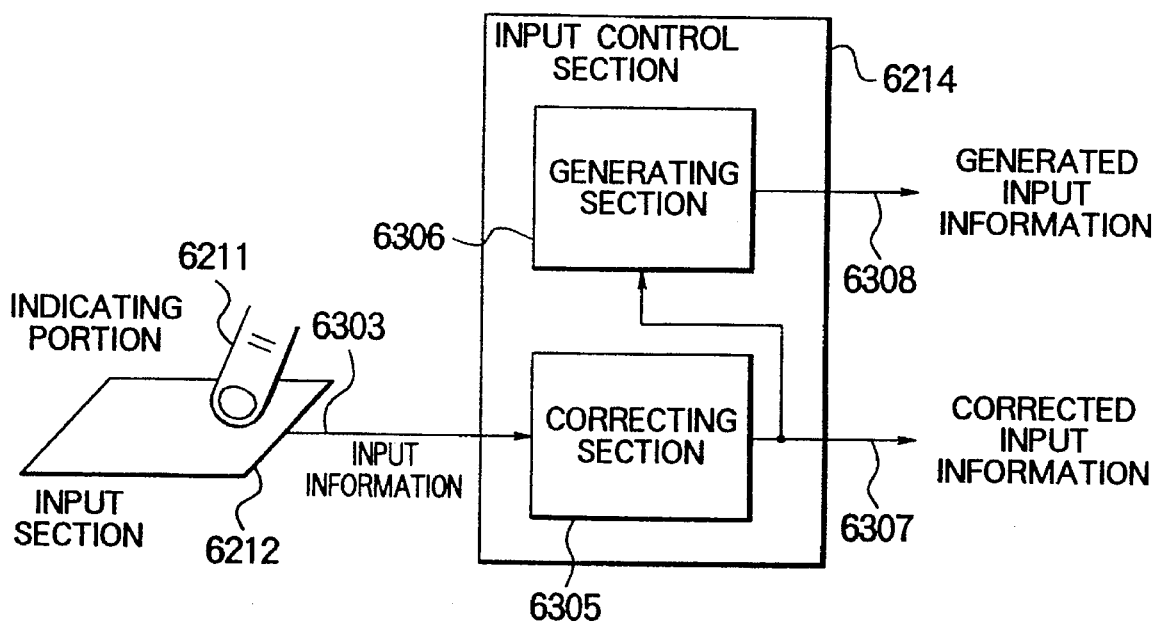
FIG. 63 is a diagram showing the main part of the embodiment of the information processing apparatus of the present invention.

FIG. 63 is a diagram showing the main part of the embodiment of the information processing apparatus of the present invention. In FIG. 63, the same components as those in FIG. 62 are denoted with the same reference numerals as those used in FIG. 62. Therefore, explanation of those components will be omitted. In FIG. 63, reference numeral 6303 denotes input information output by the input section 6212, numeral 6305 indicates a correcting section provided in the input control section 6214 for correcting the input information 6303, numeral 6306 represents a generating section provided in the input control section 6214 for making the conversion of the input information 6303, numeral 6307 represents corrected input information outputted by the correcting section 6305, and numeral 6308 denotes generated input information output by the generating section 6306. Information, which may be considered as the input information 6303, includes coordinate information which is an input position of the indicating portion 6211 on the input section 6212, binary-valued or multi-valued switch information outputted from at least one switch mechanism provided to the input section 6212 or the indicating portion 6211, tilt information representing the tilt angle of the indicating portion 6211 for the input section 6212, binary-valued or multi-valued depression pressure information representing the depression pressure of the indicating portion 6211 for the input section 6212, and so on. In the present embodiment, the coordinate information and the depression pressure information can be detected by the input section 6212. The correcting section 6305 performs a correction processing which includes the correction for the precision of the input information 6303 such as coordinate information and coordinate correction for the adaptation of a resolving power to the information processing apparatus.

Figure 64:
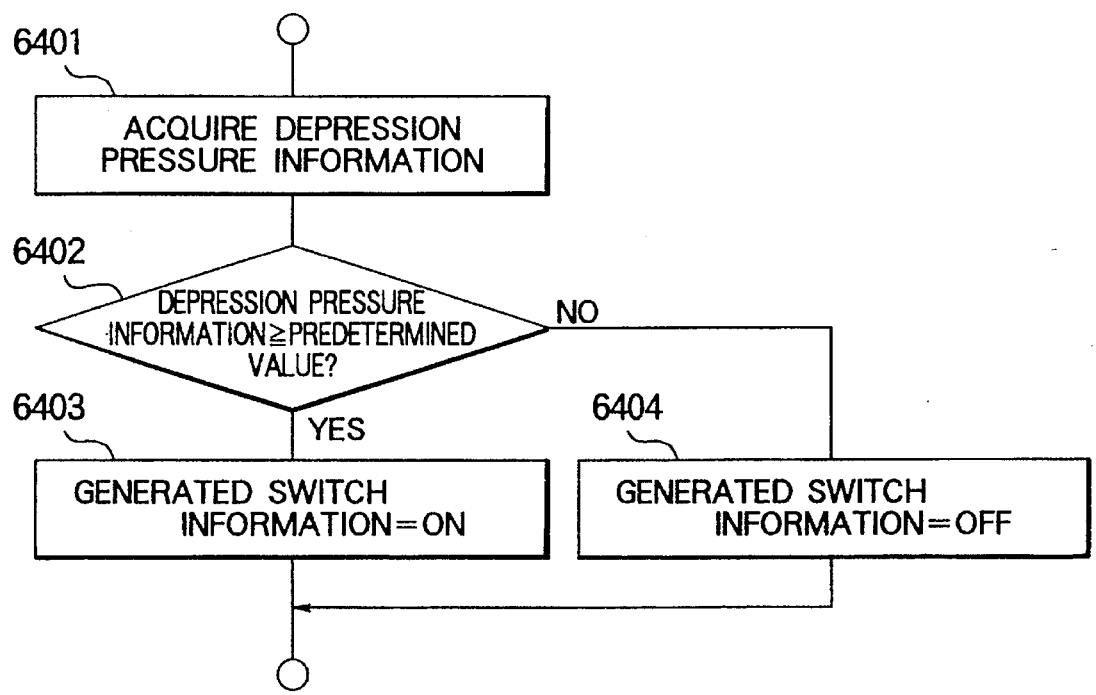
FIG. 64 is a chart showing the flow of a processing performed by a generating section shown in FIG. 63.

FIG. 64 is a chart showing the flow of a processing performed by the generating section 6306 shown in FIG. 63. This processing is activated periodically by a timer or the like or occasionally by detecting the generation of a specified condition for specified input information. Input information 6303 is input from the input section 6212 to the generating section 6306 through the correcting section 6305. In step 6401, depression pressure information detected by the input section 6212 is obtained as the input information

6303. In step 6402, the obtained depression pressure information is compared with a predetermined value as set beforehand. When the depression pressure information is not smaller than the predetermined value, generated switch information (or generated input information) is turned "ON" (step 6403).

When the depression pressure information 1S smaller than the predetermined value, the generated switch information is turned "OFF" (step 6404). With the above, generated switch information can be obtained from the inputting portion such as a finger having no switch mechanism in itself as if a switching was made by indicating means having a switch mechanism. Also, the indicating portion 6211 erroneously touches the input section 6212, the generating section 6306 judges the depression pressure information as being smaller than the predetermined value so that the generated switch information is not inverted (or not turned "ON"). Namely, the input of coordinate information is judged as being invalid. As a result, the possibility of an erroneous operation is reduced, thereby making it possible to improve the reliability.

Figure 65:
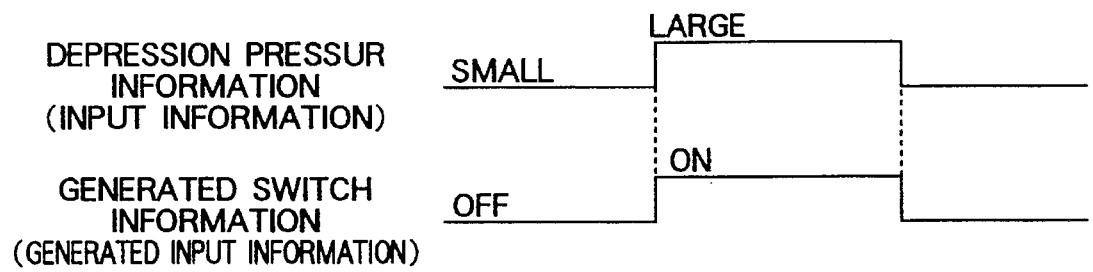
FIG. 65 is a chart showing an example of a state transition of information concerning the generating section shown in FIG. 63.

FIG. 65 shows an example of the state transition of depression pressure information input to and generated switch information from the generating section when the depression pressure takes either one of two values of "LARGE" and "SMALL". In FIG. 65, when the depression pressure information is "SMALL" (or smaller than the predetermined value), the generated switch information is turned "OFF". When the depression pressure information is "LARGE" (or not smaller than the predetermined value), the generated switch information is turned "ON". The generated switch information is used for judging whether the coordinate information is valid or invalid, as mentioned above.

Though the present embodiment has been mentioned in conjunction with the case where the depression pressure information is binary-valued, a similar processing may also be performed when the depression pressure information is multivalued. Also, though the explanation has been made in conjunction with an example in which the generated switch information is generated on the basis of the depression pressure information, as shown in FIG. 64, the processing performed by the generating section is not limited to such an example. A similar processing can be performed using, for example, information of the tilt of the indicating portion for the input section. Further, though there has been shown a construction in which the generating section 6306 is included in the input control section, it is possible to use a construction in which the generating section is provided independently from the input control section or a construction in which the generating section is included in another means forming the information processing apparatus. Also, it is possible to use a construction in which the function of the generating section is provided by only software, for example, it is realized by a program executed by the CPU, or it is provided by a proper combination of software and hardware. Furthermore, though there has been shown a construction in which the generating section 6303 newly generates the generated input information by use of the corrected input information detected by the input section 6212, it is possible to use a construction in which the generated input information is newly generated on the basis of information obtained from another means such as the CPU 6201 or sensors forming the information processing apparatus. Also, it is possible to use a construction in which input information is converted in accordance with a certain specified set value, for example, in such a manner that the input information is amplified in accordance with a predetermined amplification factor, or a construction in which the above-mentioned constructions are properly mixed. Though no particular description has been made, the input section and the display section can take either a display/input integrated construction in which at least parts of an input area of the input section and a display area of the display section overlap each other or a discrete construction in which the input section and the display section do not overlap each other.

Figure 66:
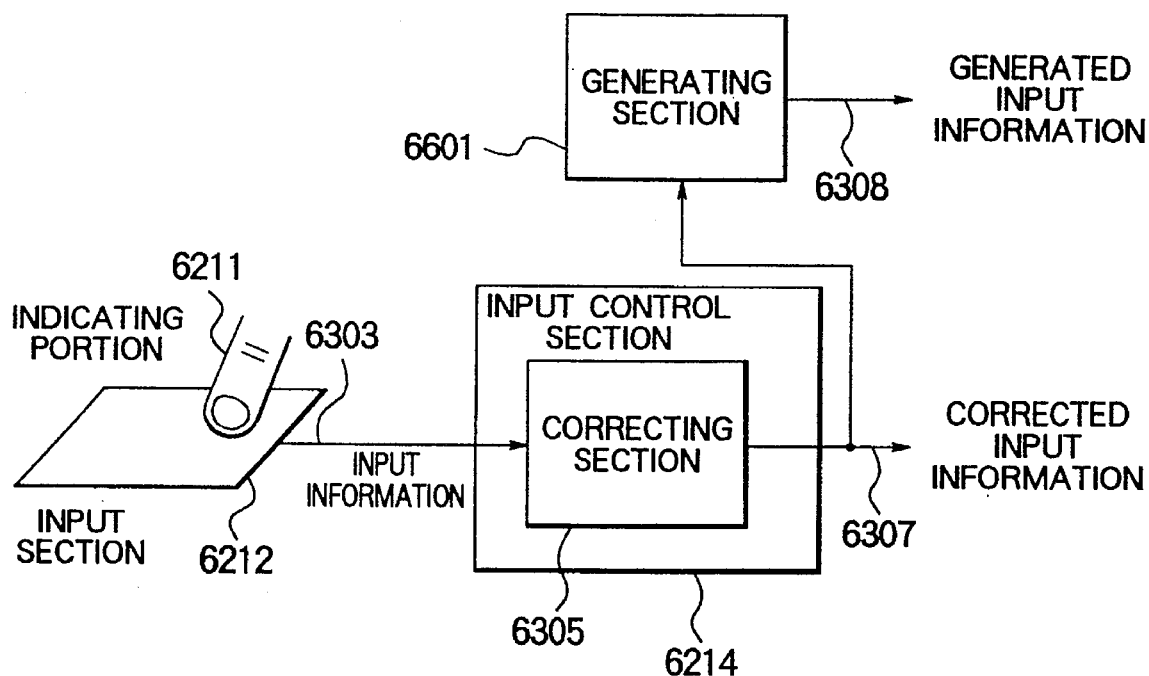
FIG. 66 is a diagram showing the main part of another embodiment of an information processing apparatus of the present invention.

FIG. 66 is a diagram showing the main part of another embodiment of an information processing apparatus of the present invention. In FIG. 66, the same components as those in FIG. 63 are denoted with the same reference numerals as those used in FIG. 63. Therefore, explanation of those components will be omitted or properly made together with means shown in FIG. 66. In FIG. 66, reference numeral 6601 denotes a generating section provided independently from an input control section 6214 for generating generated input information 6308. Input information 6303 detected by an input section 6212 is corrected by a correcting section 6305 in the input control section 6214 and is then outputted as corrected input information 6307. The CPU 6201 for processing execution means) and others form an information processing apparatus which uses the corrected input information 6307 to possess a graphic/user interface environment mainly including a pointing operation. The generating section 6601 performs a conversion processing on the basis of the corrected input information 6307 to generate and output generated input information 6308.

For example, as shown in FIG. 66, the generating section 6601 compares depression pressure information (or input information) with a predetermined value as set beforehand to generate and output generated switch information (or generated input information) which is turned "ON" when the depression pressure exceeds the predetermined value and "OFF" when the depression pressure is not larger than the predetermined value. The CPU 6201 monitors a change of the generated switch information to determine the execution of a coordinate designation (corresponding to a click operation in a mouse operation) when the generated switch information is changed from "OFF" to "ON", thereby performing the input of a coordinate value or the designation and execution of a selected command. Also, when the generated switch information is changed from "OFF" to "ON" (or a start point) at a first coordinate and the coordinate information is changed with the "ON" state being maintained and the generated switch information is changed from "ON" to "OFF" (or an end point) at a second coordinate, it is determined that the designation of a region (corresponding to a drag operation in a mouse operation) is made.

Figure 67:
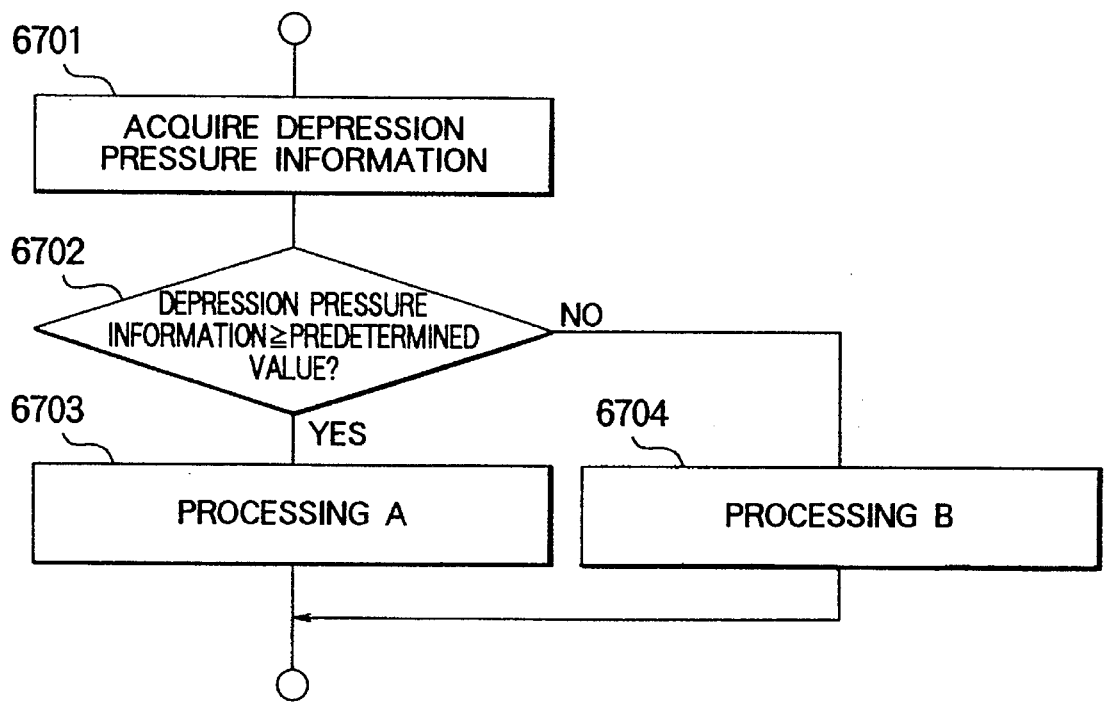
FIG. 67 is a chart showing the flow of a processing performed by a generating section shown in FIG. 66.

FIG. 67 is a chart showing the flow of a processing performed by the generating section 6601 shown in FIG. 66. This processing is activated periodically by a timer or the like or occasionally by detecting the generation of a specified condition such as a change in coordinate information for specified input information. In step 6701, depression pressure information detected by the input section 6702 is obtained as input information 6303. In step 6702, the obtained depression pressure information is compared with a predetermined value as set beforehand. When the depression pressure information is not smaller than the predetermined value, a specified processing A is performed in step 6703. When the depression pressure information is smaller than the predetermined value, a specified processing B is performed in step 6704. For example, when a word processor function is performed by the information processing apparatus of the present invention, an input operation using the indicating portion 6211 such as a hand finger or pen makes it possible to establish the display of a document or the like on the display screen in an enlarged size (or the processing A) when the input section 6212 is strongly depressed by a depression pressure not smaller than a certain predetermined value and in a standard size (or the processing B) when the strong depression is stopped. Namely, a display mode change-over is made without performing a special operation with the exception of the use of the indicating portion 6211. Another example of the processing A/B may include a change-over in display magnification or display contents, a change-over in display scroll rate, and so on.

According to the present embodiment as mentioned above, even in an information processing apparatus provided with indicating means (such as a hand finger) and input means having no function of detecting specified information such as switch information (for example, information representing a click operation for coordinate designation or a drag operation for region designation in a mouse), the operability similar to when using input means capable of detecting the above-mentioned specified input information can be realized by using another kind of input information (or depression pressure information) capable of being detected by the above-mentioned input section in such a manner that it is utilized after conversion by the generating section.

The generating section may take any one of a construction in which the generating section is provided independently from another means forming the information processing apparatus, a construction in which the generating section is included in the input control section, and a construction in which the generating section is included in another means forming the information processing apparatus. Also, the generating section can be provided by hardware, software or the combination thereof. For example, when the generating section is realized by only software executed by the CPU 6201 (or processing execution means), the number of parts forming the apparatus can be reduced since the processing flow shown in FIG. 67 is realized by the CPU 6201. When a part of the processing flow is realized by hardware, the processing speed is enhanced, thereby making it possible to improve the response speed. In the latter case, the processing for realizing the generating section can also be performed in a fashion shared with another means forming the information processing apparatus, for example, in such a manner that the hardware portion outputs a signal designating a state such as standard/enlarged display mode and a standard/enlarged size display processing is performed by the CPU 6201 (or processing execution means) or the like in accordance with the state designating signal.

Figure 68:
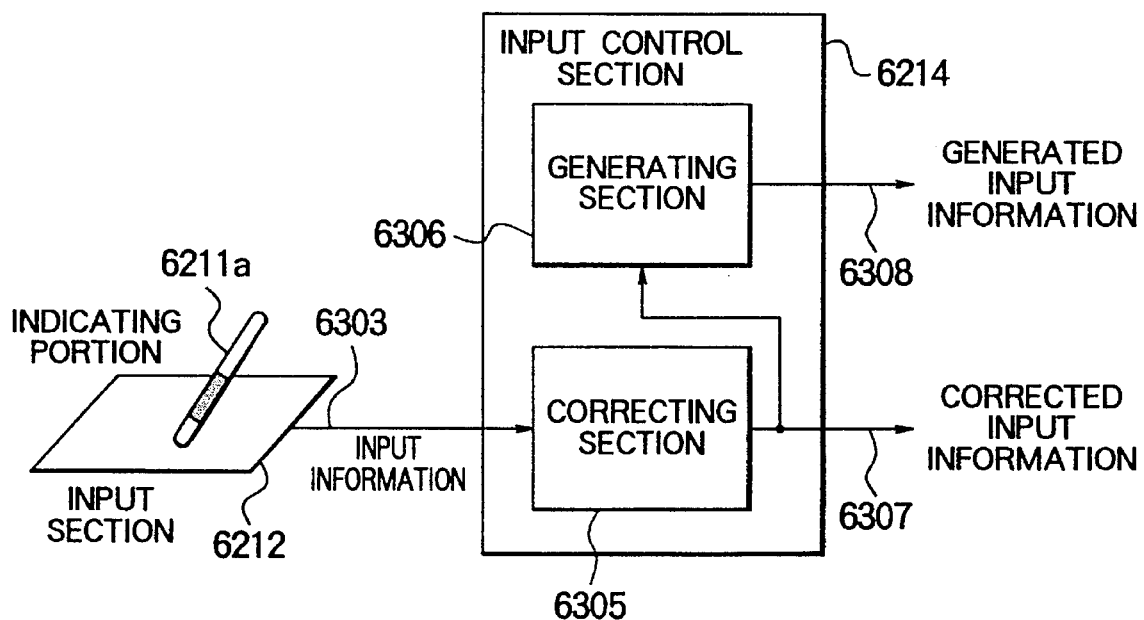
FIG. 68 is a diagram showing the main part of a further embodiment of an information processing apparatus of the present invention.

FIG. 68 is a diagram showing the main part of a further embodiment of an information processing apparatus of the present invention. In FIG. 68, the same components as those in FIG. 63 are denoted with the same reference numerals as those used in FIG. 63. Therefore, explanation of those components will be omitted. In FIG. 68, reference numeral 6211*a* denotes an indicating portion constructed by a pen which has a switch mechanism.

Figure 69:
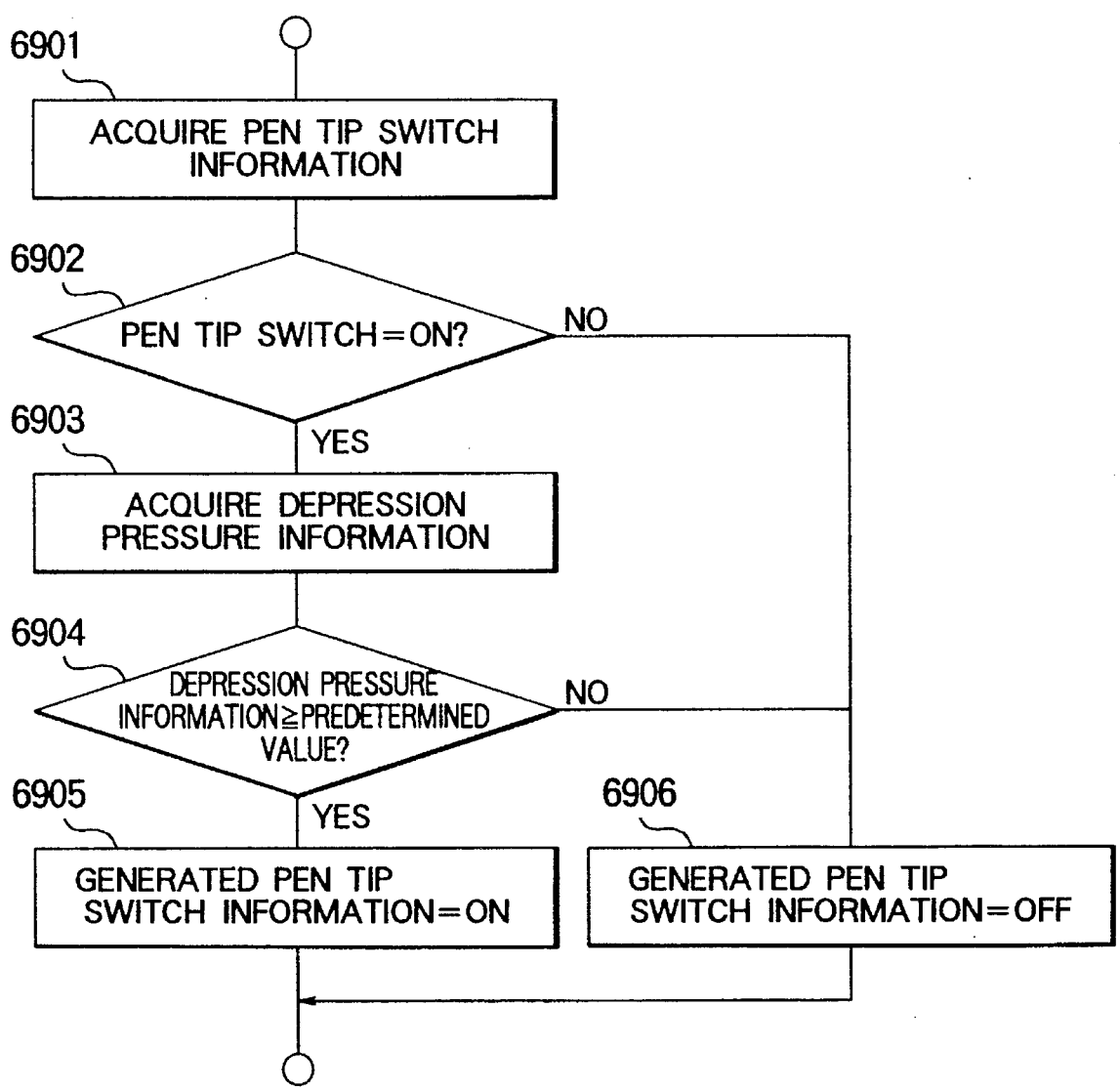
FIG. 69 is a chart showing the flow of a processing performed by a generating section shown in FIG. 68.

FIG. 69 is a chart showing the flow of a processing performed by a generating section 6306 shown in FIG. 68. This processing is activated periodically by a timer or the like or occasionally by detecting the generation of a specified condition for specified input information. In step 6901, pen tip switch information representing whether or not the indicating portion 6211*a* and an input section 6212 touch each other, is obtained as input information 6303. In step 6902, the condition of the pen tip switch information is judged. When the pen tip information is "ON" (or the tip of the indicating portion 6211*a* touches the input section 6212), the flow branches to step 6903. When the pen tip information is "OFF" (or the tip of the indicating portion 6211*a* does not touch the input section 6212), the flow branches to step 6906. In step 6903, depression pressure information and a predetermined value as set beforehand are compared with each other. When the depression pressure information is not smaller than the predetermined value, generated pen tip switch information (or generated input information) is turned "ON" in step 6905. When the depression pressure information is smaller than the predetermined value, the generated pen tip switch information is turned "OFF" in step 6906.

Figure 70A:
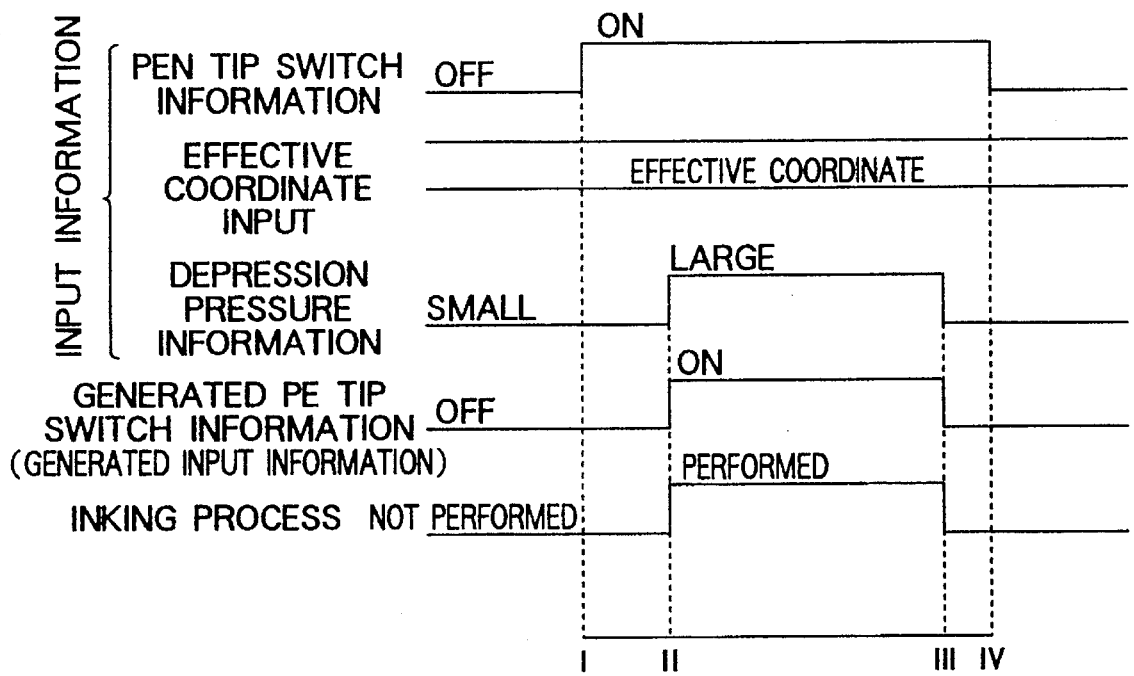
FIGS. 70A and 70B are charts showing an example of an inking process for displaying the trace of coordinate information input by an indicating portion as the state transition of a processing which corresponds to information concerning the generating section shown in FIG. 68.
Figure 70B:
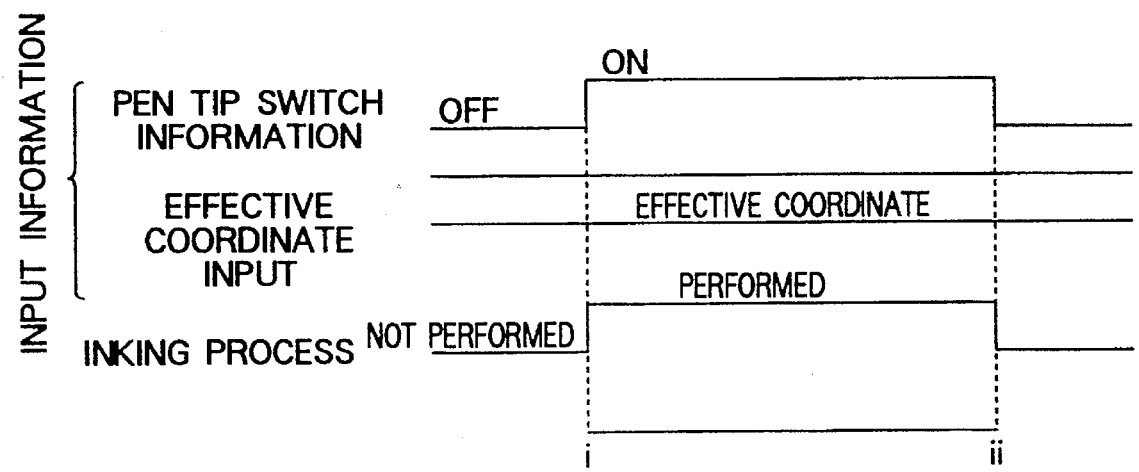

FIGS. 70A and 70B are charts showing an example of an inking process for displaying the trace of coordinate information input by the indicating portion as the state transition of a processing which corresponds to information concerning the generating section shown in FIG. 68. FIG. 70A represents the state transition in the present invention and FIG. 70B represents the state transition in the prior art. It is assumed that depression pressure information takes either one of two values of "LARGE" and "SMALL". Namely, in the state transition in the prior art shown in FIG. 70B, an inking process (or a processing for displaying the trace of a change in coordinate information designated by the indicating means 6211*a*) is turned into a "performed" condition at the point of time "i" when pen tip switch information is changed from "OFF" to "ON" and into a "not performed" condition at the point of time "ii" when the pen tip switch information is changed to "OFF" again.

On the other hand, in the state transition in the present invention shown in FIG. 70A, at the point of time "I" when pen tip switch information is changed from "OFF" to "ON", an inking process is maintained at a "not performed" condition and the generating section 6306 makes the comparative judgement of depression pressure information from the indicating portion 6211*a* to the input section 6212, as mentioned above. At the point of "II" when the depression pressure is increased so that the depression pressure information is changed from "SMALL" to "LARGE", generated pen tip switch information is changed from "OFF" to "ON" to turn an inking process into a "performed" condition. At the point of "III" when the depression pressure is decreased so that the depression pressure information is changed from "LARGE" to "SMALL" again, the generated pen tip switch information is changed from "ON" to "OFF" to turn the inking process into a "not performed" condition.

In the present embodiment as mentioned above, in order to judge whether or not the indicating portion 6211*a* touches the input section 6212, the generated pen tip switch information is used in lieu of the pen tip switch information in the prior art to prevent an inking process from being performed in the case where the indicating portion 6211*a* erroneously touches the input section 6212. Thereby, the precision and reliability of the inking process can be improved. In FIG. 68, the generation of a chattering by the pen tip switch can be prevented by maintaining the pen tip switch information at an "ON" condition even if the pen tip switch information takes an "OFF" condition for a very short period of time in the case where the depression pressure information is not smaller than the predetermined value. Further, since the above effect is obtained by merely replacing the pen tip switch information in the prior art by the generated pen tip switch information outputted by the generating section

6306, portions having a need to be changed in the processing execution means are relatively little, thereby making it possible to develop an information processing apparatus of the present embodiment in a short period of time.

In the present embodiment, a construction is used in which the generated pen tip switch information is output by the generating section 6303. However, information to be generated and a generating method are not limited to those disclosed. Also, though there is shown a construction in which the input section and the generating section are incorporated into the information processing apparatus, the information processing apparatus can be constructed by another structure such as a construction in which the input section and the generating section are separated from the information processing apparatus body.

In the following, examples of the application of the information processing apparatus of the present invention will be shown.

A first example of application is an example of an information processing apparatus having an input section capable of detecting a depression pressure in which, when a specified condition is satisfied as in the case where depression information is not smaller than a predetermined value, it is determined that a pressure (or load) not smaller than the predetermined value is applied to the input section, a display section or the like and a user can be informed of a warning message by performing a process for warning the user, by using an alarm sound, in order to prevent the breakage of the input section or the display section. This example can be realized in such a manner that the processing A in the processing flow shown in FIG. 67 is applied to the user warning process and the processing B is applied to a processing in which none is performed. Thereby, it becomes easy to prevent the failure or breakage of the apparatus from occurring due to the application of an excess load to the input section, the display section or the like. As a result, it is possible to improve the reliability of the information processing apparatus.

A second example of application is an example of an information processing apparatus having an input section capable of detecting a depression pressure in which, in executing an instruction such as the reduction of file having a large influence caused by an erroneous operation, a processing for stopping the execution of the above instruction can be performed when a specified condition is not satisfied as in the case where depression information is not smaller than a predetermined value. This example can be realized in such a manner that the processing A in the processing flow shown in FIG. 67 is applied to a processing for executing the above instruction and the processing B is applied to the processing for stopping the execution of the above instruction. Thereby, it becomes possible to reduce the generation of the damage of data or the like caused by an erroneous operation. As a result, it is possible to improve the reliability of the information processing apparatus.

According to the above embodiments, it is possible to provide an input/output integrated information processing apparatus which can improve the operability of position information input using a finger or an indicator such as a pen.

Also, it is possible to improve the operability of an position indication operation or the like by a pen or a finger in an input/output integrated information processing apparatus in which a tablet for inputting a coordinate and a display device for making a display are integrated.

Further, display information, which approximately (or substantially) coincides with an extended projection point representing an indicating direction intended by a user can be made an object of indication (or an object of selection), thereby improving the reliability in indication of display information.

Furthermore, the improved precision of indication enables the indication (or selection) with a high precision even when the display area of an object of indication is small. Also, more objects of indication can be displayed on the same display area. Thereby, the convenience of use can be improved.

Since it is possible to absorb a deviation which may be caused in an operation by a finger or the like between a position subjected to position indication and a position subjected to tapping, the judgement of a tapping for selection indication can be made accurately. Therefore, it is possible to eliminate the planar movement of a finger or the like between an operation for position indication and an operation for selection indication from the selection of an object by a finger or the like, thereby improving the operability of an object selection operation or the like.

Even when an input panel is operated using a pen having no physical switch, it becomes possible to realize a click input equivalent to a button click in a mouse or the click of a pen with a switch, thereby improving operability.

In an operating system, window system or application system provided with a pointing device in which a button click such as a mouse is possible, the convenience of use is improved by realizing the same operation environment even in the case where an input panel is operated by use of a finger.

An information processing apparatus having input means for detecting input information inclusive of at least coordinate information by indication from indicating means is provided with generating means for generating generated input information from the input information and processing execution means for performing a processing which corresponds to the generated input information. The generating means generates, as the generated input information, processing branch information indicating whether or not the input information satisfies a predetermined processing branch condition. The input means includes a pointing device such as a tablet, mouse or the like. The input information may include, in addition to the coordinate information, switch information representing the condition of a switch provided at either the indicating means or the input means, depression pressure information representing the depression pressure of the indicating means for the input means, and tilt information representing the angle of abutment of the indicating means against the input means.

The generating means generates, as the generated input information, depression pressure branch information representing whether or not the depression pressure information included in the input information satisfies a predetermined depression branch condition. For example, the generating means generates, as the generated input information, generated switch information (or depression pressure branch information) which can be detected by the pointing device. Namely, when the depression pressure information is not smaller than a predetermined value, the generated switch information is turned "OFF". When the depression pressure information is smaller than the predetermined value, the generated switch information is turned "ON". Therefore, even when the input is made by use of indicating means which has no switch mechanism such as a click button of a mouse or a pen tip switch of a touch pen, generated switch information can be obtained similarly to the case of indicating means having a switch mechanism.

The processing execution means performs a corresponding processing with the depression pressure branch information being substituted for switch information in the pointing device. Namely, coordinate information, when the generated switch information is changed from an "ON" condition to an "OFF" condition, is processed as an indicated coordinate (or a coordinated subjected to a click operation in a mouse). Also, when the generated switch information changes from the "OFF" condition to the "ON" condition at a certain coordinate position, corresponding coordinate information is judged as being a start point position. When the generated switch information changes from the "ON" condition to the "OFF" condition again, corresponding coordinate information is judged as being an end point position. A specified region between the start point position and the end point position is processed as an indicated region (or a region subjected to a drag operation in a mouse). Therefore, an erroneous operation of the indicating means or the like becomes hard to occur. As a result, an error in indication of a coordinate or region is prevented, thereby making it possible to improve operability and reliability.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. An input/output integrated information processing apparatus including a display device and a substantially transparent input tablet having an input surface placed on a display surface of said display device for outputting a pointing coordinate which is a coordinate on said input surface pointed to by a user utilizing a finger or an indicator, comprising:

indication direction extended point determining means for determining an indication direction extended point coordinate, which is an intersection of an extended projection of the finger or the indicator intended by the user and the display surface of said display device, from the pointing coordinate output by said input tablet and a predetermined value by utilizing information including the set diameter of a tip of the user's finger or the indicator, the set tilt angle of the user's finger or the indicator in a direction normal to said input surface, and said pointing coordinate; and display processing means for displaying a point, by utilizing a cursor, on the display surface of said display device, corresponding to the determined indication direction extended point coordinate so as to distinguishably display the determined indication direction extended point coordinate on said display device.

2. An input/output integrated information processing apparatus according to claim 1, wherein said display processing means displays said cursor point on the display surface of said display device corresponding to the determined indication direction extended point coordinate.

3. An input/output integrated information processing apparatus according to claim 2, further comprising:

means for displaying a figure accepting the designation of a requested processing on said display device; and processing means for performing a processing corresponding to a figure indicated on the display surface by said cursor displayed on said display device.

4. An input/output integrated information processing apparatus according to claim 2 or 3, wherein said display processing means displays, on the display surface of said display surface, a cursor which has a form to generally include a point corresponding to the pointing coordinate output by said input tablet and a point corresponding to the determined indication direction extended point coordinate.

5. An input/output integrated information processing apparatus according to either of claims 2 and 3, wherein said display processing means displays, on the display surface of said display device, a cursor of a form having as a central axis a straight line connecting a point on the display surface of said display surface corresponding to the pointing coordinate output by said input tablet and a point on the display surface of said display surface corresponding to the determined indication direction extended point coordinate.

6. An input/output integrated information processing apparatus according to claim 1, wherein said normal direction tilt angle information includes a plurality of tilt angle information set corresponding to respective coordinates on said input surface, and said indication direction extended point detecting means uses, as said normal direction tilt angle information, the normal direction tilt angle information set corresponding to a coordinate on said input surface designated by said pointing coordinate to determine said indication direction extended point coordinate.

7. An input/output integrated information processing apparatus according to claim 1, wherein said indication direction extended point detecting means uses information of the set tilt angle of the user's finger or the indicator for a predetermined reference line on said input surface in an input surface direction in addition to information of the set diameter of the user's tip of the finger or the indicator, information of the set tilt angle of the user's finger or the indicator in a direction normal to said input surface, and said pointing coordinate to determine said indication direction extended point coordinate.

8. An input/output integrated information processing apparatus according to claim 7, wherein said input surface direction tilt angle information includes a plurality of tilt angle information set corresponding to respective coordinates on said input surface, and said indication direction extended point detecting means uses, as said input surface direction tilt angle information, the input surface direction tilt angle information set corresponding to a coordinate on said input surface designated by said pointing coordinate to determine said indication direction extended point coordinate.

9. A pointing device for outputting an input position coordinate, comprising:

an input tablet for outputting a pointing coordinate which is a coordinate on an input surface pointed by a user utilizing a finger or an indicator;

indication direction extended point detecting means for determining an indication direction extended point coordinate, which is an intersection of an extended projection of the finger or the indicator intended by the user and the input surface of the input tablet from the pointing coordinate output by said input tablet and a predetermined set value by utilizing information including the set diameter of a tip of the user's finger or the indicator, the set tilt angle of the user's finger or the indicator in a direction normal to said input surface, and said pointing coordinate; and means for outputting the determined indication direction extended point coordinate as an input position coordinate.

10. An input/output integrated information processing apparatus comprising the pointing device according to claim 9 and a processor for performing a processing which corresponds to the input position coordinate output by said pointing device.

11. A pointing device according to claim 9, further comprising means for correcting said pointing coordinate or said input position coordinate in accordance with the value thereof.

12. A method of accepting an indication of a position in an integrated information processing apparatus including a display device and a substantially transparent input tablet having an input surface placed on a display surface of said display device for outputting a pointing coordinate which is a coordinate on said input surface pointed to by a user utilizing a finger or an indicator, said method comprising the steps of:

receiving the pointing coordinate output by said input tablet utilizing a cursor;

estimating, from the received pointing coordinate, a position on said input surface of said display surface which is an intersection of an extended projection of the finger or the indicator intended by the user and the display surface of said display device of a direction indicated by the user's finger or the indicator; and performing a processing which corresponds to the estimated position by utilizing information including the set diameter of a tip of the user's finger or the indicator, the set tilt angle of the user's finger or the indicator in a direction normal to said input surface, and said pointing coordinate.

13. An information processing apparatus provided with a display/input device having a display/input surface for display and input, in which an indicating position on said display/input surface by indicating means such as a pen or a finger is detected and the detected position is inputted by said display/input device, comprising:

tilt angle acquiring means for acquiring information concerning a tilt angle which a direction indicated by said indicating means forms relative to the display/input surface of said display/input device;

thickness information setting means for setting information of the thickness of said indicating means; said thickness information including a set diameter of said indicating means and position determining means for determining a position of the point of intersection of the direction indicated by said indicating means and said display/input device on the basis of a position of said indicating means detected by said display/input device, said information of the thickness of said indicating means and said tilt angle, wherein said display/input device inputs the determined intersection point position in lieu of said detected position as a position indicated by said indicating means.

14. An information processing apparatus according to claim 13, wherein said tilt acquiring means includes a correspondence table which defines said tilt angle for each predetermined position region on said display/input surface by said indicating means and uses said correspondence table to determine said tilt angle for an individual position detected by said indicating means.

15. An information processing apparatus according to claim 13, further comprising display control means for displaying said point of intersection in an emphasized form on said display/input device.

16. An information processing apparatus according to claim 15, wherein said display control means displays said point of intersection in the emphasized form on said display/input device by displaying a cursor which represents said point of intersection.

17. An information processing apparatus according to claim 13, 14, 15 or 16, further comprising:

first recognizing means for recognizing, information displayed at a position on said display/input device inputted as the position indicated by said indicating means in said display/input device, as being information inputted by said indicating means;

second recognizing means for recognizing, information provided by the trace of a position on said display/input device inputted as the position indicated by said indicating means in said display/input device, as being information inputted by said indicating means; and change-over control means for using said first recognizing means and said second recognizing means in a changed-over manner.

18. An information processing apparatus according to claim 16, further comprising:

recognizing means for recognizing, information displayed at a position on said display/input device inputted as the position indicated by said indicating means in said display/input device, as being information inputted by said indicating means; and attribute information displaying means for providing attribute information to said cursor by changing at least one of the form, size and color of said cursor in accordance with information recognized by said recognizing means.

19. An information processing apparatus according to claim 18, wherein said attribute information displaying means displays said cursor so that the form of said cursor is changed to an inverted triangle and the position indicated by said indicating means is represented by a vertex of said inverted triangle and displays words representative of information recognized by said recognizing means in the vicinity of said cursor.

20. An information processing apparatus according to claim 18, further comprising:

address book display control means for displaying on said display/input device an address book which includes at least the full names of plural persons or the company names of plural companies and identifiers given to said full names or said company names, wherein, in the case where the information recognized by said recognizing means is an identifier of said address book, said attribute information displaying means displays the family name of a full name or a company name corresponding to said identifier as said attribute information in the vicinity of said cursor.

21. An information processing apparatus according to claim 20, further comprising:

function identifier displaying means for displaying a function identifier together with said address book on said display/input device, said function identifier being provided for setting the transmission of a telephone call, the transmission of an electronic mail or the transmission of a facsimile to a person or a company described in said address book as a receiver of transmission; and communication control means for performing, when an identifier of said address book is indicated and inputted by said indicating means and said function identifier is indicated and inputted, the transmission of a telephone call, the transmission of an electronic mail or the transmission of a facsimile to a person or a company corresponding to the identifier of said address book and in accordance with the indicated function identifier.

22. An information processing apparatus according to claim 21, wherein said function identifier has a concave recess structure or a convex projection structure at the surface of said input area.

23. An information processing apparatus according to claim 20 or 21, wherein the information processing apparatus is of a portable type and has a weight and a form with which it can be held by a single hand, and the information processing apparatus includes at least a part of an input area in a region on the information processing apparatus where the operation by a finger of the hand to hold the information processing apparatus is possible.

24. An information processing apparatus according to claim 23, wherein the information processing apparatus is provided with a concave cut-out structure at a portion thereof which contacts the thumb of the hand to hold the information processing apparatus.

25. A display information indicating method in an information processing apparatus provided with a display/input device having a display/input surface for display and input, in which an indicating position on said display/input surface by indicating means such as a pen or a finger is detected and the detected position is inputted by said display/input device, comprising:

acquiring information concerning a tilt angle which a direction indicated by said indicating means forms relative to the display/input surface of said display/input device;

setting information of the thickness of said indicating means; said thickness information including a set diameter of said indicating means and determining a position of the point of intersection of the direction indicated by said indicating means and said display/input device on the basis of a position of said indicating means detected by said display/input device, said information of the thickness of said indicating means and said tilt angle, wherein said display/input device inputs the determined intersection point position in lieu of said detected position as a position indicated by said indicating means.

26. An input/output integrated information processing apparatus including a display device and a substantially transparent input tablet having an input surface placed on a display surface of said display device for outputting a pointing coordinate which is a coordinate on said input surface pointed to by a user utilizing a finger or an indicator, comprising:

indication direction extended point determining means for determining an indication direction extended point coordinate, which is an intersection of an extended projection of the finger or the indicator intended by the user and the display surface of said input tablet, from the pointing coordinate output by said input tablet and a predetermined value by utilizing information including the set diameter of a tip of the user's finger or the indicator, the set tilt angle of the user's finger or the indicator in a direction normal to said input surface and said pointing coordinate; and display processing means for displaying a point, by utilizing a cursor, on the display surface of said display device, corresponding to the determined indication direction extended point coordinate so as to distinguishably display the determined indication direction extended point coordinate on said display device.

* * * * *